US011977731B2

(12) United States Patent
Davydov et al.

(10) Patent No.: US 11,977,731 B2
(45) Date of Patent: May 7, 2024

(54) MEDIA CAPTURE LOCK AFFORDANCE FOR GRAPHICAL USER INTERFACE

(71) Applicant: Apple Inc., Cupertino, CA (US)

(72) Inventors: Anton M. Davydov, Gilroy, CA (US); Jane E. Koo, Campbell, CA (US); Johnnie B. Manzari, San Francisco, CA (US); Grant R. Paul, San Francisco, CA (US); William A. Sorrentino, III, Mill Valley, CA (US); Andre Souza Dos Santos, San Jose, CA (US); Daniel J. Wiersema, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/466,824

(22) Filed: Sep. 3, 2021

(65) Prior Publication Data

US 2021/0397338 A1 Dec. 23, 2021

Related U.S. Application Data

(63) Continuation of application No. 16/271,583, filed on Feb. 8, 2019, now Pat. No. 11,112,964, which is a
(Continued)

(51) Int. Cl.
*G06F 3/0488* (2022.01)
*G06F 3/04817* (2022.01)
(Continued)

(52) U.S. Cl.
CPC ...... *G06F 3/04883* (2013.01); *G06F 3/04817* (2013.01); *G06F 3/0482* (2013.01);
(Continued)

(58) Field of Classification Search
CPC .. G06F 3/04883; G06F 3/0482; G06F 3/0484; G06F 3/04817; H04N 5/23293; H04N 23/631
See application file for complete search history.

(56) References Cited

U.S. PATENT DOCUMENTS 4,518,237 A   5/1985   Mizokami
4,933,702 A   6/1990   Komatsuzaki et al.
(Continued)

FOREIGN PATENT DOCUMENTS

CA   2729392 A1   8/2011
CA   2965700 A1   5/2016
(Continued)

OTHER PUBLICATIONS

Certificate of Examination received for Australian Patent Application No. 2021103004, dated Sep. 13, 2021, 2 pages.
(Continued)

*Primary Examiner* — Nhat Huy T Nguyen
(74) *Attorney, Agent, or Firm* — DLA Piper LLP (US)

(57) ABSTRACT

The disclosed embodiments are directed to a media capture lock affordance for a graphical user interface displayed by a media capture device. The media capture lock affordance allows a user to lock and unlock a capture state of the media capture device using a simple and intuitive touch gesture that can be applied by the user's finger (e.g., the user's thumb) while holding the media capture device in one hand.

60 Claims, 29 Drawing Sheets

Related U.S. Application Data continuation-in-part of application No. 15/995,040, filed on May 31, 2018, now abandoned.

(60) Provisional application No. 62/802,603, filed on Feb. 7, 2019, provisional application No. 62/628,825, filed on Feb. 9, 2018.

(51) Int. Cl.
*G06F 3/0482* (2013.01)
*G06F 3/0484* (2022.01)
*G06F 3/04883* (2022.01)
*H04N 23/63* (2023.01)

(52) U.S. Cl.
CPC ......... *G06F 3/0484* (2013.01); *H04N 23/631* (2023.01); *G06F 2203/04105* (2013.01)

(56) References Cited

U.S. PATENT DOCUMENTS

| | | | |
|---|---|---|---|
| 5,463,443 | A | 10/1995 | Tanaka et al. |
| 5,557,358 | A | 9/1996 | Mukai et al. |
| 5,615,384 | A | 3/1997 | Allard et al. |
| 5,825,353 | A | 10/1998 | Will |
| 6,262,769 | B1 | 7/2001 | Anderson et al. |
| 6,268,864 | B1 | 7/2001 | Chen et al. |
| 6,278,466 | B1 | 8/2001 | Chen |
| 6,359,837 | B1 | 3/2002 | Tsukamoto |
| 6,429,896 | B1 | 8/2002 | Aruga et al. |
| 6,522,347 | B1 | 2/2003 | Sakai et al. |
| 6,677,981 | B1 | 1/2004 | Mancuso et al. |
| 6,809,724 | B1 | 10/2004 | Shiraishi et al. |
| 6,809,759 | B1 | 10/2004 | Chiang |
| 6,819,867 | B2 | 11/2004 | Mayer et al. |
| 6,900,840 | B1 | 5/2005 | Schinner et al. |
| 7,463,304 | B2 | 12/2008 | Murray |
| 7,515,178 | B1 | 4/2009 | Fleischman et al. |
| 7,583,892 | B2 | 9/2009 | Okumura |
| 8,185,839 | B2 | 5/2012 | Jalon et al. |
| 8,189,087 | B2 | 5/2012 | Misawa et al. |
| 8,493,408 | B2 | 7/2013 | Williamson et al. |
| 8,576,304 | B2 | 11/2013 | Ishibashi |
| 8,624,836 | B1 | 1/2014 | Miller et al. |
| 8,638,371 | B2 | 1/2014 | Laberge et al. |
| 8,675,084 | B2 | 3/2014 | Bolton et al. |
| 8,723,988 | B2 | 5/2014 | Thorn |
| 8,736,704 | B2 | 5/2014 | Jasinski et al. |
| 8,736,716 | B2 | 5/2014 | Prentice |
| 8,742,890 | B2 | 6/2014 | Gocho et al. |
| 8,762,895 | B2 | 6/2014 | Mehta et al. |
| 8,848,097 | B2 | 9/2014 | Makii |
| 8,885,978 | B2 | 11/2014 | Cote et al. |
| 9,001,226 | B1 | 4/2015 | Ng et al. |
| 9,158,974 | B1 | 10/2015 | Laska et al. |
| 9,172,866 | B2 | 10/2015 | Ito et al. |
| 9,223,486 | B2 | 12/2015 | Shin et al. |
| 9,250,797 | B2 | 2/2016 | Roberts et al. |
| 9,264,660 | B1 | 2/2016 | Petterson et al. |
| 9,288,476 | B2 | 3/2016 | Sandrew et al. |
| 9,313,397 | B2 | 4/2016 | Harris et al. |
| 9,313,401 | B2 | 4/2016 | Frey et al. |
| 9,342,230 | B2 | 5/2016 | Bastien et al. |
| 9,360,671 | B1 | 6/2016 | Zhou |
| 9,423,868 | B2 | 8/2016 | Iwasaki |
| 9,451,144 | B2 | 9/2016 | Dye |
| 9,467,812 | B2 | 10/2016 | Jung et al. |
| 9,544,563 | B1 | 1/2017 | Cheng et al. |
| 9,600,178 | B2 | 3/2017 | Yun et al. |
| 9,609,221 | B2 | 3/2017 | Kim et al. |
| 9,667,881 | B2 | 5/2017 | Harris et al. |
| 9,716,825 | B1 | 7/2017 | Manzari et al. |
| 9,767,613 | B1 | 9/2017 | Bedikian et al. |
| 9,942,463 | B2 | 4/2018 | Kuo et al. |
| 9,973,674 | B2 | 5/2018 | Dye et al. |
| 10,015,298 | B2 | 7/2018 | Yang et al. |
| 10,021,294 | B2 | 7/2018 | Kwon et al. |
| 10,055,887 | B1 | 8/2018 | Gil et al. |
| 10,152,222 | B2 | 12/2018 | Ozawa et al. |
| 10,176,622 | B1 | 1/2019 | Waggoner et al. |
| 10,187,587 | B2 | 1/2019 | Hasinoff et al. |
| 10,225,463 | B2 | 3/2019 | Yun et al. |
| 10,230,901 | B2 | 3/2019 | Harris et al. |
| 10,270,983 | B1 | 4/2019 | Van Os et al. |
| 10,297,034 | B2 | 5/2019 | Nash et al. |
| 10,304,231 | B2 | 5/2019 | Saito |
| 10,313,652 | B1 | 6/2019 | Falstrup et al. |
| 10,325,417 | B1 | 6/2019 | Scapel et al. |
| 10,326,942 | B2 | 6/2019 | Shabtay et al. |
| 10,345,592 | B2 | 7/2019 | Samec et al. |
| 10,397,469 | B1 | 8/2019 | Yan et al. |
| 10,397,500 | B1 | 8/2019 | Xu et al. |
| 10,447,908 | B2 | 10/2019 | Lee et al. |
| 10,467,729 | B1 | 11/2019 | Perera et al. |
| 10,467,775 | B1 | 11/2019 | Waggoner et al. |
| 10,523,879 | B2 | 12/2019 | Dye et al. |
| 10,574,895 | B2 | 2/2020 | Lee et al. |
| 10,585,551 | B2 | 3/2020 | Lee et al. |
| 10,614,139 | B2 | 4/2020 | Fujioka et al. |
| 10,645,294 | B1 | 5/2020 | Manzari et al. |
| 10,652,470 | B1 | 5/2020 | Manzari et al. |
| 10,674,072 | B1 | 6/2020 | Manzari et al. |
| 10,681,282 | B1 | 6/2020 | Manzari et al. |
| 10,735,642 | B1 | 8/2020 | Manzari et al. |
| 10,735,643 | B1 | 8/2020 | Manzari et al. |
| 10,791,273 | B1 | 9/2020 | Manzari et al. |
| 10,958,850 | B2 | 3/2021 | Kwak et al. |
| 11,039,074 | B1 | 6/2021 | Manzari et al. |
| 11,054,973 | B1 | 7/2021 | Manzari et al. |
| 11,212,449 | B1 | 12/2021 | Manzari et al. |
| 11,321,857 | B2 | 5/2022 | Stauber et al. |
| 11,468,625 | B2 | 10/2022 | Manzari et al. |
| 11,550,420 | B2 | 1/2023 | Bovet et al. |
| 11,570,359 | B2 | 1/2023 | Lee et al. |
| 11,606,496 | B2 | 3/2023 | Watanabe et al. |
| 11,811,961 | B2 | 11/2023 | Zhang et al. |
| 2002/0140803 | A1 | 10/2002 | Gutta et al. |
| 2002/0167604 | A1 | 11/2002 | Ban et al. |
| 2002/0171737 | A1 | 11/2002 | Tullis et al. |
| 2003/0025802 | A1 | 2/2003 | Mayer, Jr. et al. |
| 2003/0107664 | A1 | 6/2003 | Suzuki |
| 2003/0122930 | A1 | 7/2003 | Schofield et al. |
| 2003/0160756 | A1 | 8/2003 | Numano |
| 2003/0174216 | A1 | 9/2003 | Iguchi et al. |
| 2003/0184587 | A1* | 10/2003 | Ording ................ G06F 3/04817 715/769 |
| 2004/0041924 | A1 | 3/2004 | White et al. |
| 2004/0061796 | A1 | 4/2004 | Honda et al. |
| 2004/0090469 | A1 | 5/2004 | Moon et al. |
| 2004/0189861 | A1 | 9/2004 | Tom et al. |
| 2004/0201699 | A1 | 10/2004 | Parulski et al. |
| 2005/0134695 | A1 | 6/2005 | Deshpande et al. |
| 2005/0189419 | A1 | 9/2005 | Igarashi et al. |
| 2005/0206981 | A1 | 9/2005 | Hung |
| 2005/0210403 | A1 | 9/2005 | Satanek |
| 2005/0237383 | A1 | 10/2005 | Soga et al. |
| 2005/0248660 | A1 | 11/2005 | Stavely et al. |
| 2005/0270397 | A1 | 12/2005 | Battles |
| 2006/0033831 | A1 | 2/2006 | Ejima et al. |
| 2006/0132482 | A1 | 6/2006 | Oh et al. |
| 2006/0158730 | A1 | 7/2006 | Kira |
| 2006/0187322 | A1 | 8/2006 | Janson et al. |
| 2006/0209067 | A1 | 9/2006 | Pellacini et al. |
| 2007/0025711 | A1 | 2/2007 | Marcus et al. |
| 2007/0025723 | A1 | 2/2007 | Baudisch et al. |
| 2007/0031062 | A1 | 2/2007 | Pal et al. |
| 2007/0040810 | A1 | 2/2007 | Dowe et al. |
| 2007/0097088 | A1 | 5/2007 | Battles |
| 2007/0109417 | A1 | 5/2007 | Hyttfors et al. |
| 2007/0140675 | A1 | 6/2007 | Yanagi et al. |
| 2007/0153112 | A1 | 7/2007 | Ueda et al. |
| 2007/0165103 | A1 | 7/2007 | Arima et al. |
| 2007/0228259 | A1 | 10/2007 | Hohenberger |
| 2007/0254640 | A1 | 11/2007 | Bliss |

(56) References Cited

U.S. PATENT DOCUMENTS

| | | |
|---|---|---|
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1 | 6/2008 | Deangelis et al. |
| 2008/0131019 A1 | 6/2008 | Ng |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222558 A1 | 9/2008 | Cho et al. |
| 2008/0284855 A1 | 11/2008 | Umeyama et al. |
| 2008/0309811 A1 | 12/2008 | Fujinawa et al. |
| 2009/0009612 A1 | 1/2009 | Tico et al. |
| 2009/0021576 A1 | 1/2009 | Linder et al. |
| 2009/0021600 A1 | 1/2009 | Watanabe |
| 2009/0022422 A1 | 1/2009 | Sorek et al. |
| 2009/0027515 A1 | 1/2009 | Maruyama et al. |
| 2009/0027539 A1 | 1/2009 | Kunou |
| 2009/0040332 A1 | 2/2009 | Yoshino et al. |
| 2009/0046097 A1 | 2/2009 | Franklin |
| 2009/0051783 A1 | 2/2009 | Kim et al. |
| 2009/0102918 A1 | 4/2009 | Sakamoto et al. |
| 2009/0102933 A1 | 4/2009 | Harris et al. |
| 2009/0109316 A1 | 4/2009 | Matsui |
| 2009/0167671 A1 | 7/2009 | Kerofsky |
| 2009/0167672 A1 | 7/2009 | Kerofsky |
| 2009/0175511 A1 | 7/2009 | Lee et al. |
| 2009/0227295 A1 | 9/2009 | Kim |
| 2009/0244318 A1 | 10/2009 | Makii |
| 2009/0263044 A1 | 10/2009 | Imagawa et al. |
| 2009/0276700 A1 | 11/2009 | Anderson et al. |
| 2009/0315671 A1 | 12/2009 | Gocho et al. |
| 2009/0322901 A1 | 12/2009 | Subbotin et al. |
| 2010/0020221 A1 | 1/2010 | Tupman et al. |
| 2010/0020222 A1 | 1/2010 | Jones et al. |
| 2010/0033615 A1 | 2/2010 | Mori |
| 2010/0039522 A1 | 2/2010 | Huang |
| 2010/0066853 A1 | 3/2010 | Aoki et al. |
| 2010/0066889 A1 | 3/2010 | Ueda et al. |
| 2010/0066890 A1 | 3/2010 | Ueda et al. |
| 2010/0066895 A1 | 3/2010 | Ueda et al. |
| 2010/0123737 A1 | 5/2010 | Williamson et al. |
| 2010/0162160 A1 | 6/2010 | Stallings et al. |
| 2010/0164893 A1 | 7/2010 | Shin et al. |
| 2010/0194931 A1 | 8/2010 | Kawaguchi et al. |
| 2010/0208122 A1 | 8/2010 | Yumiki |
| 2010/0231735 A1* | 9/2010 | Burian ............... H04N 21/443 348/220.1 |
| 2010/0231777 A1 | 9/2010 | Shintani et al. |
| 2010/0232703 A1 | 9/2010 | Aiso |
| 2010/0238327 A1 | 9/2010 | Griffith et al. |
| 2010/0259645 A1 | 10/2010 | Kaplan et al. |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0302280 A1 | 12/2010 | Szeliski et al. |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0050864 A1 | 3/2011 | Bond |
| 2011/0058052 A1 | 3/2011 | Bolton et al. |
| 2011/0074710 A1 | 3/2011 | Weeldreyer et al. |
| 2011/0074830 A1 | 3/2011 | Rapp et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0176039 A1 | 7/2011 | Lo |
| 2011/0187879 A1 | 8/2011 | Ochiai |
| 2011/0199495 A1 | 8/2011 | Laberge et al. |
| 2011/0242369 A1 | 10/2011 | Misawa et al. |
| 2011/0249078 A1 | 10/2011 | Abuan et al. |
| 2011/0296163 A1 | 12/2011 | Abernethy et al. |
| 2012/0002898 A1 | 1/2012 | Côté et al. |
| 2012/0011456 A1 | 1/2012 | Noda et al. |
| 2012/0026378 A1 | 2/2012 | Pang et al. |
| 2012/0056997 A1 | 3/2012 | Jang |
| 2012/0057064 A1 | 3/2012 | Gardiner et al. |
| 2012/0069206 A1 | 3/2012 | Hsieh |
| 2012/0120277 A1 | 5/2012 | Tsai et al. |
| 2012/0127189 A1 | 5/2012 | Park et al. |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0162455 A1 | 6/2012 | Kim et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206621 A1 | 8/2012 | Chen et al. |
| 2012/0235990 A1 | 9/2012 | Yamaji |
| 2012/0243802 A1 | 9/2012 | Fintel et al. |
| 2012/0274830 A1 | 11/2012 | Kameyama et al. |
| 2012/0293611 A1 | 11/2012 | Lee |
| 2012/0320141 A1 | 12/2012 | Bowen et al. |
| 2013/0009858 A1 | 1/2013 | Lacey |
| 2013/0010170 A1 | 1/2013 | Matsuzawa et al. |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0091298 A1* | 4/2013 | Ozzie .................. H04W 4/21 709/231 |
| 2013/0093904 A1 | 4/2013 | Wagner et al. |
| 2013/0109425 A1 | 5/2013 | Kerger et al. |
| 2013/0135315 A1 | 5/2013 | Bares et al. |
| 2013/0141362 A1 | 6/2013 | Asanuma et al. |
| 2013/0155308 A1 | 6/2013 | Wu et al. |
| 2013/0165186 A1 | 6/2013 | Choi |
| 2013/0179831 A1 | 7/2013 | Izaki |
| 2013/0194378 A1 | 8/2013 | Brown |
| 2013/0201307 A1 | 8/2013 | Schloter et al. |
| 2013/0210563 A1 | 8/2013 | Hollinger |
| 2013/0239057 A1 | 9/2013 | Ubillos et al. |
| 2013/0246948 A1 | 9/2013 | Chen et al. |
| 2013/0265467 A1 | 10/2013 | Matsuzawa et al. |
| 2013/0278576 A1 | 10/2013 | Lee et al. |
| 2013/0286251 A1 | 10/2013 | Wood et al. |
| 2013/0329074 A1 | 12/2013 | Zhang et al. |
| 2013/0346916 A1 | 12/2013 | Williamson et al. |
| 2014/0007021 A1 | 1/2014 | Akiyama et al. |
| 2014/0009639 A1 | 1/2014 | Lee |
| 2014/0022399 A1 | 1/2014 | Rashid et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0043517 A1 | 2/2014 | Yim et al. |
| 2014/0047389 A1 | 2/2014 | Aarabi |
| 2014/0049536 A1 | 2/2014 | Neuman et al. |
| 2014/0063175 A1 | 3/2014 | Jafry et al. |
| 2014/0063313 A1 | 3/2014 | Choi et al. |
| 2014/0071325 A1 | 3/2014 | Kawahara et al. |
| 2014/0078371 A1 | 3/2014 | Kinoshita |
| 2014/0092272 A1 | 4/2014 | Choi |
| 2014/0099994 A1 | 4/2014 | Bishop et al. |
| 2014/0104449 A1 | 4/2014 | Masarik et al. |
| 2014/0108928 A1 | 4/2014 | Mumick |
| 2014/0118563 A1 | 5/2014 | Mehta et al. |
| 2014/0132735 A1 | 5/2014 | Lee et al. |
| 2014/0143678 A1 | 5/2014 | Mistry et al. |
| 2014/0152886 A1 | 6/2014 | Morgan-Mar et al. |
| 2014/0160304 A1 | 6/2014 | Galor et al. |
| 2014/0176469 A1 | 6/2014 | Lim |
| 2014/0184524 A1 | 7/2014 | Schiefer et al. |
| 2014/0192233 A1 | 7/2014 | Kakkori et al. |
| 2014/0204229 A1 | 7/2014 | Leung et al. |

(56) References Cited

U.S. PATENT DOCUMENTS

| | | |
|---|---|---|
| 2014/0218599 A1 | 8/2014 | Nakamura et al. |
| 2014/0232838 A1 | 8/2014 | Jorgensen et al. |
| 2014/0240471 A1 | 8/2014 | Srinivasa et al. |
| 2014/0240531 A1 | 8/2014 | Nakai et al. |
| 2014/0240551 A1 | 8/2014 | Kim et al. |
| 2014/0240577 A1 | 8/2014 | Masugi |
| 2014/0267867 A1 | 9/2014 | Lee et al. |
| 2014/0281983 A1 | 9/2014 | Xian et al. |
| 2014/0282223 A1 | 9/2014 | Bastien et al. |
| 2014/0285698 A1 | 9/2014 | Geiss |
| 2014/0300635 A1 | 10/2014 | Suzuki |
| 2014/0300779 A1 | 10/2014 | Yeo et al. |
| 2014/0310598 A1 | 10/2014 | Sprague et al. |
| 2014/0327639 A1 | 11/2014 | Papakipos et al. |
| 2014/0333671 A1 | 11/2014 | Phang et al. |
| 2014/0333824 A1 | 11/2014 | Xiu |
| 2014/0351753 A1 | 11/2014 | Shin et al. |
| 2014/0354845 A1 | 12/2014 | Mølgaard et al. |
| 2014/0359438 A1 | 12/2014 | Matsuki |
| 2014/0362274 A1 | 12/2014 | Christie et al. |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2014/0375862 A1 | 12/2014 | Kim et al. |
| 2015/0022649 A1 | 1/2015 | Koppal |
| 2015/0022674 A1 | 1/2015 | Koss et al. |
| 2015/0033129 A1 | 1/2015 | Cho et al. |
| 2015/0042852 A1 | 2/2015 | Lee et al. |
| 2015/0049233 A1 | 2/2015 | Choi |
| 2015/0070362 A1 | 3/2015 | Hirai |
| 2015/0085174 A1 | 3/2015 | Shabtay et al. |
| 2015/0092077 A1 | 4/2015 | Feder et al. |
| 2015/0116353 A1 | 4/2015 | Miura et al. |
| 2015/0116448 A1 | 4/2015 | Gottlieb |
| 2015/0116542 A1 | 4/2015 | Lee |
| 2015/0135109 A1 | 5/2015 | Zambetti et al. |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1 | 5/2015 | Kim |
| 2015/0150141 A1 | 5/2015 | Szymanski et al. |
| 2015/0154448 A1 | 6/2015 | Murayama et al. |
| 2015/0172534 A1 | 6/2015 | Miyakawa et al. |
| 2015/0181135 A1 | 6/2015 | Shimosato |
| 2015/0189162 A1 | 7/2015 | Kuo et al. |
| 2015/0194186 A1 | 7/2015 | Lee et al. |
| 2015/0212723 A1 | 7/2015 | Lim et al. |
| 2015/0220249 A1 | 8/2015 | Snibbe et al. |
| 2015/0248198 A1 | 9/2015 | Somlai-Fisher et al. |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0256749 A1 | 9/2015 | Frey et al. |
| 2015/0264202 A1 | 9/2015 | Pawlowski |
| 2015/0271389 A1 | 9/2015 | Huang et al. |
| 2015/0289104 A1 | 10/2015 | Jung et al. |
| 2015/0297185 A1 | 10/2015 | McCormack et al. |
| 2015/0301731 A1 | 10/2015 | Okamoto et al. |
| 2015/0310583 A1 | 10/2015 | Hume et al. |
| 2015/0312185 A1 | 10/2015 | Langholz et al. |
| 2015/0334291 A1 | 11/2015 | Cho et al. |
| 2015/0341536 A1 | 11/2015 | Huang et al. |
| 2015/0350141 A1 | 12/2015 | Yang et al. |
| 2015/0350533 A1 | 12/2015 | Harris et al. |
| 2015/0350535 A1* | 12/2015 | Voss .................. G06F 3/04883 348/220.1 |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0026371 A1 | 1/2016 | Lu et al. |
| 2016/0029004 A1 | 1/2016 | Campbell et al. |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0077725 A1 | 3/2016 | Maeda |
| 2016/0080639 A1 | 3/2016 | Choi et al. |
| 2016/0088280 A1 | 3/2016 | Sadi et al. |
| 2016/0117829 A1 | 4/2016 | Yoon et al. |
| 2016/0127636 A1 | 5/2016 | Ito et al. |
| 2016/0127638 A1 | 5/2016 | Guo et al. |
| 2016/0132201 A1 | 5/2016 | Shaw et al. |
| 2016/0148384 A1 | 5/2016 | Bud et al. |
| 2016/0162039 A1 | 6/2016 | Eilat et al. |
| 2016/0165128 A1 | 6/2016 | Krug et al. |
| 2016/0173869 A1 | 6/2016 | Srikanth et al. |
| 2016/0188181 A1 | 6/2016 | Smith |
| 2016/0212319 A1 | 7/2016 | Harris et al. |
| 2016/0219217 A1 | 7/2016 | Williams et al. |
| 2016/0225175 A1 | 8/2016 | Kim et al. |
| 2016/0227115 A1 | 8/2016 | Kim et al. |
| 2016/0241777 A1* | 8/2016 | Rav-Acha ............ G06F 3/0488 |
| 2016/0247288 A1 | 8/2016 | Omori et al. |
| 2016/0255268 A1 | 9/2016 | Kang et al. |
| 2016/0259413 A1 | 9/2016 | Anzures et al. |
| 2016/0337570 A1 | 11/2016 | Tan et al. |
| 2016/0337582 A1 | 11/2016 | Shimauchi et al. |
| 2016/0357353 A1 | 12/2016 | Miura et al. |
| 2016/0360097 A1 | 12/2016 | Penha et al. |
| 2016/0360116 A1 | 12/2016 | Penha et al. |
| 2016/0366344 A1 | 12/2016 | Pan et al. |
| 2016/0373631 A1 | 12/2016 | Titi et al. |
| 2016/0373650 A1 | 12/2016 | Kim et al. |
| 2017/0006210 A1 | 1/2017 | Dye et al. |
| 2017/0011773 A1* | 1/2017 | Lee ..................... G11B 27/034 |
| 2017/0013179 A1 | 1/2017 | Kang et al. |
| 2017/0019604 A1 | 1/2017 | Kim et al. |
| 2017/0024872 A1 | 1/2017 | Olsson et al. |
| 2017/0026565 A1 | 1/2017 | Hong et al. |
| 2017/0034449 A1 | 2/2017 | Eum et al. |
| 2017/0039686 A1 | 2/2017 | Miura et al. |
| 2017/0041549 A1* | 2/2017 | Kim .................... H04N 5/23216 |
| 2017/0041677 A1 | 2/2017 | Anderson et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0054960 A1 | 2/2017 | Chien et al. |
| 2017/0064184 A1 | 3/2017 | Tsai |
| 2017/0092329 A1* | 3/2017 | Kim .................... G06F 3/0482 |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0124664 A1 | 5/2017 | Savenok et al. |
| 2017/0139572 A1 | 5/2017 | Sunkavalli et al. |
| 2017/0186162 A1 | 6/2017 | Mihic et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244896 A1 | 8/2017 | Chien et al. |
| 2017/0244897 A1 | 8/2017 | Jung et al. |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0272654 A1 | 9/2017 | Poindexter, Jr. |
| 2017/0285764 A1 | 10/2017 | Kim et al. |
| 2017/0287220 A1 | 10/2017 | Khalid et al. |
| 2017/0302840 A1 | 10/2017 | Hasinoff et al. |
| 2017/0315772 A1 | 11/2017 | Lee et al. |
| 2017/0324784 A1 | 11/2017 | Taine et al. |
| 2017/0336961 A1 | 11/2017 | Heo et al. |
| 2017/0354888 A1 | 12/2017 | Benedetto et al. |
| 2017/0358071 A1 | 12/2017 | Yamaoka et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2018/0007315 A1 | 1/2018 | Kim et al. |
| 2018/0021684 A1 | 1/2018 | Benedetto |
| 2018/0048820 A1 | 2/2018 | Hinkel et al. |

(56) References Cited

U.S. PATENT DOCUMENTS

| | | |
|---|---|---|
| 2018/0052571 A1 | 2/2018 | Seol et al. |
| 2018/0077332 A1 | 3/2018 | Shimura et al. |
| 2018/0088787 A1 | 3/2018 | Bereza et al. |
| 2018/0091728 A1 | 3/2018 | Brown et al. |
| 2018/0096487 A1 | 4/2018 | Nash et al. |
| 2018/0107367 A1 | 4/2018 | Rinneberg et al. |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |
| 2018/0146132 A1 | 5/2018 | Manzari et al. |
| 2018/0152611 A1 | 5/2018 | Li et al. |
| 2018/0184008 A1 | 6/2018 | Kondo |
| 2018/0184061 A1 | 6/2018 | Kitsunai et al. |
| 2018/0198985 A1 | 7/2018 | Ishitsuka |
| 2018/0199025 A1 | 7/2018 | Holzer et al. |
| 2018/0213144 A1 | 7/2018 | Kim et al. |
| 2018/0213161 A1 | 7/2018 | Kanda et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0262677 A1 | 9/2018 | Dye et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0349008 A1 | 12/2018 | Manzari et al. |
| 2018/0349659 A1 | 12/2018 | Manzari et al. |
| 2018/0352165 A1 | 12/2018 | Zhen et al. |
| 2018/0376122 A1 | 12/2018 | Park et al. |
| 2019/0007589 A1 | 1/2019 | Kadambala et al. |
| 2019/0028650 A1 | 1/2019 | Bernstein et al. |
| 2019/0029513 A1 | 1/2019 | Gunnerson et al. |
| 2019/0051032 A1 | 2/2019 | Chu et al. |
| 2019/0080189 A1 | 3/2019 | Van Os et al. |
| 2019/0082097 A1 | 3/2019 | Manzari et al. |
| 2019/0089873 A1 | 3/2019 | Misawa et al. |
| 2019/0108684 A1 | 4/2019 | Callaghan |
| 2019/0114740 A1 | 4/2019 | Ogino et al. |
| 2019/0121216 A1 | 4/2019 | Shabtay et al. |
| 2019/0138259 A1 | 5/2019 | Bagaria et al. |
| 2019/0141030 A1 | 5/2019 | Cockerill et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0220089 A1 | 7/2019 | Kakizawa et al. |
| 2019/0222769 A1 | 7/2019 | Srivastava et al. |
| 2019/0235743 A1 | 8/2019 | Ono |
| 2019/0250812 A1 | 8/2019 | Davydov et al. |
| 2019/0253619 A1 | 8/2019 | Davydov et al. |
| 2019/0289201 A1 | 9/2019 | Nishimura et al. |
| 2019/0318538 A1 | 10/2019 | Li et al. |
| 2019/0379821 A1 | 12/2019 | Kobayashi et al. |
| 2019/0379837 A1 | 12/2019 | Kim et al. |
| 2020/0053288 A1 | 2/2020 | Kim et al. |
| 2020/0059605 A1 | 2/2020 | Liu et al. |
| 2020/0068121 A1 | 2/2020 | Wang |
| 2020/0082599 A1 | 3/2020 | Manzari |
| 2020/0105003 A1 | 4/2020 | Stauber et al. |
| 2020/0106952 A1 | 4/2020 | Missig et al. |
| 2020/0106965 A1 | 4/2020 | Malia et al. |
| 2020/0128191 A1 | 4/2020 | Sun et al. |
| 2020/0204725 A1 | 6/2020 | Li |
| 2020/0221020 A1 | 7/2020 | Manzari et al. |
| 2020/0236278 A1 | 7/2020 | Yeung et al. |
| 2020/0242788 A1 | 7/2020 | Jacobs et al. |
| 2020/0244879 A1 | 7/2020 | Hohjoh |
| 2020/0285806 A1 | 9/2020 | Radakovitz et al. |
| 2020/0336660 A1 | 10/2020 | Dong et al. |
| 2020/0358963 A1 | 11/2020 | Manzari et al. |
| 2021/0146838 A1 | 5/2021 | Goseberg et al. |
| 2021/0160431 A1 | 5/2021 | Chen et al. |
| 2021/0168300 A1 | 6/2021 | Wang et al. |
| 2021/0195093 A1 | 6/2021 | Manzari et al. |
| 2021/0344845 A1 | 11/2021 | Li et al. |
| 2021/0373750 A1 | 12/2021 | Manzari et al. |
| 2021/0389850 A1 | 12/2021 | Charlton et al. |
| 2022/0006946 A1 | 1/2022 | Missig et al. |
| 2022/0053142 A1 | 2/2022 | Manzari et al. |
| 2022/0103758 A1 | 3/2022 | Manzari et al. |
| 2022/0124241 A1 | 4/2022 | Manzari et al. |
| 2022/0134226 A1 | 5/2022 | Takura et al. |
| 2022/0207838 A1 | 6/2022 | Anvaripour et al. |
| 2022/0210328 A1 | 6/2022 | Anvaripour et al. |
| 2022/0210337 A1 | 6/2022 | Anvaripour et al. |
| 2022/0217275 A1 | 7/2022 | Fan |
| 2022/0224828 A1 | 7/2022 | Lim et al. |
| 2022/0262022 A1 | 8/2022 | Stauber et al. |
| 2022/0264028 A1 | 8/2022 | Manzari et al. |
| 2022/0276041 A1 | 9/2022 | Dryer et al. |
| 2022/0279116 A1 | 9/2022 | Zhou |
| 2022/0294992 A1 | 9/2022 | Manzari et al. |
| 2022/0319100 A1 | 10/2022 | Manzari et al. |
| 2022/0382440 A1 | 12/2022 | Manzari et al. |
| 2022/0394190 A1 | 12/2022 | Cui et al. |
| 2022/0408020 A1 | 12/2022 | Zhang |
| 2022/0417416 A1 | 12/2022 | Li et al. |
| 2023/0007186 A1 | 1/2023 | Li et al. |
| 2023/0018557 A1 | 1/2023 | Jiang |
| 2023/0081664 A1 | 3/2023 | Li |
| 2023/0115929 A1 | 4/2023 | Bian et al. |
| 2023/0116044 A1 | 4/2023 | Han |
| 2023/0156144 A1 | 5/2023 | Cui |
| 2023/0156316 A1 | 5/2023 | Kang et al. |
| 2023/0179856 A1 | 6/2023 | Shin |
| 2023/0188831 A1 | 6/2023 | Hyun et al. |
| 2023/0188861 A1 | 6/2023 | Bian |
| 2023/0209179 A1 | 6/2023 | Manzari et al. |
| 2023/0217097 A1 | 7/2023 | Wu et al. |
| 2023/0217098 A1 | 7/2023 | Wang et al. |
| 2023/0252659 A1 | 8/2023 | Stauber et al. |
| 2023/0254573 A1 | 8/2023 | Manzari et al. |
| 2023/0308742 A1 | 9/2023 | Lin et al. |
| 2023/0308743 A1 | 9/2023 | Ku et al. |
| 2023/0308778 A1 | 9/2023 | Yang |
| 2023/0319394 A1 | 10/2023 | Manzari et al. |
| 2023/0328429 A1 | 10/2023 | Bian |
| 2023/0336865 A1 | 10/2023 | Da Veiga et al. |
| 2023/0353862 A1 | 11/2023 | Yi et al. |

FOREIGN PATENT DOCUMENTS

| | | |
|---|---|---|
| CA | 2729392 C | 5/2017 |
| CA | 2965925 A1 | 3/2018 |
| CN | 1437365 A | 8/2003 |
| CN | 1499878 A | 5/2004 |
| CN | 1705346 A | 12/2005 |
| CN | 1901717 A | 1/2007 |
| CN | 101243383 A | 8/2008 |
| CN | 101282422 A | 10/2008 |
| CN | 101300830 A | 11/2008 |
| CN | 101310519 A | 11/2008 |
| CN | 101355655 A | 1/2009 |
| CN | 101364031 A | 2/2009 |
| CN | 101427574 A | 5/2009 |
| CN | 101533330 A | 9/2009 |
| CN | 101576996 A | 11/2009 |
| CN | 101681462 A | 3/2010 |
| CN | 101778220 A | 7/2010 |
| CN | 101883213 A | 11/2010 |
| CN | 101931691 A | 12/2010 |
| CN | 102084327 A | 6/2011 |
| CN | 102088554 A | 6/2011 |
| CN | 102272700 A | 12/2011 |
| CN | 102428655 A | 4/2012 |

(56) References Cited

FOREIGN PATENT DOCUMENTS

| | | |
|---|---|---|
| CN | 102457661 A | 5/2012 |
| CN | 102474560 A | 5/2012 |
| CN | 202309894 U | 7/2012 |
| CN | 202330968 U | 7/2012 |
| CN | 102855079 A | 1/2013 |
| CN | 103051837 A | 4/2013 |
| CN | 103051841 A | 4/2013 |
| CN | 103052961 A | 4/2013 |
| CN | 103297719 A | 9/2013 |
| CN | 103309602 A | 9/2013 |
| CN | 103324329 A | 9/2013 |
| CN | 103685925 A | 3/2014 |
| CN | 103702039 A | 4/2014 |
| CN | 103777742 A | 5/2014 |
| CN | 103970472 A | 8/2014 |
| CN | 104346080 A | 2/2015 |
| CN | 104346099 A | 2/2015 |
| CN | 104423946 A | 3/2015 |
| CN | 104461288 A | 3/2015 |
| CN | 104813322 A | 7/2015 |
| CN | 104836947 A | 8/2015 |
| CN | 105138259 A | 12/2015 |
| CN | 105190511 A | 12/2015 |
| CN | 105229571 A | 1/2016 |
| CN | 105338256 A | 2/2016 |
| CN | 105474163 A | 4/2016 |
| CN | 105589637 A | 5/2016 |
| CN | 105620393 A | 6/2016 |
| CN | 105630290 A | 6/2016 |
| CN | 105637855 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106791357 A | 5/2017 |
| CN | 106791377 A | 5/2017 |
| CN | 106791420 A | 5/2017 |
| CN | 106921829 A | 7/2017 |
| CN | 107077274 A | 8/2017 |
| CN | 107079141 A | 8/2017 |
| CN | 107566721 A | 1/2018 |
| CN | 107580693 A | 1/2018 |
| CN | 107770448 A | 3/2018 |
| CN | 107800945 A | 3/2018 |
| CN | 107820011 A | 3/2018 |
| CN | 107924113 A | 4/2018 |
| CN | 108319629 A | 7/2018 |
| CN | 108353126 A | 7/2018 |
| CN | 108391053 A | 8/2018 |
| CN | 108513070 A | 9/2018 |
| CN | 108549522 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109313530 A | 2/2019 |
| CN | 109496425 A | 3/2019 |
| CN | 109639970 A | 4/2019 |
| CN | 109644229 A | 4/2019 |
| DK | 201670753 A1 | 1/2018 |
| DK | 201670755 A1 | 1/2018 |
| DK | 201670627 A1 | 2/2018 |
| EP | 0651543 A2 | 5/1995 |
| EP | 0651543 A3 | 12/1997 |
| EP | 1278099 A1 | 1/2003 |
| EP | 1953663 A1 | 8/2008 |
| EP | 0651543 B1 | 9/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2640060 A1 | 9/2013 |
| EP | 2682855 A2 | 1/2014 |
| EP | 2830297 A1 | 1/2015 |
| EP | 2843530 A1 | 3/2015 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3033837 A1 | 6/2016 |
| EP | 3033837 A4 | 3/2017 |
| EP | 2194508 B1 | 12/2017 |
| EP | 3333544 A1 | 6/2018 |
| EP | 3033837 B1 | 10/2018 |
| EP | 3393119 A1 | 10/2018 |
| EP | 3135028 B1 | 1/2019 |
| EP | 2482179 B1 | 3/2019 |
| EP | 3457680 A1 | 3/2019 |
| EP | 3012732 B1 | 5/2019 |
| EP | 3008575 B1 | 7/2019 |
| EP | 3633975 A1 | 4/2020 |
| EP | 3736676 A1 | 11/2020 |
| EP | 2682855 B1 | 2/2021 |
| GB | 2307383 A | 5/1997 |
| GB | 2515797 A | 1/2015 |
| GB | 2523670 A | 9/2015 |
| JP | 2-179078 A | 7/1990 |
| JP | 3-129573 A | 6/1991 |
| JP | 6-215092 A | 8/1994 |
| JP | 9-116792 A | 5/1997 |
| JP | 9-179998 A | 7/1997 |
| JP | 11-355617 A | 12/1999 |
| JP | 2000-207549 A | 7/2000 |
| JP | 2000-244905 A | 9/2000 |
| JP | 2001-245204 A | 9/2001 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2003-248549 A | 9/2003 |
| JP | 2004-15595 A | 1/2004 |
| JP | 2004-135074 A | 4/2004 |
| JP | 2005-31466 A | 2/2005 |
| JP | 2005-191641 A | 7/2005 |
| JP | 2005-191985 A | 7/2005 |
| JP | 2005-311699 A | 11/2005 |
| JP | 2006-332809 A | 12/2006 |
| JP | 3872041 B2 | 1/2007 |
| JP | 2007-28211 A | 2/2007 |
| JP | 2007-124398 A | 5/2007 |
| JP | 2008-66978 A | 3/2008 |
| JP | 2008-236534 A | 10/2008 |
| JP | 2009-105919 A | 5/2009 |
| JP | 2009-212899 A | 9/2009 |
| JP | 2009-217816 A | 9/2009 |
| JP | 2009-246468 A | 10/2009 |
| JP | 2009-273023 A | 11/2009 |
| JP | 2009-545256 A | 12/2009 |
| JP | 2010-117444 A | 5/2010 |
| JP | 2010-119147 A | 5/2010 |
| JP | 2010-182023 A | 8/2010 |
| JP | 2010-211166 A | 9/2010 |
| JP | 2010-268052 A | 11/2010 |
| JP | 2011-87167 A | 4/2011 |
| JP | 2011-91570 A | 5/2011 |

(56) References Cited

FOREIGN PATENT DOCUMENTS

| | | |
|---|---|---|
| JP | 2011-124864 A | 6/2011 |
| JP | 2011-211552 A | 10/2011 |
| JP | 2012-79302 A | 4/2012 |
| JP | 2012-89973 A | 5/2012 |
| JP | 2012-147379 A | 8/2012 |
| JP | 2013-70303 A | 4/2013 |
| JP | 2013-106289 A | 5/2013 |
| JP | 2013-546238 A | 12/2013 |
| JP | 2014-23083 A | 2/2014 |
| JP | 2014-60501 A | 4/2014 |
| JP | 2014-212415 A | 11/2014 |
| JP | 2015-1716 A | 1/2015 |
| JP | 2015-5255 A | 1/2015 |
| JP | 2015-22716 A | 2/2015 |
| JP | 2015-25897 A | 2/2015 |
| JP | 2015-50713 A | 3/2015 |
| JP | 2015-76717 A | 4/2015 |
| JP | 2015-91098 A | 5/2015 |
| JP | 2015-149095 A | 8/2015 |
| JP | 2015-534742 A | 12/2015 |
| JP | 2016-39613 A | 3/2016 |
| JP | 2016-66978 A | 4/2016 |
| JP | 2016-72965 A | 5/2016 |
| JP | 2016-129315 A | 7/2016 |
| JP | 2016-175175 A | 10/2016 |
| JP | 2017-34474 A | 2/2017 |
| JP | 2018-10488 A | 1/2018 |
| JP | 2018-107711 A | 7/2018 |
| JP | 2018-121235 A | 8/2018 |
| JP | 2019-507928 A | 3/2019 |
| JP | 2019-62556 A | 4/2019 |
| JP | 2019-203399 A | 11/2019 |
| JP | 2020-42602 A | 3/2020 |
| JP | 6982047 B2 | 11/2021 |
| KR | 10-2009-0096833 A | 9/2009 |
| KR | 10-2012-0004928 A | 1/2012 |
| KR | 10-2012-0025872 A | 3/2012 |
| KR | 10-2012-0048397 A | 5/2012 |
| KR | 10-2012-0054406 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-1343591 B1 | 12/2013 |
| KR | 10-2014-0019631 A | 2/2014 |
| KR | 10-2014-0049850 A | 4/2014 |
| KR | 10-2014-0062801 A | 5/2014 |
| KR | 10-2015-0014290 A | 2/2015 |
| KR | 10-2016-0019145 A | 2/2016 |
| KR | 10-2016-0020396 A | 2/2016 |
| KR | 10-2016-0020791 A | 2/2016 |
| KR | 10-2016-0075583 A | 6/2016 |
| KR | 10-1674959 B1 | 11/2016 |
| KR | 10-2017-0123125 A | 11/2017 |
| KR | 10-1799223 B1 | 11/2017 |
| KR | 10-2017-0135975 A | 12/2017 |
| KR | 10-2018-0037076 A | 4/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| WO | 1999/39307 A1 | 8/1999 |
| WO | 2005/043892 A1 | 5/2005 |
| WO | 2007/126707 A1 | 11/2007 |
| WO | 2008/014301 A2 | 1/2008 |
| WO | 2008/020655 A1 | 2/2008 |
| WO | 2009/078091 A1 | 6/2009 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2012/001947 A1 | 1/2012 |
| WO | 2012/006251 A1 | 1/2012 |
| WO | 2012/019163 A2 | 2/2012 |
| WO | 2012/051720 A2 | 4/2012 |
| WO | 2013/136394 A1 | 9/2013 |
| WO | 2014/066115 A1 | 5/2014 |
| WO | 2014/159779 A1 | 10/2014 |
| WO | 2014/160819 A1 | 10/2014 |
| WO | 2014/165141 A1 | 10/2014 |
| WO | 2014/200734 A1 | 12/2014 |
| WO | 2014/200798 A1 | 12/2014 |
| WO | 2015/023044 A1 | 2/2015 |
| WO | 2015/026864 A1 | 2/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/183438 A1 | 12/2015 |
| WO | 2015/187494 A1 | 12/2015 |
| WO | 2015/190666 A1 | 12/2015 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/073804 A2 | 5/2016 |
| WO | 2016/073804 A3 | 7/2016 |
| WO | 2016/172619 A1 | 10/2016 |
| WO | 2016/204936 A1 | 12/2016 |
| WO | 2017/051605 A1 | 3/2017 |
| WO | 2017/058834 A1 | 4/2017 |
| WO | 2017/218193 A1 | 12/2017 |
| WO | 2018/012395 A1 | 1/2018 |
| WO | 2018/048838 A1 | 3/2018 |
| WO | 2018/057268 A1 | 3/2018 |
| WO | 2018/099037 A1 | 6/2018 |
| WO | 2018/144339 A2 | 8/2018 |
| WO | 2018/159864 A1 | 9/2018 |
| WO | 2019/050562 A1 | 3/2019 |

OTHER PUBLICATIONS

Clover, Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Corrected Notice of Allowance received for U.S. Appl. No. 16/825,879, dated Aug. 13, 2021, 2 pages.
Corrected Notice of Allowance received for U.S. Appl. No. 16/825,879, dated Jul. 23, 2021, 2 pages.
Corrected Notice of Allowance received for U.S. Appl. No. 16/825,879, dated Sep. 15, 2021, 2 pages.
Corrected Notice of Allowance received for U.S. Appl. No. 16/835,651, dated Aug. 10, 2021, 4 pages.
Corrected Notice of Allowance received for U.S. Appl. No. 16/835,651, dated Aug. 13, 2021, 2 pages.
Corrected Notice of Allowance received for U.S. Appl. No. 16/835,651, dated Jul. 28, 2021, 4 pages.
Decision to Grant received for Danish Patent Application No. PA201970593, dated Sep. 7, 2021, 2 pages.
Decision to Grant received for Japanese Patent Application No. 2020-184470, dated Jul. 1, 2021, 3 pages (1 page of English Translation and 2 pages of Official Copy).
Decision to Grant received for Japanese Patent Application No. 2020-184471, dated Jul. 1, 2021, 3 pages (1 page of English Translation and 2 pages of Official Copy).
Decision to Grant received for Japanese Patent Application No. 2021-051385, dated Jul. 8, 2021, 3 pages (1 page of English Translation and 2 pages of Official Copy).
Examiner's Answer to Appeal Brief received for U.S. Appl. No. 16/144,629, dated Jul. 21, 2021, 21 pages.
Feng et al., "3D Direct Human-Computer Interface Paradigm Based on Free Hand Tracking", Chinese Journal of Computers, vol. 37,

(56) References Cited

OTHER PUBLICATIONS

No. 6, Jun. 30, 2014, 15 pages (Official Copy Only) (See Communication under 37 CFR § 1.98(a) (3)).
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
Invitation to Pay Additional Fees received for PCT Patent Application No. PCT/US2021/034304, dated Aug. 20, 2021, 16 pages.
"Nikon Digital Camera D7200 User's Manual", Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 16/528,257, dated Jul. 30, 2021, 12 pages.
Notice of Acceptance received for Australian Patent Application No. 2021203210, dated Jul. 9, 2021, 3 pages.
Notice of Allowance received for Chinese Patent Application No. 202010287958.9, dated Aug. 27, 2021, 6 pages (3 pages of English Translation and 3 pages of Official Copy).
Notice of Allowance received for Chinese Patent Application No. 202010600151.6, dated Aug. 13, 2021, 2 pages (1 page of English Translation and 1 page of Official Copy).
Notice of Allowance received for Korean Patent Application No. 10-2021-7000954, dated Aug. 18, 2021, 5 pages (2 pages of English Translation and 3 pages of Official Copy).
Notice of Allowance received for U.S. Appl. No. 16/528,941, dated Aug. 10, 2021, 5 pages.
Notice of Allowance received for U.S. Appl. No. 16/825,879, dated Jul. 13, 2021, 9 pages.
Notice of Allowance received for U.S. Appl. No. 16/825,879, dated Sep. 28, 2021, 8 pages.
Notice of Allowance received for U.S. Appl. No. 16/835,651, dated Jul. 23, 2021, 8 pages.
Office Action received for Australian Patent Application No. 2020239717, dated Jun. 23, 2021, 7 pages.
Office Action received for Australian Patent Application No. 2020239717, dated Sep. 28, 2021, 6 pages.
Office Action received for Australian Patent Application No. 2020260413, dated Jun. 24, 2021, 2 pages.
Office Action received for Australian Patent Application No. 2021103004, dated Aug. 12, 2021, 5 pages.
Office Action received for Chinese Patent Application No. 202010287950.2, dated Aug. 10, 2021, 12 pages (6 pages of English Translation and 6 pages of Official Copy).
Office Action received for Chinese Patent Application No. 202010600197.8, dated Jul. 2, 2021, 14 pages (6 pages of English Translation and 8 pages of Official Copy).
Office Action received for Chinese Patent Application No. 202010601484.0, dated Jun. 3, 2021, 13 pages (6 pages of English Translation and 7 pages of Official Copy).
Office Action received for Chinese Patent Application No. 202011480411.7, dated Aug. 2, 2021, 12 pages (6 pages of English Translation and 6 pages of Official Copy).
Office Action received for European Patent Application No. 20168009.7, dated Sep. 13, 2021, 8 pages.
Office Action received for European Patent Application No. 20206197.4, dated Aug. 27, 2021, 6 pages.
Office Action received for Indian Patent Application No. 201817024430, dated Sep. 27, 2021, 8 pages.
Office Action received for Japanese Patent Application No. 2019-203399, dated Aug. 10, 2021, 4 pages (2 pages of English Translation and 2 pages of Official Copy).
Office Action received for Japanese Patent Application No. 2020-542592, dated Sep. 21, 2021, 5 pages (3 page of English Translation and 2 pages of Official Copy).
Office Action received for Korean Patent Application No. 10-2020-7022663, dated Aug. 17, 2021, 11 pages (5 pages of English Translation and 6 pages of Official Copy).

"ProCamera Capture the Moment", Online Available at: http://www.procamera-app.com/procamera_manual/ProCamera_Manual_EN.pdf, Apr. 21, 2016, 63 pages.
Advisory Action received for U.S. Appl. No. 16/144,629, dated Dec. 13, 2019, 9 pages.
Advisory Action received for U.S. Appl. No. 16/144,629, dated Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at: https://www.youtube.com/watch?v=GZHYCdMCv-w, Apr. 19, 2018, 3 pages.
Applicant-Initiated Interview Summary received for U.S. Appl. No. 16/271,583 dated Mar. 2, 2020, 3 pages.
Applicant-Initiated Interview Summary received for U.S. Appl. No. 16/271,583, dated Jul. 14, 2020, 4 pages.
Applicant-Initiated Interview Summary received for U.S. Appl. No. 15/995,040, dated Dec. 23, 2019, 5 pages.
Applicant-Initiated Interview Summary received for U.S. Appl. No. 15/995,040, dated Jul. 27, 2020, 4 pages.
Applicant-Initiated Interview Summary received for U.S. Appl. No. 15/995,040, dated Nov. 24, 2020, 4 pages.
Applicant-Initiated Interview Summary received for U.S. Appl. No. 16/144,629, dated Jul. 2, 2020, 5 pages.
Applicant-Initiated Interview Summary received for U.S. Appl. No. 16/144,629, dated Nov. 23, 2020, 3 pages.
Applicant-Initiated Interview Summary received for U.S. Appl. No. 16/528,941, dated Jun. 19, 2020, 3 pages.
Applicant-Initiated Interview Summary received for U.S. Appl. No. 16/528,941, dated Nov. 10, 2020, 2 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Applicant-Initiated Interview Summary received for U.S. Appl. No. 17/027,317, dated Dec. 21, 2020, 4 pages.
AstroVideo, "AstroVideo enables you to use a low-cost, low-light video camera to capture astronomical images.", Available online at: https://www.coaa.co.uk/astrovideo.htm, Retrieved on: Nov. 18, 2019, 5 pages.
Brief Communication regarding Oral Proceedings received for European Patent Application No. 17184710.6, dated Feb. 19, 2020, 2 pages.
Brief Communication regarding Oral Proceedings received for European Patent Application No. 17184710.6, dated Mar. 9, 2020, 2 pages.
Certificate of Examination received for Australian Patent Application No. 2017100683, dated Jan. 16, 2018, 2 pages.
Certificate of Examination received for Australian Patent Application No. 2020100720, dated Nov. 11, 2020, 2 pages.
Certificate of Examination received for Australian Patent Application No. 2020104220, dated Apr. 1, 2021, 2 pages.
Corrected Notice of Allowance received for U.S. Appl. No. 14/641,251, dated Jun. 17, 2016, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Feb. 28, 2020, 2 pages.

(56) References Cited

OTHER PUBLICATIONS

Corrected Notice of Allowance received for U.S. Appl. No. 16/191,117, dated Nov. 20, 2019, 2 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Corrected Notice of Allowance received for U.S. Appl. No. 16/835,651, dated Jun. 14, 2021, 2 pages.
Corrected Notice of Allowance received for U.S. Appl. No. 17/027,484, dated May 14, 2021, 5 pages.
Corrected Notice of Allowance received for U.S. Appl. No. 17/027,484, dated May 28, 2021, 5 pages.
Decision of Refusal received for Japanese Patent Application No. 2018-243463, dated Feb. 25, 2019, 8 pages.
Decision of Refusal received for Japanese Patent Application No. 2018-545502, dated Feb. 25, 2019, 11 pages.
Decision on Appeal received for Japanese Patent Application No. 2018-225131, dated Mar. 11, 2021, 5 pages.
Decision on Appeal received for Japanese Patent Application No. 2018-545502, dated Mar. 25, 2021, 3 pages.
Decision to Grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for Danish Patent Application No. PA201970601, dated Feb. 3, 2021, 2 pages.
Decision to Grant received for Danish Patent Application No. PA201970603, dated May 21, 2021, 2 pages.
Decision to Grant received for European Patent Application No. 15712218.5, dated Jun. 7, 2018, 2 pages.
Decision to Grant received for European Patent Application No. 18176890.4, dated Jul. 9, 2020, 3 pages.
Decision to Grant received for European Patent Application No. 18183054.8, dated Jan. 21, 2021, 3 pages.
Decision to Grant received for European Patent Application No. 18209460.7, dated Apr. 9, 2021, 2 pages.
Decision to Grant received for European Patent Application No. 18214698.5, dated Sep. 10, 2020, 3 pages.
Decision to Grant received for Japanese Patent Application No. 2018-243463, dated Aug. 17, 2020, 2 pages.
Decision to Grant received for Japanese Patent Application No. 2020-070418, dated Feb. 8, 2021, 3 pages.
Decision to Refuse received for European Patent Application No. 17184710.6, dated Jun. 16, 2020, 9 pages.
Decision to Refuse received for Japanese Patent Application No. 2018-225131, dated Jul. 8, 2019, 6 pages.
Decision to Refuse received for Japanese Patent Application No. 2018-243463, dated Jul. 8, 2019, 5 pages.
Decision to Refuse received for Japanese Patent Application No. 2018-545502, dated Jul. 8, 2019, 5 pages.
European Search Report received for European Patent Application No. 18209460.7, dated Mar. 15, 2019, 4 pages.
European Search Report received for European Patent Application No. 18214698.5, dated Mar. 21, 2019, 5 pages.
European Search Report received for European Patent Application No. 20206196.6, dated Dec. 8, 2020, 4 pages.
European Search Report received for European Patent Application No. 20206197.4, dated Nov. 30, 2020, 4 pages.
European Search Report received for European Patent Application No. 20210373.5, dated Apr. 13, 2021, 4 pages.
European Search Report received for European Patent Application No. 21157252.4, dated Apr. 16, 2021, 4 pages.
European Search Report received for European Patent Application No. 21163791.3, dated May 6, 2021, 5 pages.
Examiner Initiated-Interview Summary received for U.S. Appl. No. 16/528,941, dated Dec. 1, 2020, 2 pages.
Examiner's Answer to Appeal Brief received for U.S. Appl. No. 15/995,040, dated Jun. 23, 2021, 31 pages.
Extended European Search Report (includes Supplementary European Search Report and Search Opinion) received for European Patent Application No. 17184710.6, dated Nov. 28, 2017, 10 pages.
Extended European Search Report received for European Patent Application No. 20168009.7, dated Sep. 11, 2020, 12 pages.
Extended Search Report received for European Patent Application 17809168.2, dated Jun. 28, 2018, 9 pages.
Final Office Action received for U.S. Appl. No. 15/268,115, dated Oct. 11, 2017, 48 pages.
Final Office Action received for U.S. Appl. No. 15/995,040, dated Oct. 17, 2019, 20 pages.
Final Office Action received for U.S. Appl. No. 15/995,040, dated Sep. 2, 2020, 21 pages.
Final Office Action received for U.S. Appl. No. 16/144,629, dated Sep. 11, 2020, 22 pages.
Final Office Action received for U.S. Appl. No. 16/144,629, dated Sep. 18, 2019, 22 pages.
Final Office Action received for U.S. Appl. No. 16/271,583, dated Aug. 26, 2020, 18 pages.
Final Office Action received for U.S. Appl. No. 16/528,941, dated Jul. 13, 2020, 15 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson, Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.

(56) References Cited

OTHER PUBLICATIONS

Hall, Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRKTg>, Jun. 19, 2018, 3 pages.
Hernández, Carlos, "Lens Blur in the New Google Camera App", Available online at: https://research.googleblog.com/2014/04/lens-blur-in-new-google-camera-app.html, https://ai.googleblog.com/2014/04/lens-blur-in-new-google-camera-app.html, Apr. 16, 2014, 6 pages.
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for Danish Patent Application No. PA201970593, dated Apr. 13, 2021, 2 pages.
Intention to Grant received for Danish Patent Application No. PA201970601, dated Sep. 21, 2020, 2 pages.
Intention to Grant received for Danish Patent Application No. PA201970603, dated Jan. 13, 2021, 2 pages.
Intention to Grant received for Danish Patent Application No. PA202070611, dated May 5, 2021, 2 pages.
Intention to Grant received for European Patent Application No. 15712218.5, dated Jan. 24, 2018, 7 pages.
Intention to Grant received for European Patent Application No. 17809168.2, dated Jun. 25, 2021, 8 pages.
Intention to Grant received for European Patent Application No. 18176890.4, dated Feb. 28, 2020, 8 pages.
Intention to Grant received for European Patent Application No. 18183054.8, dated Nov. 5, 2020, 6 pages.
Intention to Grant received for European Patent Application No. 18209460.7, dated Jan. 15, 2021, 8 pages.
Intention to Grant received for European Patent Application No. 18214698.5, dated Apr. 21, 2020, 8 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2017/035321, dated Dec. 27, 2018, 11 pages.
International Preliminary Report on Patentability received for PCT Patent Application No. PCT/US2019/017363, dated Aug. 20, 2020, 9 pages.
International Preliminary Report on Patentability received for PCT Patent Application No. PCT/US2019/049101, dated Mar. 25, 2021, 17 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2019/017363, dated Aug. 12, 2019, 12 pages.
International Search Report and Written Opinion received for PCT Patent Application No. PCT/US2019/049101, dated Dec. 16, 2019, 26 pages.
International Search Report and Written Opinion received for PCT Patent Application No. PCT/US2020/031643, dated Dec. 2, 2020, 33 pages.
International Search Report and Written Opinion received for PCT Patent Application No. PCT/US2020/031643, dated Nov. 2, 2020, 34 pages.
Invitation to Pay Additional Fees and Partial International Search Report received for PCT Patent Application No. PCT/US2019/049101, dated Oct. 24, 2019, 17 pages.
Invitation to Pay Additional Fees received for PCT Patent Application No. PCT/US2017/035321, dated Aug. 17, 2017, 3 pages.
Invitation to Pay Additional Fees received for PCT Patent Application No. PCT/US2019/017363, dated Jun. 17, 2019, 8 pages.
Invitation to Pay Additional Fees received for PCT Patent Application No. PCT/US2020/031643, dated Sep. 9, 2020, 30 pages.
IPhone User Guide for iOS 4.2 and 4.3 Software, Available at https://manuals.info.apple.com/MANUALS/1000/MA1539/en_US/iPhone_iOS4_User_Guide.pdf, 2011, 274 pages.
Johnson, Dave, "What is the Clips app on an iPhone?': How to use your iPhone's free video-editing app, and make custom videos for social media", Available online at: https://www.businessinsider.com/what-is-clips-on-iphone?IR=T, Oct. 26, 2019, 14 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Non-Final Office Action received for U.S. Appl. No. 14/869,807, dated Dec. 2, 2016, 23 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/995,040, dated Apr. 15, 2020, 19 pages.
Non-Final Office Action received for U.S. Appl. No. 15/995,040, dated May 16, 2019, 24 pages.
Non-Final Office Action received for U.S. Appl. No. 16/144,629, dated Mar. 13, 2020, 24 pages.
Non-Final Office Action received for U.S. Appl. No. 16/144,629, dated Mar. 29, 2019, 18 pages.
Non-Final Office Action received for U.S. Appl. No. 16/271,583, dated May 6, 2020, 24 pages.
Non-Final Office Action received for U.S. Appl. No. 16/271,583, dated Nov. 29, 2019, 18 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Non-Final Office Action received for U.S. Appl. No. 16/825,879, dated May 5, 2021, 12 pages.
Non-Final Office Action received for U.S. Appl. No. 17/027,317, dated Nov. 17, 2020, 17 pages.
Notice of Acceptance received for Australian Patent Application No. 2017286130, dated Apr. 26, 2019, 3 pages.
Notice of Acceptance received for Australian Patent Application No. 2019213341, dated Aug. 25, 2020, 3 pages.
Notice of Acceptance received for Australian Patent Application No. 2020267151, dated Dec. 9, 2020, 3 pages.
Notice of Acceptance received for Australian Patent Application No. 2020277216, dated Mar. 15, 2021, 3 pages.
Notice of Acceptance received for Australian Patent Application No. 2021201167, dated Mar. 15, 2021, 3 pages.

(56) References Cited

OTHER PUBLICATIONS

Notice of Allowance received for Brazilian Patent Application No. 112018074765-3, dated Oct. 8, 2019, 2 pages.
Notice of Allowance received for Chinese Patent Application No. 201580046237.6, dated Aug. 29, 2018, 4 pages.
Notice of Allowance received for Chinese Patent Application No. 201710657424.9, dated May 8, 2020, 2 pages.
Notice of Allowance received for Chinese Patent Application No. 201780002533.5, dated Apr. 14, 2020, 2 pages.
Notice of Allowance received for Chinese Patent Application No. 201810566134.8, dated Apr. 7, 2020, 3 pages.
Notice of Allowance received for Chinese Patent Application No. 201810664927.3, dated Jul. 19, 2019, 2 pages.
Notice of Allowance received for Chinese Patent Application No. 201811512767.7, dated Jul. 27, 2020, 4 pages.
Notice of Allowance received for Chinese Patent Application No. 202010287953.6, dated Mar. 18, 2021, 7 pages.
Notice of Allowance received for Chinese Patent Application No. 202010287961.0, dated Mar. 9, 2021, 8 pages.
Notice of Allowance received for Chinese Patent Application No. 202010287975.2, dated Mar. 1, 2021, 7 pages.
Notice of Allowance received for Japanese Patent Application No. 2018-171188, dated Jul. 16, 2019, 3 pages.
Notice of Allowance received for Korean Patent Application No. 10-2018-7026743, dated Mar. 20, 2019, 7 pages.
Notice of Allowance received for Korean Patent Application No. 10-2018-7028849, dated Feb. 1, 2019, 4 pages.
Notice of Allowance received for Korean Patent Application No. 10-2018-7034780, dated Jun. 19, 2019, 4 pages.
Notice of Allowance received for Korean Patent Application No. 10-2018-7036893, dated Jun. 12, 2019, 4 pages.
Notice of Allowance received for Korean Patent Application No. 10-2019-7027042, dated Nov. 26, 2020, 4 pages.
Notice of Allowance received for Korean Patent Application No. 10-2020-0052618, dated Mar. 23, 2021, 5 pages.
Notice of Allowance received for Korean Patent Application No. 10-2020-0143726, dated Nov. 10, 2020, 5 pages.
Notice of Allowance received for Korean Patent Application No. 10-2020-0155924, dated Nov. 23, 2020, 7 pages.
Notice of Allowance received for Taiwanese Patent Application No. 104107328, dated Jun. 12, 2017, 3 pages.
Notice of Allowance received for U.S. Appl. No. 16/528,941, dated May 19, 2021, 5 pages.
Notice of Allowance received for U.S. Appl. No. 14/641,251, dated May 18, 2016, 13 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 15/975,581, dated Oct. 3, 2018, 25 pages.
Notice of Allowance received for U.S. Appl. No. 16/191,117, dated Oct. 29, 2019, 9 pages.
Notice of Allowance received for U.S. Appl. No. 16/271,583, dated Apr. 14, 2021, 6 pages.
Notice of Allowance received for U.S. Appl. No. 16/271,583, dated Dec. 9, 2020, 6 pages.
Notice of Allowance received for U.S. Appl. No. 16/271,583, dated Jul. 23, 2021, 6 pages.
Notice of Allowance received for U.S. Appl. No. 16/271,583, dated May 10, 2021, 3 pages.
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Notice of Allowance received for U.S. Appl. No. 16/835,651, dated Jun. 1, 2021, 10 pages.
Notice of Allowance received for U.S. Appl. No. 17/027,317, dated Apr. 12, 2021, 7 pages.
Notice of Allowance received for U.S. Appl. No. 17/027,317, dated Jan. 13, 2021, 10 pages.
Notice of Allowance received for U.S. Appl. No. 17/027,484, dated May 3, 2021, 11 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action received for Australian Patent Application No. 2017286130, dated Jan. 21, 2019, 4 pages.
Office Action received for Australian Patent Application No. 2019213341, dated Jun. 30, 2020, 6 pages.
Office Action received for Australian Patent Application No. 2019218241, dated Apr. 1, 2021, 3 pages.
Office Action received for Australian Patent Application No. 2020100720, dated Jul. 9, 2020, 7 pages.
Office Action received for Australian Patent Application No. 2020100720, dated Sep. 1, 2020, 5 pages.
Office Action received for Australian Patent Application No. 2020277216, dated Dec. 17, 2020, 5 pages.
Office Action received for Chinese Patent Application No. 201580046237.6, dated Feb. 6, 2018, 10 pages.
Office Action received for Chinese Patent Application No. 201710657424.9, dated Sep. 17, 2019, 23 pages.
Office Action received for Chinese Patent Application No. 201780002533.5, dated Apr. 25, 2019, 17 pages.

(56) References Cited

OTHER PUBLICATIONS

Office Action received for Chinese Patent Application No. 201780002533.5, dated Feb. 3, 2020, 6 pages.
Office Action received for Chinese Patent Application No. 201780002533.5, dated Sep. 26, 2019, 21 pages.
Office Action received for Chinese Patent Application No. 201810566134.8, dated Aug. 13, 2019, 14 pages.
Office Action received for Chinese Patent Application No. 201810664927.3, dated Mar. 28, 2019, 11 pages.
Office Action received for Chinese Patent Application No. 201811446867.4, dated Dec. 31, 2019, 12 pages.
Office Action received for Chinese Patent Application No. 201811446867.4, dated May 6, 2020, 10 pages.
Office Action received for Chinese Patent Application No. 201811446867.4, dated Sep. 8, 2020, 9 pages.
Office Action received for Chinese Patent Application No. 201811512767.7, dated Dec. 20, 2019, 14 pages.
Office Action received for Chinese Patent Application No. 201811512767.7, dated Jun. 4, 2020, 6 pages.
Office Action received for Chinese Patent Application No. 202010287950.2, dated Feb. 20, 2021, 22 pages.
Office Action received for Chinese Patent Application No. 202010287953.6, dated Jan. 14, 2021, 14 pages.
Office Action received for Chinese Patent Application No. 202010287958.9, dated Jan. 5, 2021, 16 pages.
Office Action received for Chinese Patent Application No. 202010287961.0, dated Dec. 30, 2020, 16 pages.
Office Action received for Chinese Patent Application No. 202010287975.2, dated Dec. 30, 2020, 17 pages.
Office Action received for Chinese Patent Application No. 202010600151.6, dated Apr. 29, 2021, 11 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for Danish Patent Application No. PA201970592, dated Mar. 2, 2020, 5 pages.
Office Action received for Danish Patent Application No. PA201970592, dated Oct. 26, 2020, 5 pages.
Office Action received for Danish Patent Application No. PA201970593, dated Apr. 16, 2020, 2 pages.
Office Action received for Danish Patent Application No. PA201970593, dated Feb. 2, 2021, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Aug. 13, 2020, 3 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970603, dated Nov. 4, 2020, 3 pages.
Office Action received for Danish Patent Application No. PA201970605, dated Mar. 10, 2020, 5 pages.
Office Action received for Danish Patent Application No. PA202070611, dated Dec. 22, 2020, 7 pages.
Office Action received for European Patent Application No. 17809168.2, dated Jan. 7, 2020, 5 pages.
Office Action received for European Patent Application No. 17809168.2, dated Oct. 8, 2020, 4 pages.
Office Action received for European Patent Application No. 15712218.5, dated Aug. 3, 2017, 4 pages.
Office Action received for European Patent Application No. 17184710.6, dated Dec. 21, 2018, 7 pages.
Office Action received for European Patent Application No. 18176890.4, dated Oct. 16, 2018, 8 pages.
Office Action received for European Patent Application No. 18183054.8, dated Feb. 24, 2020, 6 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18209460.7, dated Apr. 21, 2020, 5 pages.
Office Action received for European Patent Application No. 18214698.5, dated Apr. 2, 2019, 8 pages.
Office Action received for European Patent Application No. 20168009.7, dated Apr. 20, 2021, 6 pages.
Office Action received for European Patent Application No. 20206196.6, dated Jan. 13, 2021, 10 pages.
Office Action received for European Patent Application No. 20206197.4, dated Jan. 12, 2021, 9 pages.
Office Action received for European Patent Application No. 20210373.5, dated May 10, 2021, 9 pages.
Office Action received for European Patent Application No. 21157252.4, dated Apr. 23, 2021, 8 pages.
Office Action received for European Patent Application No. 21163791.3, dated Jun. 2, 2021, 8 pages.
Office Action received for Japanese Patent Application No. 2018-225131, dated Aug. 17, 2020, 21 pages.
Office Action received for Japanese Patent Application No. 2018-225131, dated Mar. 4, 2019, 10 pages.
Office Action received for Japanese Patent Application No. 2018-545502, dated Aug. 17, 2020, 14 pages.
Office Action received for Japanese Patent Application No. 2020-070418, dated Aug. 3, 2020, 22 pages.
Office Action received for Japanese Patent Application No. 2020-184470, dated May 10, 2021, 3 pages.
Office Action received for Japanese Patent Application No. 2020-184471, dated May 10, 2021, 3 pages.
Office Action received for Korean Patent Application No. 10-2018-7026743, dated Jan. 17, 2019, 5 pages.
Office Action received for Korean Patent Application No. 10-2018-7034780, dated Apr. 4, 2019, 11 pages.
Office Action received for Korean Patent Application No. 10-2018-7036893, dated Apr. 9, 2019, 6 pages.
Office Action received for Korean Patent Application No. 10-2019-7027042, dated May 13, 2020, 6 pages.

(56) References Cited

OTHER PUBLICATIONS

Office Action received for Korean Patent Application No. 10-2020-0052618, dated Aug. 18, 2020, 11 pages.
Office Action received for Korean Patent Application No. 10-2021-0022053, dated Mar. 1, 2021, 11 pages.
Office Action received for Korean Patent Application No. 10-2021-7000954, dated Jan. 28, 2021, 5 pages.
Office Action received for Taiwanese Patent Application No. 104107328, dated Dec. 28, 2016, 4 pages.
Osxdaily, "How to Zoom the Camera on iPhone", Available Online at: https://osxdaily.com/2012/04/18/zoom-camera-iphone/, Apr. 18, 2012, 6 pages.
Peckham, James, "What is Apple Clips? Plus we teach you how to use it", Available online at: https://www.techradar.com/how-to/what-is-apple-clips-and-how-to-use-it, Jul. 20, 2017, 11 pages.
PlayMemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
PreAppeal Review Report received for Japanese Patent Application No. 2018-225131, dated Jan. 24, 2020, 8 pages.
PreAppeal Review Report received for Japanese Patent Application No. 2018-545502, dated Jan. 24, 2020, 8 pages.
Remote Shot for SmartWatch 2, Available online at:—https://play.google.com/store/apps/details?id=net.watea.sw2.rshot&hl=en, Nov. 21, 2017, 3 pages.
Result of Consultation received for European Patent Application No. 17184710.6, dated Feb. 21, 2020, 6 pages.
Result of Consultation received for European Patent Application No. 17184710.6, dated Feb. 28, 2020, 3 pages.
Ritchie, Rene, "Clips app: The ultimate guide", Available online at: https://www.imore.com/clips, May 13, 2017, 16 pages.
Schiffhauer, Alexander, "See the Light with Night Sight", Available online at: https://www.blog.google/products/pixel/see-light-night-sight, Nov. 14, 2018, 6 pages.
Search Report and Opinion received for Danish Patent Application No. PA201870623, dated Dec. 20, 2018, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Shaw et al., "Skills for Closeups Photography", Watson-Guptill Publications, Nov. 1999, 5 pages.
shiftdelete.net, "Oppo Reno 10x Zoom Ön Inceleme—Huawei P30 Pro'ya rakip mi geliyor?", Available online at <https://www.youtube.com/watch?v=ev2wIUztdrg>, See especially 5:34-6:05., Apr. 24, 2019, 2 pages.
Smart Reviews, "Honor10 AI Camera's In Depth Review", See Especially 2:37-2:48; 6:39-6:49, Available Online at <https://www.youtube.com/watch?v=oKFqRvxeDBQ>, May 31, 2018, 2 pages.
Sony Xperia XZ3 Camera Review—The Colors, Duke, The Colors!, Android Headlines—Android News & Tech News, Available online at <https://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102, 2018, 121 pages.
Summons to Attend Oral Proceedings received for European Patent Application No. 17184710.6, mailed on Sep. 17, 2019, 7 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Techsmith, "Snagit® 11 Snagit 11.4 Help", available at <http://assets.techsmith.com/Downloads/ua-tutorials-snagit-11/Snagit_11.pdf>, Jan. 2014, 146 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Travel Tech Sports Channel, "New WhatsApp update—voice message recording made easy—Want to record long voice messages", Available Online at: https://www.youtube.com/watch?v=SEviqgsAdUk, Nov. 30, 2017, 13 pages.
Vivo India, "Bokeh Mode | Vivo V9", Available Online at <https://www.youtube.com/watch?v=B5AIHhH5Rxs>, Mar. 25, 2018, 3 pages.
Wong, Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Xeetechcare, "Samsung Galaxy S10—Super Night Mode & Ultra-Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Corrected Notice of Allowance received for U.S. Appl. No. 16/144,629, dated Aug. 24, 2022, 6 pages.
Non-Final Office Action received for U.S. Appl. No. 17/479,897, dated Aug. 30, 2022, 10 pages.
Office Action received for Japanese Patent Application No. 2020-542592, dated Aug. 1, 2022, 5 pages (2 pages of English Translation and 3 pages of Official Copy).
Applicant-Initiated Interview Summary received for U.S. Appl. No. 17/479,897, dated Oct. 31, 2022, 3 pages.
Office Action received for Chinese Patent Application No. 202110766668.7, dated Sep. 15, 2022, 18 pages (9 pages of English Translation and 9 pages of Official Copy).
Office Action received for Korean Patent Application No. 10-2021-7006145, dated Oct. 12, 2022, 14 pages (6 pages of English Translation and 8 pages of Official Copy).
Drunk Beauty Flower Digital Technology, "iPhone XS Max Camera Tips, Tricks, Features and Complete Tutorial", Available online at: https://www.ixigua.com/6606874981844386308?wid_try=1, Oct. 2, 2018, 2 pages (Official Copy Only). {See communication under 37 CFR § 1.98(a) (3)}.
Final Office Action received for U.S. Appl. No. 15/995,040, dated Oct. 6, 2022, 27 pages.
Notice of Allowance received for Japanese Patent Application No. 2021-565919, dated Oct. 3, 2022, 3 pages (1 page of English Translation and 2 of pages Official Copy).
Notice of Allowance received for U.S. Appl. No. 17/740,032, dated Oct. 13, 2022, 11 pages.
Office Action received for Brazilian Patent Application No. BR122018076550-0, dated Sep. 28, 2022, 7 pages (1 page of English Translation and 6 pages of Official Copy).
Office Action received for Indian Patent Application No. 202215010325, dated Oct. 10, 2022, 7 pages.
Shareit, "WhatsApp Easy Way to Record Long Voice Messages—New Update", Retrieved from Internet: <https://www.youtube.com/watch?v=3MVnYGt8v1I>, Apr. 7, 2018, 39 pages.
Intention to Grant received for European Patent Application No. 21733324.4, dated Sep. 13, 2022, 7 pages.
Office Action received for European Patent Application No. 21163791.3, dated Sep. 20, 2022, 6 pages.

(56) References Cited

OTHER PUBLICATIONS

Notice of Acceptance received for Australian Patent Application No. 2020239717, dated Jun. 1, 2022, 3 pages.
Notice of Acceptance received for Australian Patent Application No. 2022202377, dated May 11, 2022, 3 pages.
Office Action received for European Patent Application No. 19707557.5, dated Jun. 3, 2022, 5 pages.
Office Action received for European Patent Application No. 20210373.5, dated May 31, 2022, 5 pages.
Applicant-Initiated Interview Summary received for U.S. Appl. No. 15/995,040, dated Aug. 2, 2022, 5 pages.
Notice of Allowance received for Japanese Patent Application No. 2020-159338, dated Jul. 19, 2022, 3 pages (1 page of English Translation and 2 pages of Official Copy).
Notice of Allowance received for U.S. Appl. No. 16/144,629, dated Jul. 25, 2022, 10 pages.
Notice of Acceptance received for Australian Patent Application No. 2019338180, dated Jun. 27, 2022, 3 pages.
Notice of Allowance received for Korean Patent Application No. 10-2020-7022663, dated Jun. 23, 2022, 6 pages (2 pages of English Translation and 4 pages of Official Copy).
Office Action received for Indian Patent Application No. 202118028159, dated Jun. 27, 2022, 6 pages.
Office Action received for European Patent Application No. 20206196.6, dated Aug. 10, 2022, 13 pages.
Office Action received for Korean Patent Application No. 10-2022-7023077, dated Jul. 25, 2022, 6 pages (2 pages of English Translation and 4 pages of Official Copy).
Applicant Initiated Interview Summary received for U.S. Appl. No. 17/190,879, dated Oct. 26, 2021, 3 pages.
Applicant-Initiated Interview Summary received for U.S. Appl. No. 16/528,257, dated Nov. 18, 2021, 2 pages.
Applicant-Initiated Interview Summary received for U.S. Appl. No. 17/220,596, dated Aug. 18, 2021, 3 pages.
Corrected Notice of Allowance received for U.S. Appl. No. 16/144,629, dated Apr. 21, 2022, 5 pages.
Corrected Notice of Allowance received for U.S. Appl. No. 16/528,257, dated Feb. 3, 2022, 2 pages.
Corrected Notice of Allowance received for U.S. Appl. No. 17/190,879, dated Nov. 19, 2021, 2 pages.
Corrected Notice of Allowance received for U.S. Appl. No. 17/220,596, dated Nov. 4, 2021, 3 pages.
Corrected Notice of Allowance received for U.S. Appl. No. 17/220,596, dated Nov. 18, 2021, 27 pages.
Corrected Notice of Allowance received for U.S. Appl. No. 17/354,376, dated Apr. 11, 2022, 5 pages.
Corrected Notice of Allowance received for U.S. Appl. No. 17/354,376, dated Feb. 16, 2022, 5 pages.
Corrected Notice of Allowance received for U.S. Appl. No. 17/354,376, dated Mar. 23, 2022, 6 pages.
Decision on Appeal received for U.S. Appl. No. 15/995,040, dated Dec. 29, 2021, 14 pages.
Decision on Appeal received for U.S. Appl. No. 16/144,629, dated Jan. 18, 2022, 8 pages.
Decision to Grant received for European Patent Application No. 17809168.2, dated Oct. 21, 2021, 3 pages.
Decision to Grant received for Japanese Patent Application No. 2019-203399, dated Oct. 20, 2021, 3 pages (1 page of English Translation and 2 pages of Official Copy).
Examiner-Initiated Interview Summary received for U.S. Appl. No. 17/220,596, dated Oct. 7, 2021, 2 pages.
International Preliminary Report on Patentability received for PCT Patent Application No. PCT/US2020/031643, dated Nov. 18, 2021, 27 pages.
International Search Report and Written Opinion received for PCT Patent Application No. PCT/US2021/034304, dated Oct. 11, 2021, 24 pages.
International Search Report and Written Opinion received for PCT Patent Application No. PCT/US2021/046877, dated Mar. 1, 2022, 17 pages.
Invitation to Pay Additional Fees received for PCT Patent Application No. PCT/US2021/046877, dated Jan. 5, 2022, 10 pages.
Non-Final Office Action received for U.S. Appl. No. 15/995,040, dated Apr. 8, 2022, 21 pages.
Non-Final Office Action received for U.S. Appl. No. 17/190,879, dated Oct. 13, 2021, 10 pages.
Non-Final Office Action received for U.S. Appl. No. 17/220,596, dated Jun. 10, 2021, 31 pages.
Notice of Acceptance received for Australian Patent Application No. 2019218241, dated Mar. 9, 2022, 3 pages.
Notice of Acceptance received for Australian Patent Application No. 2020260413, dated Oct. 14, 2021, 3 pages.
Notice of Acceptance received for Australian Patent Application No. 2021254567, dated Nov. 17, 2021, 3 pages.
Notice of Acceptance received for Australian Patent Application No. 2022200966, dated Feb. 25, 2022, 3 pages.
Notice of Allowance received for Chinese Patent Application No. 202010287950.2, dated Mar. 22, 2022, 7 pages (03 pages of English Translation and 04 pages of Official Copy).
Notice of Allowance received for Chinese Patent Application No. 202010600197.8, dated Feb. 9, 2022, 5 pages (1 page of English Translation and 4 pages of Official Copy).
Notice of Allowance received for Chinese Patent Application No. 202010601484.0, dated Nov. 23, 2021, 2 pages (1 page of English Translation and 1 page of Official Copy).
Notice of Allowance received for Chinese Patent Application No. 202011480411.7, dated Feb. 18, 2022, 6 pages (3 pages of English Translation and 3 pages of Official Copy).
Notice of Allowance received for Korean Patent Application No. 10-2021-0022053, dated Nov. 23, 2021, 5 pages (2 pages of English Translation and 3 pages of Official Copy).
Notice of Allowance received for Korean Patent Application No. 10-2021-7035687, dated Dec. 30, 2021, 5 pages (1 page of English Translation and 4 pages of Official Copy).
Notice of Allowance received for Korean Patent Application No. 10-2021-7036337, dated Apr. 5, 2022, 4 pages (1 page of English Translation and 3 pages of Official Copy).
Notice of Allowance received for U.S. Appl. No. 16/144,629, dated Apr. 7, 2022, 8 pages.
Notice of Allowance received for U.S. Appl. No. 16/528,257, dated Jan. 14, 2022, 10 pages.
Notice of Allowance received for U.S. Appl. No. 16/835,651, dated Nov. 10, 2021, 9 pages.
Notice of Allowance received for U.S. Appl. No. 17/190,879, dated Nov. 10, 2021, 8 pages.
Notice of Allowance received for U.S. Appl. No. 17/220,596, dated Oct. 21, 2021, 43 pages.
Notice of Allowance received for U.S. Appl. No. 17/354,376, dated Jan. 27, 2022, 10 pages.
Notice of Allowance received for U.S. Appl. No. 17/354,376, dated Mar. 4, 2022, 5 pages.
Notice of Allowance received for U.S. Appl. No. 17/354,376, dated Mar. 30, 2022, 5 pages.
Office Action received for Australian Patent Application No. 2019338180, dated Feb. 18, 2022, 3 pages.
Office Action received for Australian Patent Application No. 2020239717, dated Dec. 15, 2021, 6 pages.
Office Action received for Australian Patent Application No. 2020239717, dated Mar. 16, 2022, 4 pages.
Office Action received for Australian Patent Application No. 2021107587, dated Feb. 1, 2022, 6 pages.
Office Action received for Chinese Patent Application No. 202010287950.2, dated Nov. 19, 2021, 8 pages (5 pages of English Translation and 3 pages of Official Copy).
Office Action received for Chinese Patent Application No. 202011480411.7, dated Jan. 12, 2022, 7 pages (4 pages of English Translation and 3 pages of Official Copy).
Office Action received for Chinese Patent Application No. 202110766668.7, dated Feb. 16, 2022, 12 pages (6 pages of English Translation and 6 pages of Official Copy).
Office Action received for Chinese Patent Application No. 202180002106.3, dated Feb. 16, 2022, 12 pages (6 pages of English Translation and 6 pages of Official Copy).

(56) References Cited

OTHER PUBLICATIONS

Office Action received for European Patent Application No. 20206197. 4, dated Mar. 18, 2022, 7 pages.
Office Action received for European Patent Application No. 20210373. 5, dated Dec. 9, 2021, 7 pages.
Office Action received for Indian Patent Application No. 201818025015, dated Feb. 4, 2022, 7 pages.
Office Action received for Indian Patent Application No. 201818045872, dated Oct. 13, 2021, 7 pages.
Office Action received for Indian Patent Application No. 201818046896, dated Feb. 2, 2022, 7 pages.
Office Action received for Indian Patent Application No. 202014041530, dated Dec. 8, 2021, 7 pages.
Office Action received for Indian Patent Application No. 202118021941, dated Mar. 23, 2022, 5 pages.
Office Action received for Japanese Patent Application No. 2020-159338, dated Dec. 8, 2021, 9 pages (5 pages of English Translation and 4 pages of Official Copy).
Office Action received for Korean Patent Application No. 10-2021-7036337, dated Dec. 8, 2021, 6 pages (2 pages of English Translation and 4 pages of Official Copy).
Record of Oral Hearing received for U.S. Appl. No. 16/144,629, mailed on Jan. 28, 2022, 13 pages.
Demetriou Soteris, "Analyzing & Designing the Security of Shared Resources on Smartphone Operating Systems", Dissertation, University of Illinois at Urbana—Champaign Online available at: https://www.ideals.illinois.edu/bitstream/handle/2142/100907/DEMETRIOU-DISSERTATION-2018.pdf?sequence=1&isAllowed=n, 2018, 211 pages.
Dutta Tushars., "Warning! iOS Apps with Camera Access Permission Can Spy on You", Online available at: https://web.archive.org/web/20180219092123/https://techviral.net/ios-apps-camera-can-spy/, Feb. 19, 2018, 3 pages.
King Juliea., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
Sigdel Prakash, "How to record WhatsApp voice massage without continue holding down button", Available Online at: https://www.youtube.com/watch?v=m3Hz6TXt0PA, Dec. 6, 2017, 9 pages.
Tech Stuff, "Telegram 4.0: Video Messages +Telescope, Payments and more . . . ", Available Online at: https://www.youtube.com/watch?v=y0aIJRPH7nQ, May 19, 2017, 46 pages.
Whitacre Michele, "Photography 101 | Exposure Meter", Online available at: https://web.archive.org/web/20160223055834/http://www.michelewhitacrephotographyblog.com, Feb. 23, 2016, 4 pages.
Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.
Certificate of Examination received for Australian Patent Application No. 2021107587, dated Apr. 29, 2022, 2 pages.
Intention to Grant received for European Patent Application No. 20168009.7, dated May 17, 2022, 9 pages.
Notice of Allowance received for Chinese Patent Application No. 202180002106.3, dated May 5, 2022, 6 pages (3 pages of English Translation and 3 pages of Official Copy).
Notice of Allowance received for Japanese Patent Application No. 2021-510849, dated May 16, 2022, 4 pages (1 page of English Translation and 3 pages of Official Copy).
101931691, CN, A, Cited by Office Action received for Chinese Patent Application No. 202010600197.8, dated Feb. 9, 2022.
105338256, CN, A, Cited by Office Action received for Chinese Patent Application No. 202010287950.2, dated Mar. 22, 2022.
106791357, CN, A, Cited by Office Action received for Chinese Patent Application No. 202010287950.2, dated Mar. 22, 2022.
106791420, CN, A, Cited by Office Action received for Indian Patent Application No. 202180002106.3, dated Feb. 16, 2022.

Corrected Notice of Allowance received for U.S. Appl. No. 16/144,629, dated Jun. 23, 2022, 5 pages.
Office Action received for Japanese Patent Application No. 2021-565919, dated Jun. 13, 2022, 4 pages (2 pages of English Translation and 2 pages of Official Copy).
Office Action received for Korean Patent Application No. 10-2022-7010505, dated Jun. 14, 2022, 5 pages (2 pages of English Translation and 3 pages of Official Copy).
Notice of Allowance received for Japanese Patent Application No. 2020-542592, dated Nov. 14, 2022, 2 pages (1 page of English Translation and 1 page of Official Copy).
Office Action received for Australian Patent Application No. 2022204465, dated Mar. 10, 2023, 4 pages.
Office Action received for Chinese Patent Application No. 201980012481.9, dated Jan. 12, 2023, 18 pages (9 pages of English Translation and 9 pages of Official Copy).
Decision to Grant received for Japanese Patent Application No. 2021-187533, dated Sep. 28, 2023, 3 pages (1 page of English Translation and 2 pages of Official Copy).
Notice of Allowance received for U.S. Appl. No. 17/479,897, dated Oct. 3, 2023, 5 pages.
Office Action received for Australian Patent Application No. 2022228121, dated Sep. 20, 2023, 3 pages.
2010-117444, JP, A, Cited by the Japanese Patent Office in an Office Action for related Patent Application No. 2021-187533 dated Feb. 6, 2023.
2015-25897, JP, A, Cited by the Japanese Patent Office in an Office Action for related Patent Application No. 2021-187533 dated Feb. 6, 2023.
2016-175175, JP, A, Cited by the Japanese Patent Office in an Office Action for related Patent Application No. 2021-187533 dated Feb. 6, 2023.
2018-121235, JP, A, Cited by the European Patent Office in an Office Action for related Patent Application No. 19769316.1 dated Jan. 12, 2023.
2019-203399, JP, A, Cited by the Japanese Patent Office in an Office Action for related Patent Application No. 2021-187533 dated Jun. 26, 2023.
2020-42602, JP, A, Cited by the Japanese Patent Office in an Office Action for related Patent Application No. 2021-187533 dated Feb. 6, 2023.
"Iphone 4S Original Secrets", 15 pages, Cited in Chinese Patent Office in an Office Action for related Patent Application No. 201811446867.4 dated Apr. 26, 2023.
Notice of Acceptance received for Australian Patent Application No. 2022221466, dated Aug. 31, 2023, 3 pages.
Notice of Allowance received for Korean Patent Application No. 10-20213-7009943, dated Aug. 31, 2023, 7 pages (2 pages of English Translation and 5 pages of Officiaf Copy).
Office Action received for Japanese Patent Application No. 2022-130725, dated Sep. 4, 2023, 2 pages (1 page of Engiish Translation and 1 page of Official Copy).
Corrected Notice of Allowance received for U.S. Appl. No. 17/479,897, dated Aug. 17, 2023, 2 pages.
Non-Final Office Action received for U.S. Appl. No. 18/114,880, dated Aug. 29, 2023, 10 pages.
Office Action received for Australian Patent Application No. 2022228191, dated Aug. 16, 2023, 4 pages.
Office Action received for Chinese Patent Application No. 201980012481.9, dated Jun. 8, 2023, 16 pages (9 pages of English Translation and 7 pages of Official Copy).
Applicant-Initiated Interview Summary received for U.S. Appl. No. 15/995,040, dated Nov. 18, 2022, 5 pages.
Applicant-Initiated Interview Summary received for U.S. Appl. No. 17/041,412, dated Jan. 31, 2023, 7 pages.
Applicant-Initiated Interview Summary received for U.S. Appl. No. 17/479,897, dated Jun. 12, 2023, 2 pages.
Board Decision received for Chinese Patent Application No. 201811446867.4, dated Apr. 26, 2023, 21 pages (05 pages of English Translation and 16 pages of Official copy).
Board Opinion received for Chinese Patent Application No. 201811446867.4, dated Feb. 14, 2023, 11 pages (4 pages of English Translation and 7 pages of Official Copy).

(56) References Cited

OTHER PUBLICATIONS

Computerhilfen, "Whatsapp: Voice Message without Holding the Button", Retrieved from Internet: <https://www.youtube.com/watch?v=ofFCKvs5URw>, Jan. 14, 2018, 9 pages.
Corrected Notice of Allowance received for U.S. Appl. No. 17/041,412, dated Apr. 12, 2023, 2 pages.
Corrected Notice of Allowance received for U.S. Appl. No. 17/041,412, dated Mar. 23, 2023, 7 pages.
Corrected Notice of Allowance received for U.S. Appl. No. 17/041,412, dated Mar. 31, 2023, 6 pages.
Corrected Notice of Allowance received for U.S. Appl. No. 17/041,412, dated May 17, 2023, 2 pages.
Corrected Notice of Allowance received for U.S. Appl. No. 17/510,168, dated Mar. 16, 2023, 2 pages.
Corrected Notice of Allowance received for U.S. Appl. No. 17/510,168, dated Mar. 29, 2023, 2 pages.
Corrected Notice of Allowance received for U.S. Appl. No. 17/566,094, dated Feb. 8, 2023, 2 pages.
Corrected Notice of Allowance received for U.S. Appl. No. 17/566,094, dated Jan. 5, 2023, 2 pages.
Corrected Notice of Allowance received for U.S. Appl. No. 17/566,094, dated Jan. 23, 2023, 2 pages.
Corrected Notice of Allowance received for U.S. Appl. No. 17/566,094, dated Mar. 7, 2023, 2 pages.
Corrected Notice of Allowance received for U.S. Appl. No. 17/740,032, dated Feb. 15, 2023, 6 pages.
Corrected Notice of Allowance received for U.S. Appl. No. 17/740,032, dated Nov. 3, 2022, 6 pages.
Decision to Grant received for European Patent Application No. 20168009.7, dated Jun. 22, 2023, 4 pages.
Decision to Grant received for European Patent Application No. 20210373.5, dated May 19, 2023, 4 pages.
Decision to Grant received for European Patent Application No. 21733324.4, dated Jun. 2, 2023, 3 pages.
Extended European Search Report received for European Patent Application No. 23173036.7, dated Jul. 24, 2023, 13 pages.
Final Office Action received for U.S. Appl. No. 17/479,897, dated Jan. 10, 2023, 15 pages.
Hearing Notice received for Indian Patent Application No. 201817024430, mailed on Apr. 6, 2023, 2 pages.
Intention to Grant received for European Patent Application No. 20168009.7, dated Feb. 28, 2023, 10 pages.
Intention to Grant received for European Patent Application No. 20168009.7, dated Oct. 31, 2022, 9 pages.
Intention to Grant received for European Patent Application No. 20206197.4, dated Dec. 15, 2022, 10 pages.
Intention to Grant received for European Patent Application No. 20206197.4, dated May 25, 2023, 9 pages.
Intention to Grant received for European Patent Application No. 20210373.5, dated Jan. 10, 2023, 12 pages.
Intention to Grant received for European Patent Application No. 21733324.4, dated Jan. 9, 2023, 9 pages.
International Preliminary Report on Patentability received for PCT Patent Application No. PCT/US2021/034304, dated Dec. 15, 2022, 19 pages.
International Preliminary Report on Patentability received for PCT Patent Application No. PCT/US2021/046877, dated Apr. 6, 2023, 12 pages.
International Search Report and Written Opinion received for PCT Patent Application No. PCT/US2022/050916, dated May 15, 2023, 23 pages.
Invitation to Pay Additional Fee received for PCT Patent Application No. PCT/US2022/050916, dated Mar. 23, 2023, 16 pages.
Non-Final Office Action received for U.S. Appl. No. 15/995,040, dated Jun. 7, 2023, 26 pages.
Non-Final Office Action received for U.S. Appl. No. 17/041,412, dated Dec. 5, 2022, 13 pages.
Non-Final Office Action received for U.S. Appl. No. 17/479,897, dated Apr. 25, 2023, 14 pages.
Non-Final Office Action received for U.S. Appl. No. 17/510,168, dated Dec. 6, 2022, 11 pages.
Notice of Acceptance received for Australian Patent Application No. 2021290292, dated Jan. 23, 2023, 3 pages.
Notice of Acceptance received for Australian Patent Application No. 2022204465, dated May 26, 2023, 3 pages.
Notice of Allowance received for Brazilian Patent Application No. BR122018076550-0, dated Jan. 3, 2022, 3 pages (1 page of English Translation and 2 pages of Official Copy).
Notice of Allowance received for Korean Patent Application No. 10-2020-0124139, dated Jun. 19, 2023, 7 pages (2 pages of English Translation and 5 pages of Official Copy).
Notice of Allowance received for Korean Patent Application No. 10-2021-7006145, dated Mar. 6, 2023, 5 pages (2 pages of English Translation and 3 pages of Official Copy).
Notice of Allowance received for Korean Patent Application No. 10-2022-7010505, dated Dec. 26, 2022, 7 pages (2 pages of English Translation and 5 pages of Official Copy).
Notice of Allowance received for Korean Patent Application No. 10-2022-7023077, dated Nov. 1, 2022, 8 pages (2 pages of English Translation and 6 pages of Official Copy).
Notice of Allowance received for Korean Patent Application No. 10-2022-7033119, dated Jul. 26, 2023, 7 pages (2 pages of English Translation and 5 pages of Official Copy).
Notice of Allowance received for U.S. Appl. No. 17/041,412, dated Apr. 26, 2023, 11 pages.
Notice of Allowance received for U.S. Appl. No. 17/041,412, dated Mar. 15, 2023, 13 pages.
Notice of Allowance received for U.S. Appl. No. 17/479,897, dated Jul. 26, 2023, 7 pages.
Notice of Allowance received for U.S. Appl. No. 17/510,168, dated Feb. 13, 2023, 10 pages.
Notice of Allowance received for U.S. Appl. No. 17/510,168, dated May 3, 2023, 10 pages.
Notice of Allowance received for U.S. Appl. No. 17/566,094, dated Feb. 23, 2023, 8 pages.
Notice of Allowance received for U.S. Appl. No. 17/566,094, dated Nov. 22, 2022, 10 pages.
Notice of Allowance received for U.S. Appl. No. 17/732,191, dated Feb. 27, 2023, 12 pages.
Notice of Allowance received for U.S. Appl. No. 17/732,191, dated Nov. 9, 2022, 12 pages.
Notice of Allowance received for U.S. Appl. No. 17/740,032, dated Feb. 1, 2023, 9 pages.
Notice of Hearing received for Indian Patent Application No. 201818046896, mailed on Jul. 11, 2023, 2 pages.
Office Action received for Australian Patent Application No. 2021290292, dated Nov. 24, 2022, 2 pages.
Office Action received for Australian Patent Application No. 2022221466, dated Jun. 16, 2023, 2 pages.
Office Action received for Australian Patent Application No. 2022228121, dated Jul. 7, 2023, 3 pages.
Office Action received for Chinese Patent Application No. 202110766668.7, dated Jan. 20, 2023, 11 pages (6 pages of English Translation and 5 pages of Official Copy).
Office Action received for Chinese Patent Application No. 202110766668.7, dated Jun. 7, 2023, 13 pages (9 pages of English Translation and 4 pages of Official Copy).
Office Action received for Chinese Patent Application No. 202210849242.2, dated Jan. 20, 2023, 12 pages (6 pages of English Translation and 6 pages of Official Copy).
Office Action received for European Patent Application No. 19769316.1, dated Jan. 12, 2023, 10 pages.
Office Action received for European Patent Application No. 21157252.4, dated Jul. 24, 2023, 5 pages.
Office Action received for Indian Patent Application No. 202117009020, dated Feb. 6, 2023, 7 pages.
Office Action received for Japanese Patent Application No. 2021-187533, dated Feb. 6, 2023, 7 pages (4 pages of English Translation and 3 pages of Official Copy).
Office Action received for Japanese Patent Application No. 2021-187533, dated Jun. 26, 2023, 6 pages (3 pages of English Translation and 3 pages of Official Copy).

(56) References Cited

OTHER PUBLICATIONS

Office Action received for Korean Patent Application No. 10-2020-0124139, dated Jan. 17, 2023, 10 pages (5 pages of English Translation and 5 pages of Official Copy).
Office Action received for Korean Patent Application No. 10-2022-7033119, dated Mar. 29, 2023, 5 pages (2 pages of English Translation and 3 pages of Official Copy).
Summons to Attend Oral Proceedings received for European Patent Application No. 21163791.3, mailed on May 3, 2023, 6 pages.
Summons to Oral Proceedings received for European Patent Application No. 17184710.6, mailed on May 10, 2023, 3 pages.
Yuan Ye, "Iphone 4s Original Secrets", China Railway Press, 2012, 15 pages (Official Copy Only). See Communication under 37 CFR § 1.98(a) (3).
Junxiang, Zhang, "Playing My New iPad", The Publishing House of Ordinance Industry, Sep. 30, 2012, pp. 217-219 (Official Copy only) See Communication Under Rule 37 CFR § 1.98(a) (3).
Office Action received for Chinese Patent Application No. 201980012481.9, mailed on Nov. 21, 2023, 18 pages (10 pages of English Translation and 8 pages of Official Copy).
3-129573 JP A, Cited by Japanese Patent Office Action for related Patent Application No. 20224395182 on Sep. 25, 2023.
6-215092 JP A, Cited by Japanese Patent Office Action for related Patent Application No. 20224395182 on Sep. 25, 2023.
9-179998 JP A, Cited by Japanese Patent Office Action for related Patent Application No. 20224395182 on Sep. 25, 2023.
2010-211166 JP A, Cited by Japanese Patent Office Action for related Patent Application No. 2022-145387 on Oct. 2, 2023.
2016-39613 JP A, Cited by Japanese Patent Office Action for related Patent Application No. 2022-095182 on Sep. 25, 2023.
Notice of Allowance received for Japanese Patent Application No. 2022-095182, mailed on Feb. 5, 2024, 4 pages.
Office Action received for Japanese Patent Application No. 2022-199433, mailed on Jan. 29, 2024, 6 pages.
Office Action received for Korean Patent Application No. 10-2023-7016569, mailed on Jan. 22, 2024, 10 pages.
Applicant-Initiated Interview Summary received for U.S. Appl. No. 17/546,968, mailed on Jan. 16, 2024, 3 pages.
Brief Communication Regarding Oral Proceedings received for European Patent Application No. 21163791.3, mailed on Nov. 7, 2023, 4 pages.
Corrected Notice of Allowance received for U.S. Appl. No. 18/121,458, mailed on Jan. 18, 2024, 2 pages.
Decision to Grant received for European Patent Application No. 20206197.4, mailed on Oct. 6, 2023, 4 pages.
Decision to Grant received for Japanese Patent Application No. 2022-130725, mailed on Dec. 11, 2023, 2 pages.
Decision to Refuse received for European Patent Application No. 21163791.3, mailed on Dec. 4, 2023, 16 pages.
Intention to Grant received for European Patent Application No. 20206196.6, mailed on Nov. 10, 2023, 10 pages.
Minutes of the Oral Proceedings received for European Patent Application No. 21163791.3, mailed on Dec. 1, 2023, 6 pages.
Non-Final Office Action received for U.S. Appl. No. 17/546,968, mailed on Nov. 24, 2023, 34 pages.
Non-Final Office Action received for U.S. Appl. No. 18/196,997, mailed on Nov. 20, 2023, 12 pages.
Notice of Acceptance received for Australian Patent Application No. 2022228121, mailed on Dec. 13, 2023, 3 pages.
Notice of Acceptance received for Australian Patent Application No. 2022228191, mailed on Oct. 10, 2023, 3 pages.
Notice of Allowance received for U.S. Appl. No. 18/114,880, mailed on Nov. 15, 2023, 11 pages.
Notice of Allowance received for U.S. Appl. No. 18/121,458, mailed on Dec. 6, 2023, 9 pages.
Notice of Hearing received for Indian Patent Application No. 201818045872, mailed on Nov. 16, 2023, 2 pages.
Notice of Hearing received for Indian Patent Application No. 202118028159, mailed on Nov. 22, 2023, 2 pages.
Office Action received for Australian Patent Application No. 2023200607, mailed on Dec. 20, 2023, 3 pages.
Office Action received for Japanese Patent Application No. 2022-095182, mailed on Sep. 25, 2023, 10 pages.
Office Action received for Japanese Patent Application No. 2022-145387, mailed on Oct. 2, 2023, 7 pages.
Summons to Attend Oral Proceedings received for European Patent Application No. 19707557.5, mailed on Jan. 26, 2024, 6 pages.

\* cited by examiner

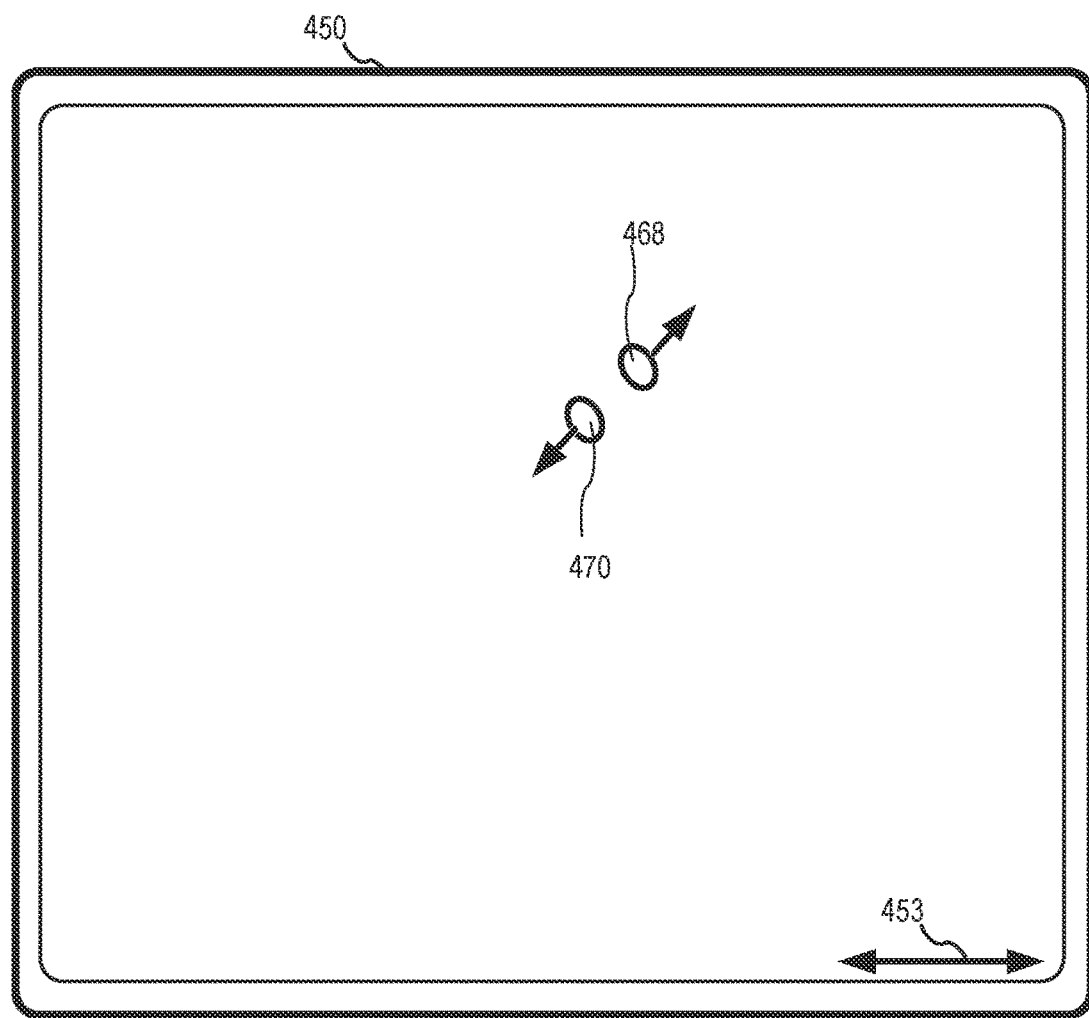
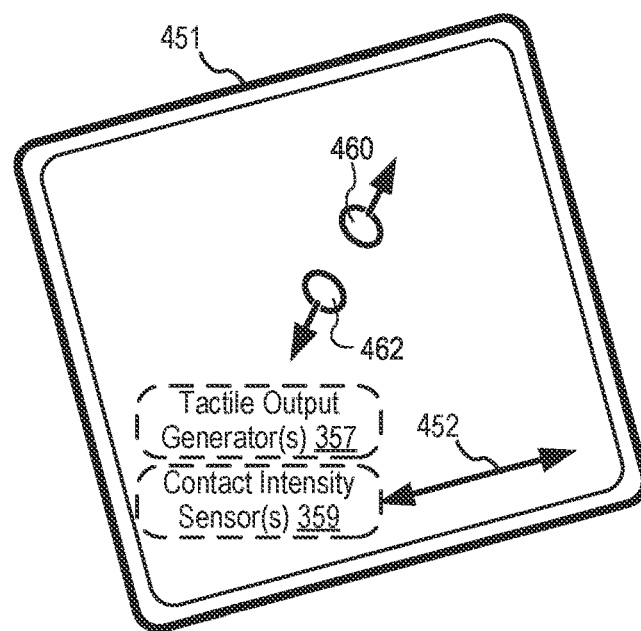
*FIG. 4B*

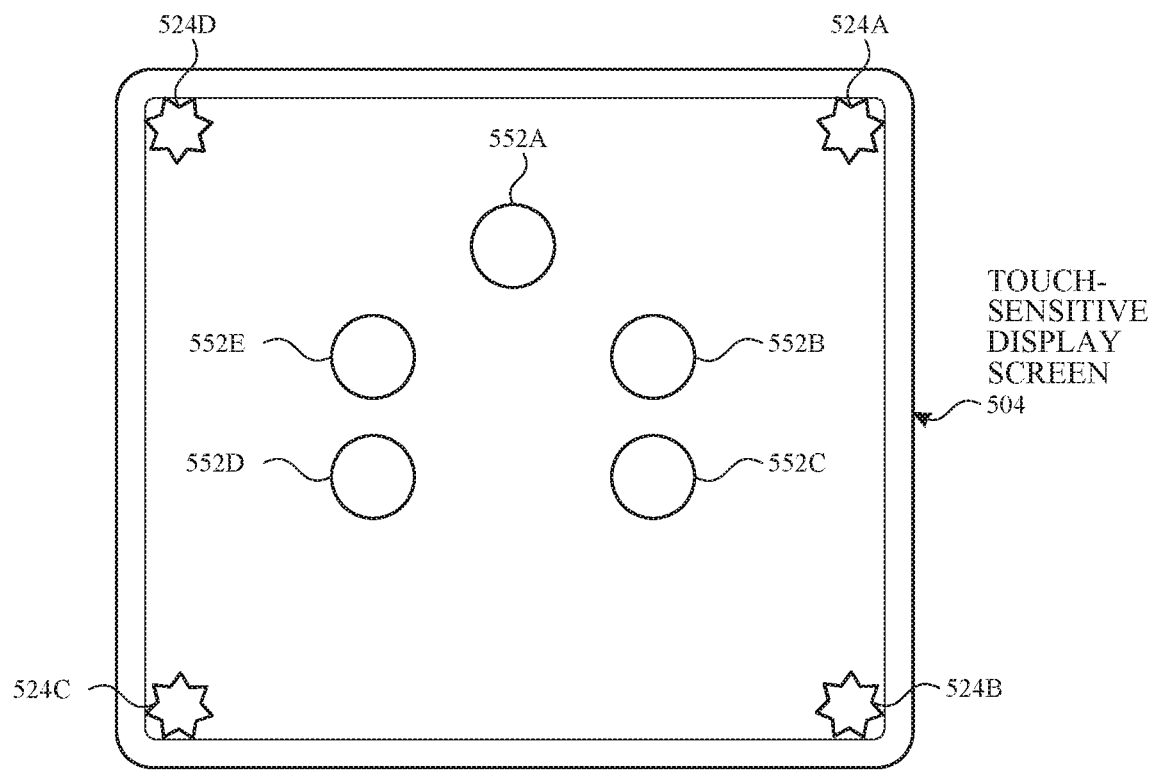
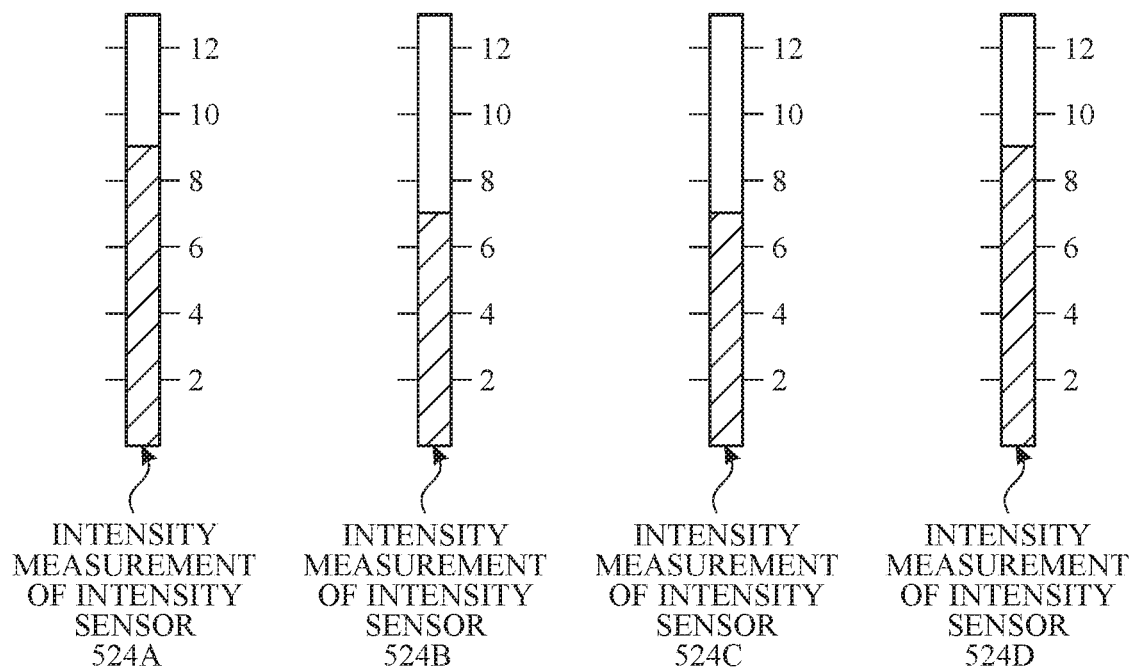
FIG. 5C

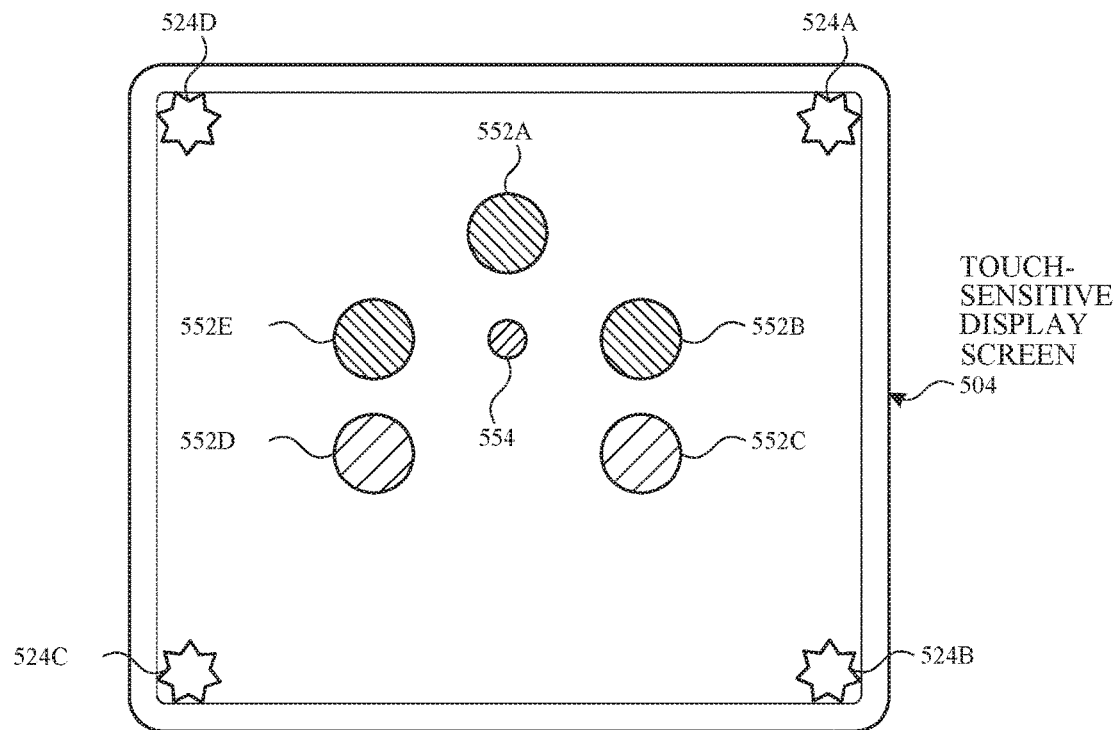
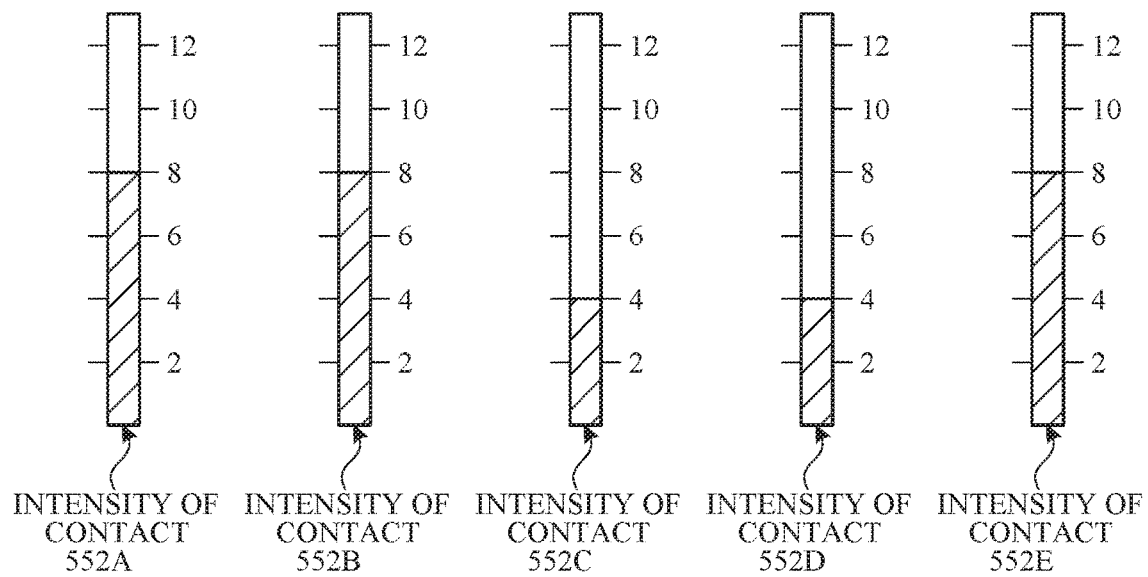
*FIG. 5D*

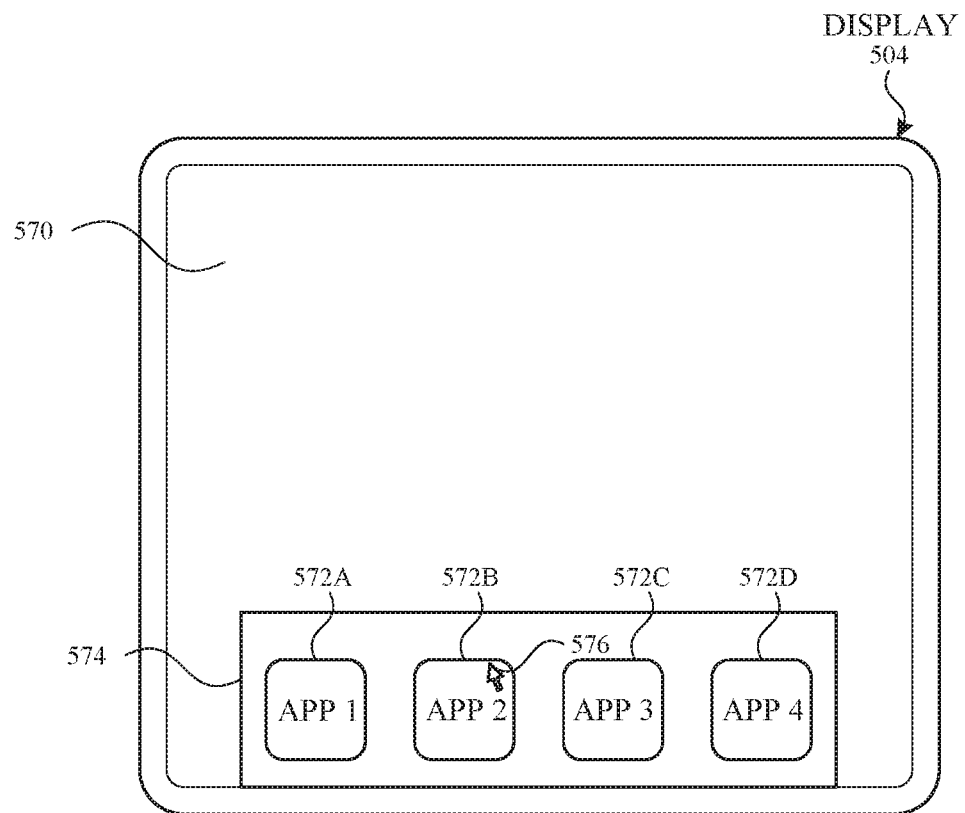
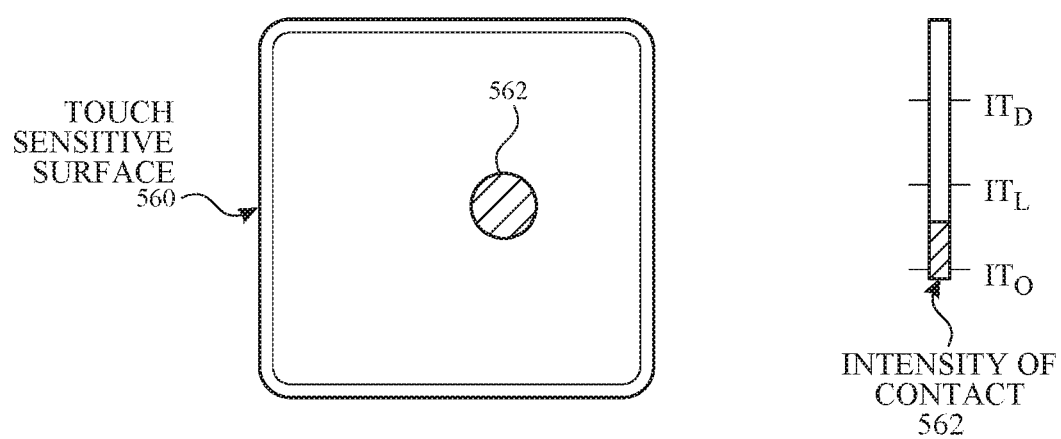
*FIG. 5E*

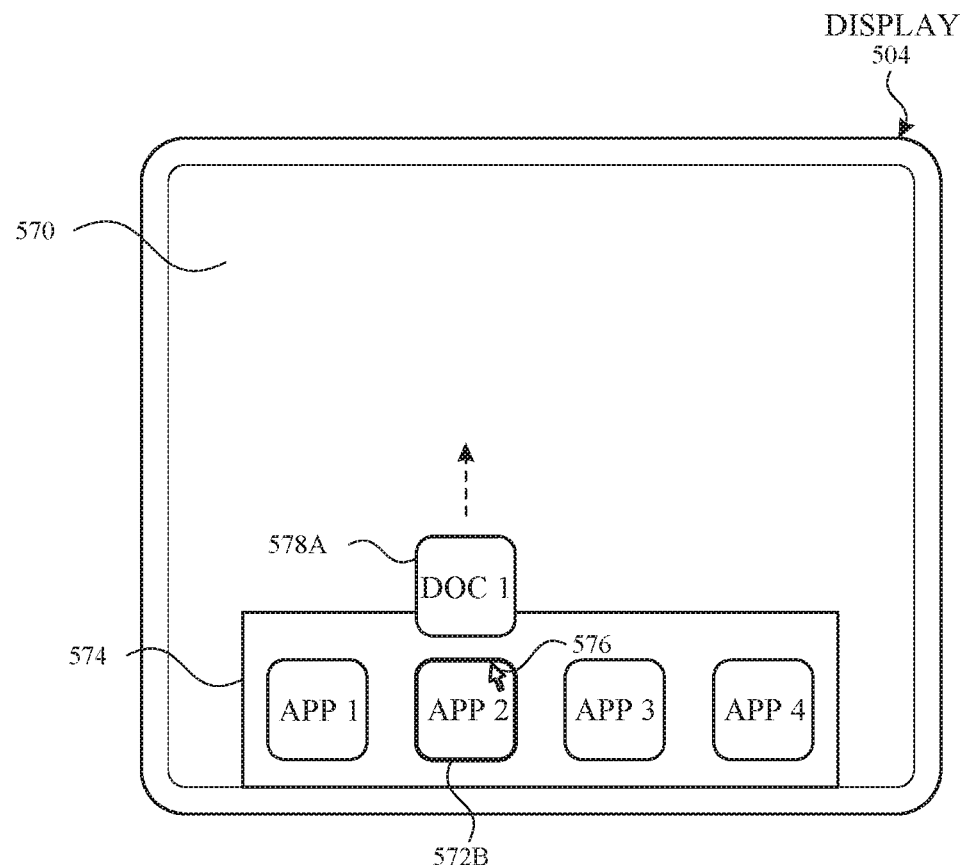
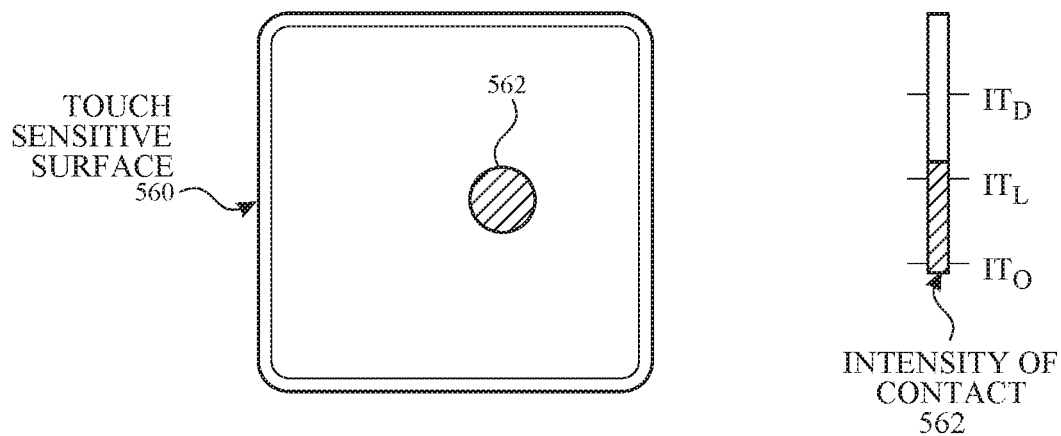
FIG. 5F

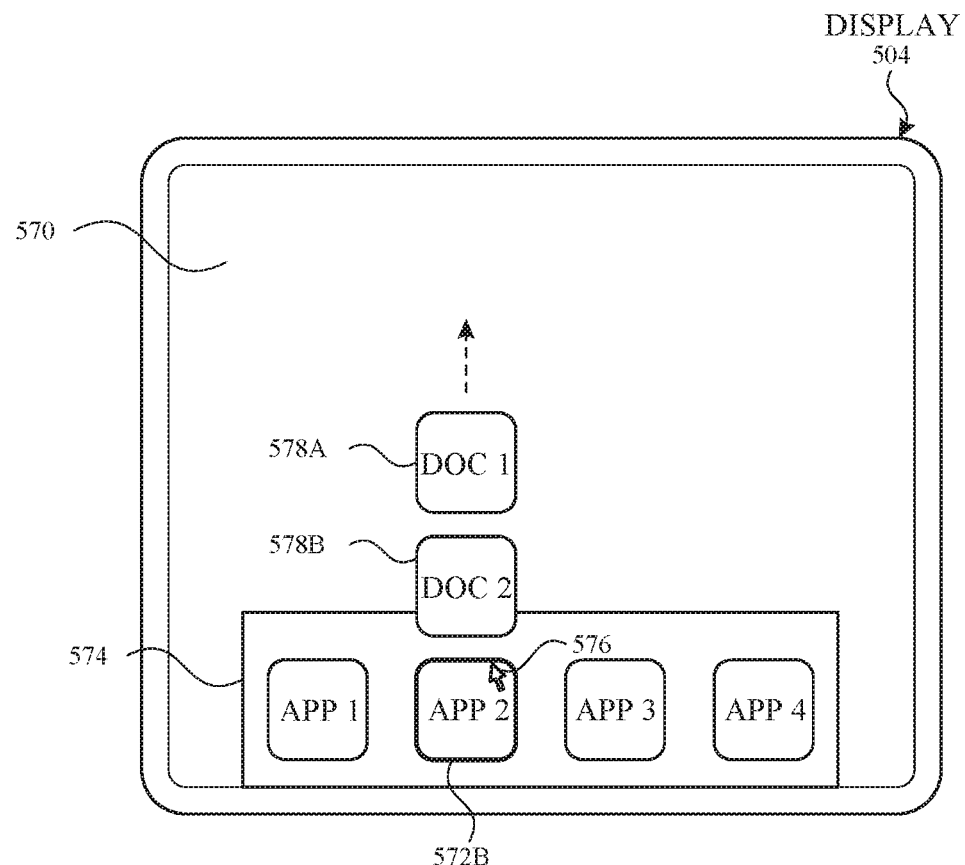
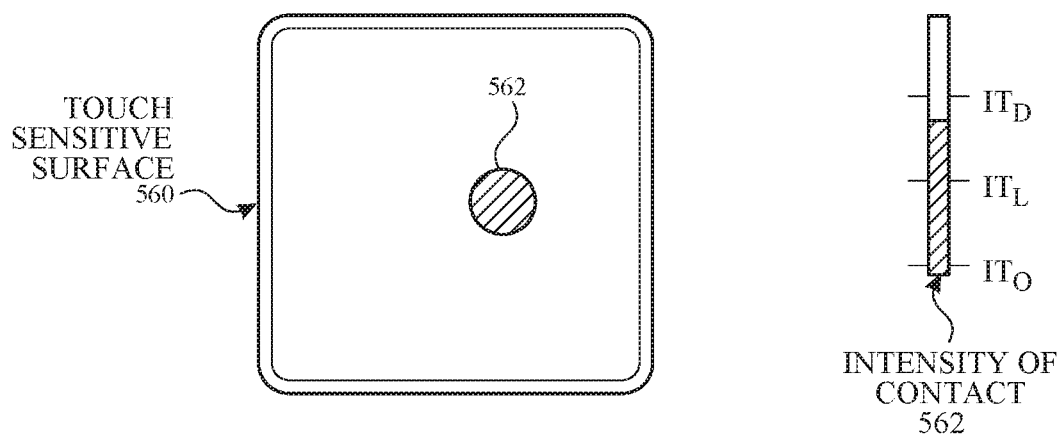
FIG. 5G

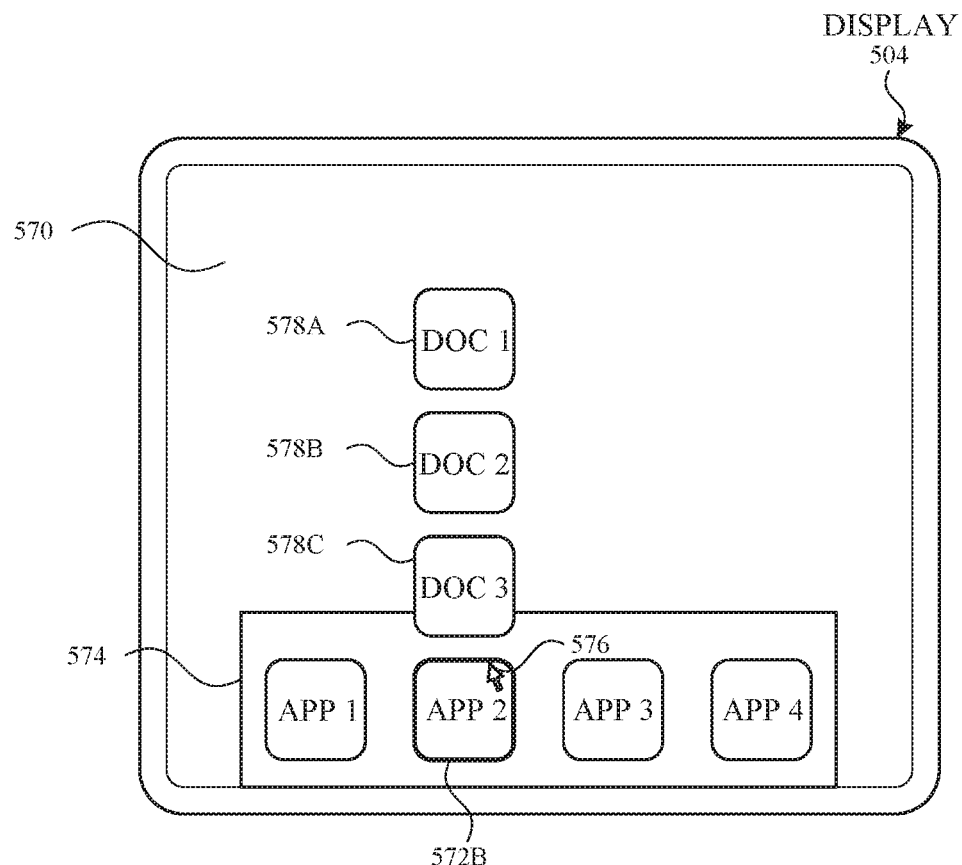
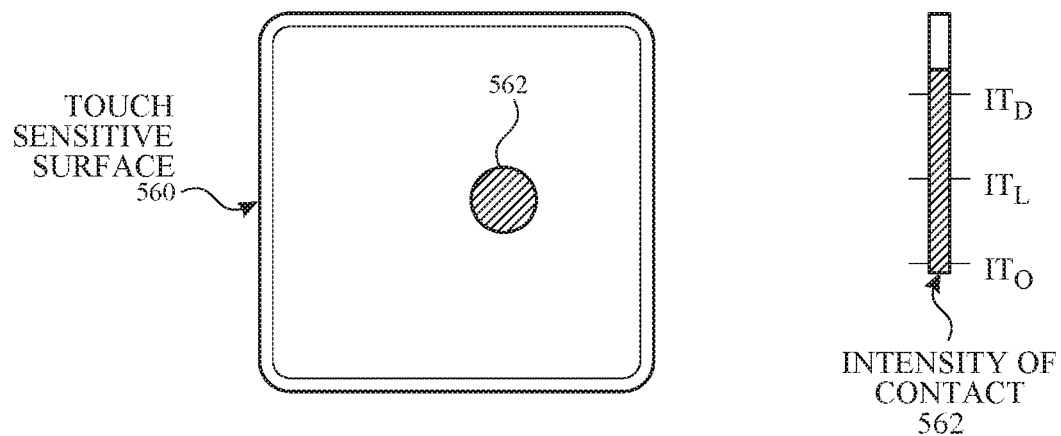
*FIG. 5H*

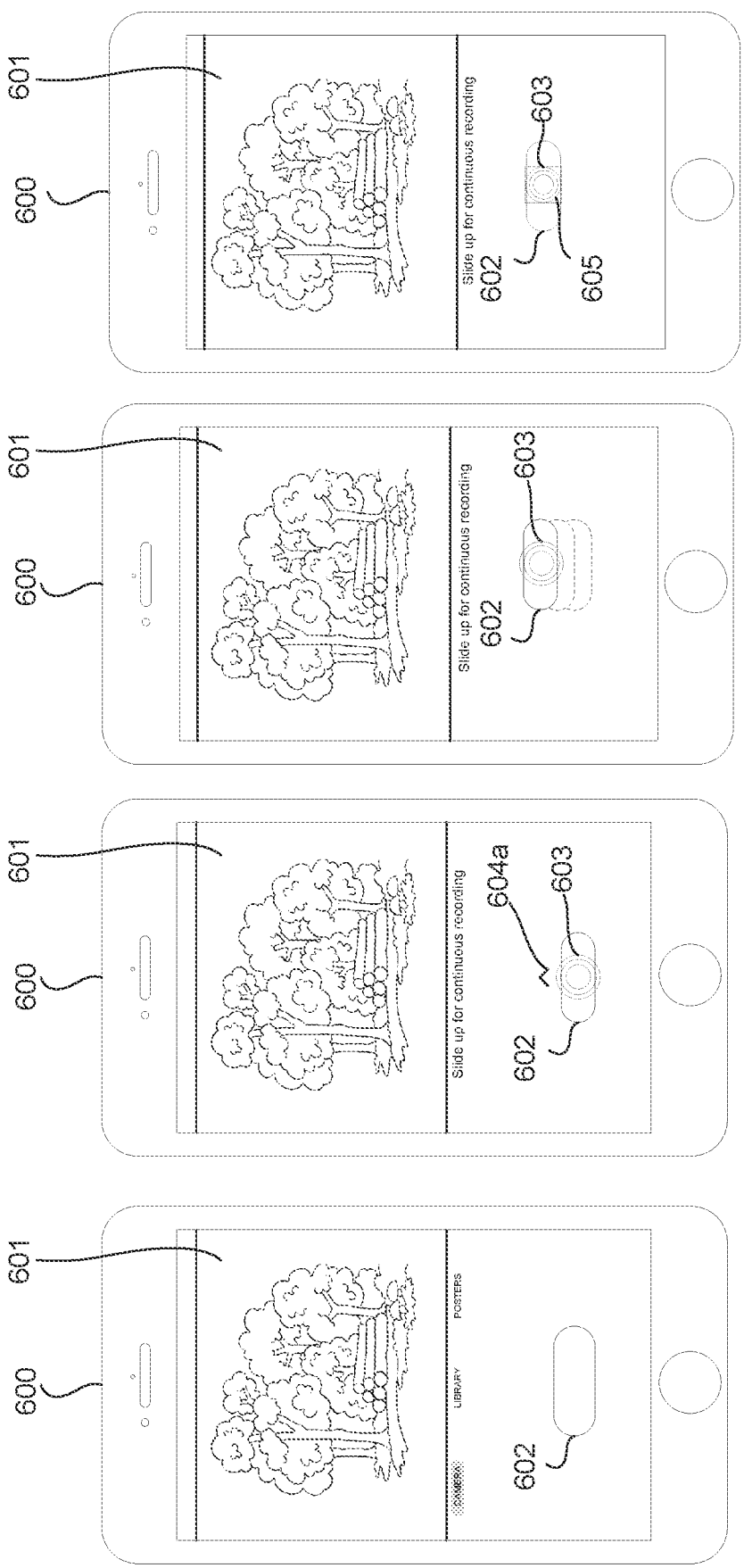

700

```
┌─────────────────────────────────────────────────┐
│ RECEIVING TAP & HOLD GESTURE INPUT DIRECTED TO MEDIA │
│ CAPTURE AFFORDANCE DISPLAYED AT FIRST LOCATION ON GUI │
│                                             701 │
└─────────────────────────────────────────────────┘
                         │
                         ▼
┌─────────────────────────────────────────────────┐
│ RESPONSIVE TO TAP & HOLD GESTURE, INITIATING MEDIA │
│       CAPTURE SESSION ON MEDIA CAPTURE DEVICE   │
│                  IN UNLOCKED STATE              │
│                                             702 │
└─────────────────────────────────────────────────┘
                         │
                         ▼
┌─────────────────────────────────────────────────┐
│     RESPONSIVE TO FIRST LIFT GESTURE AT FIRST LOCATION, │
│         TERMINATING MEDIA CAPTURE SESSION       │
│                                             703 │
└─────────────────────────────────────────────────┘
                         │
                         ▼
┌─────────────────────────────────────────────────┐
│ RESPONSIVE TO SLIDE GESTURE INPUT SLIDING MEDIA CAPTURE │
│ AFFORDANCE FROM FIRST LOCATION TO SECOND LOCATION ON │
│   GUI, CHANGING MEDIA CAPTURE AFFORDANCE TO MEDIA │
│             CAPTURE LOCK AFFORDANCE             │
│                                             704 │
└─────────────────────────────────────────────────┘
                         │
                         ▼
┌─────────────────────────────────────────────────┐
│ RESPONSIVE TO DETECTING SECOND LIFT GESTURE AT SECOND │
│   LOCATION, TRANSITIONING MEDIA CAPTURE SESSION FROM │
│           UNLOCKED STATE TO LOCKED STATE        │
│                                             705 │
└─────────────────────────────────────────────────┘
```

FIG. 7

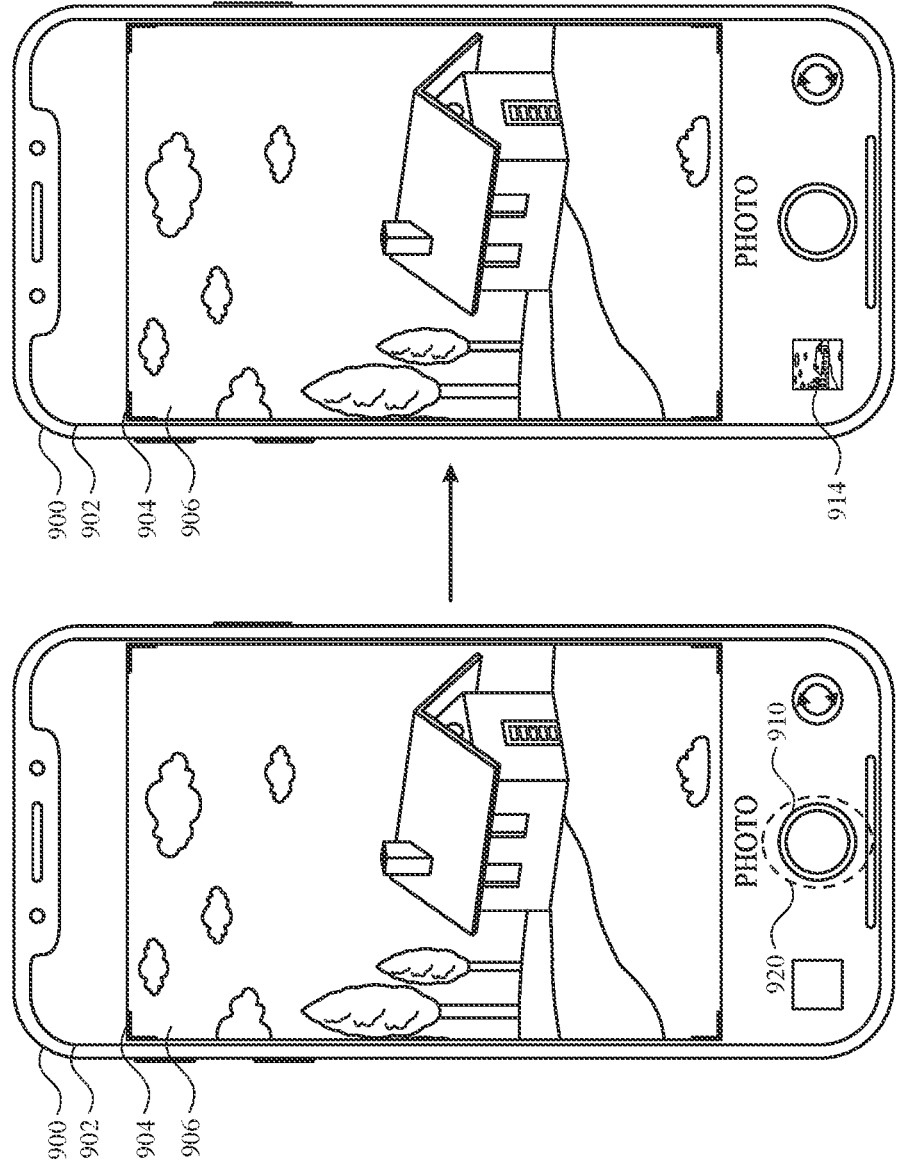

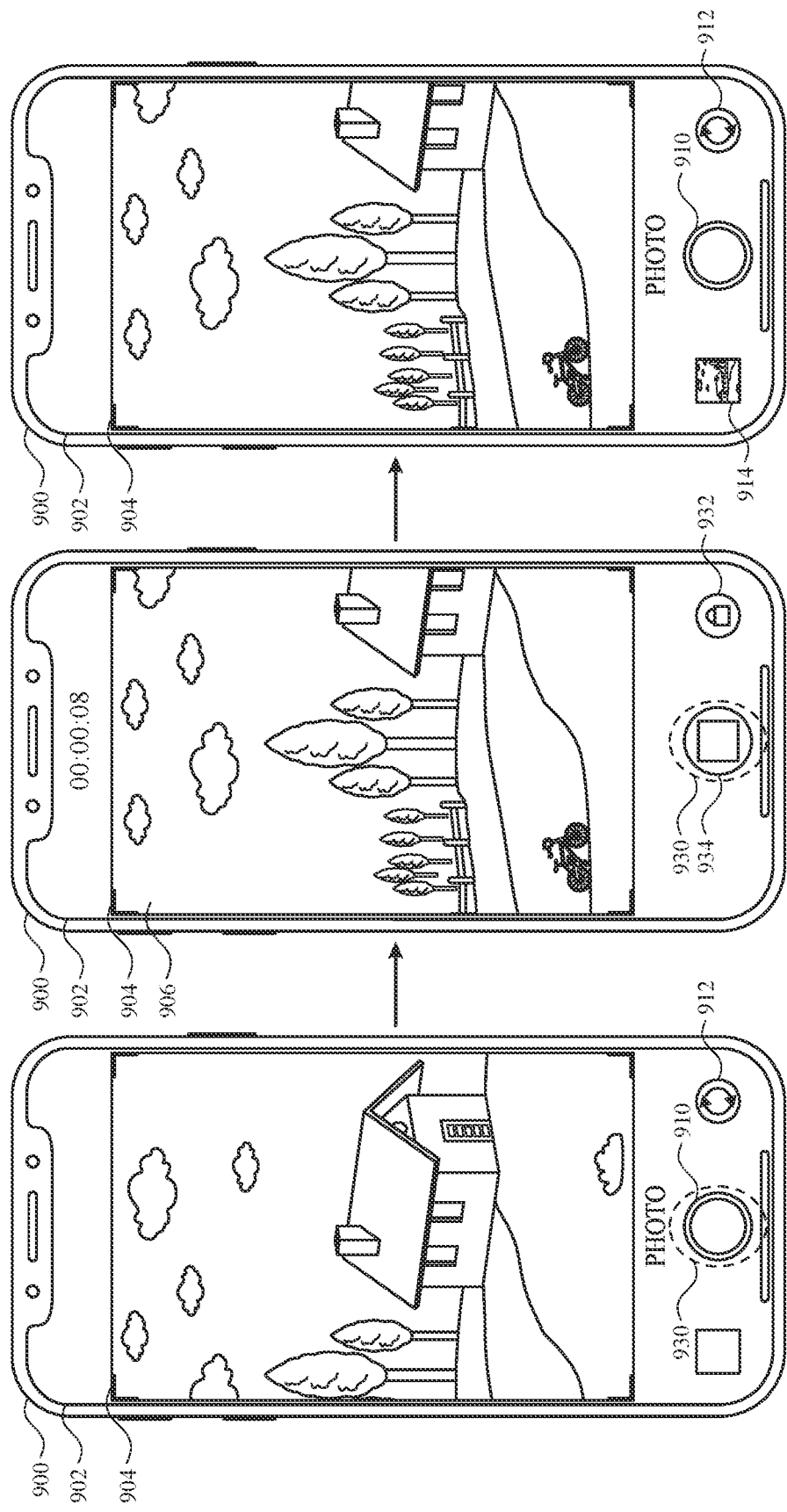

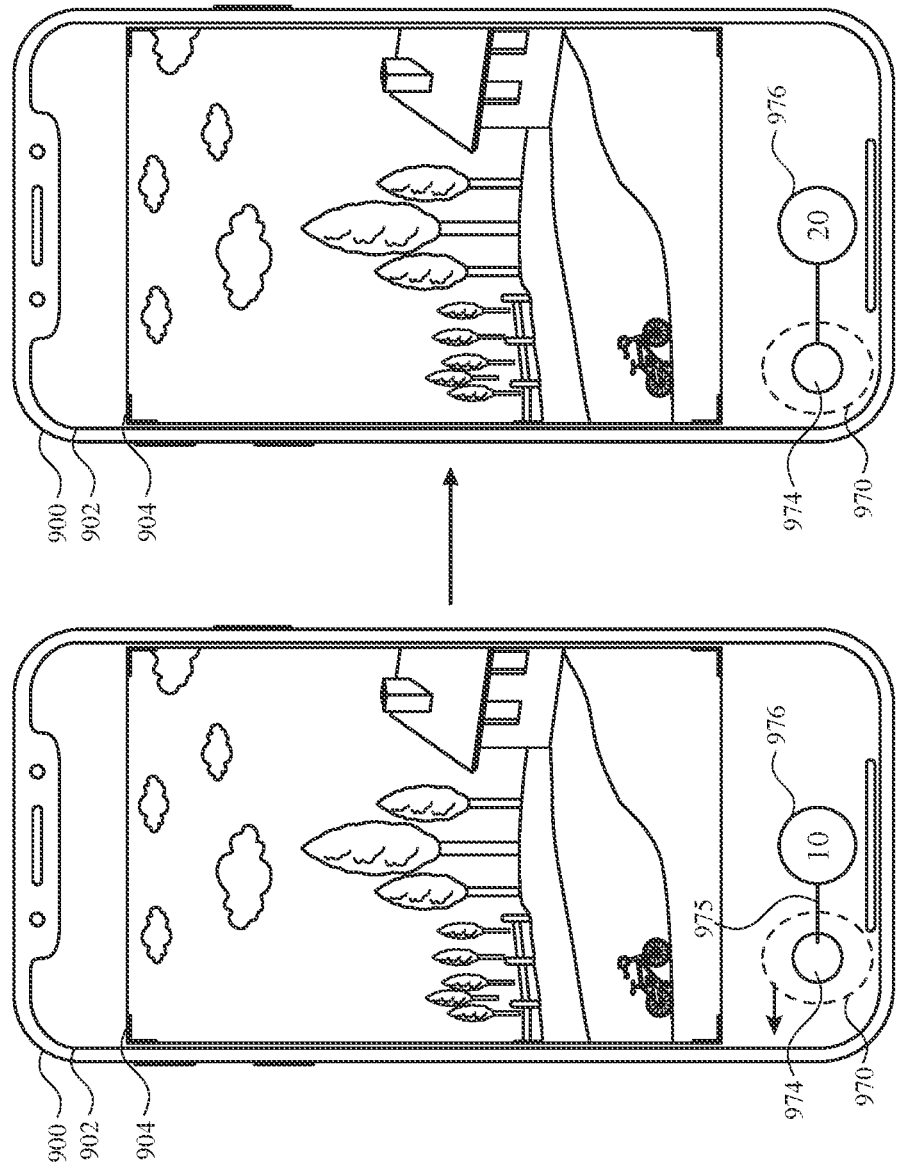

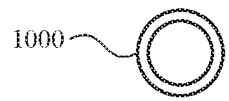
FIG. 10A
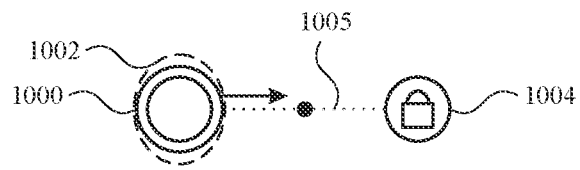
FIG. 10B
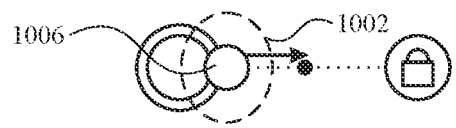
FIG. 10C
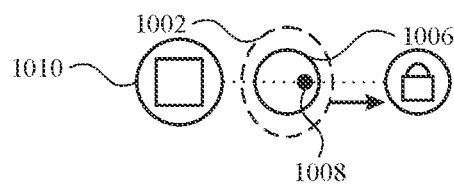
FIG. 10D
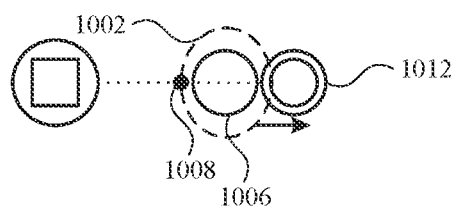
FIG. 10E
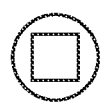 
FIG. 10F

MEDIA CAPTURE LOCK AFFORDANCE FOR GRAPHICAL USER INTERFACE

CROSS-REFERENCE TO RELATED APPLICATIONS

This application is a continuation of U.S. patent application Ser. No. 16/271,583, entitled "Media Capture Lock Affordance for Graphical User Interface", filed on Feb. 8, 2019, which claims priority to U.S. Provisional Application No. 62/802,603, entitled "Media Capture Lock Affordance for Graphical User Interface", filed on Feb. 7, 2019 and is a continuation-in-part of U.S. patent application Ser. No. 15/995,040, entitled "Media Capture Lock Affordance for Graphical User Interface", filed on May 31, 2018, which claims priority to U.S. Provisional Application No. 62/628,825, entitled "Media Capture Lock Affordance for Graphical User Interface", filed on Feb. 9, 2018. The content of these applications is hereby incorporated by reference in their entirety.

FIELD

This disclosure relates generally to graphical user interfaces for media capture applications.

BACKGROUND

Media capture devices (e.g., smart phones, tablet computers), include applications that allow users to record media clips (e.g., video clips, audio clips) using one or more embedded cameras and microphones. The user holds down a virtual record button to capture a media clip. Once the user is done recording, the user can drag the media clip into a desired order with other media clips and add filters, emoji, animated icons and titles. Media clips can be shared indirectly through social networks and/or sent directly to friends through, for example, instant messaging applications.

BRIEF SUMMARY

Some techniques for performing media capture using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for performing gesture-dependent media capture. Such methods and interfaces optionally complement or replace other methods for performing gesture-dependent media capture. Such methods and interfaces reduce the cognitive burden on a user and produce a more efficient human-machine interface. For battery-operated computing devices, such methods and interfaces conserve power and increase the time between battery charges. Additionally, such methods and interfaces reduce the number of unnecessary or extraneous user inputs in order to perform media capture, saving the user time and saving the device energy.

The disclosed embodiments are directed to a media capture lock affordance for a graphical user interface. In an embodiment, a method of capturing media comprises: detecting, by a media capture device, a tap and hold gesture input directed to a media capture affordance displayed at a first location on a graphical user interface presented on a display screen of the media capture device; responsive to the tap and hold gesture input, initiating, by the media capture device, a media capture session on the media capture device in an unlocked state; responsive to the media capture device detecting a first lift gesture in which the tap and hold gesture input lifts from the first location on the graphical user interface during the media capture session, terminating, by the media capture device, the media capture session; responsive to the media capture device detecting a slide gesture input in which the media capture affordance slides from the first location to a second location on the graphical user interface during the media capture session, changing, by the media capture device, the media capture affordance to a media capture lock affordance; and responsive to the media capture device detecting a second lift gesture in which the slide gesture input lifts from the graphical user interface at the second location during the media capture session, transitioning, by the media capture device, the media capture session into a locked state.

Other embodiments can include an apparatus, computing device and non-transitory, computer-readable storage medium.

In accordance with some embodiments, a non-transitory computer-readable storage medium is described. The non-transitory computer-readable storage medium has instructions stored thereon that when executed by a media capture device, causes the media capture device to perform operations comprising: detecting, by the media capture device, a tap and hold gesture input directed to a media capture affordance displayed at a first location on a graphical user interface presented on a display screen of the media capture device; responsive to the tap and hold gesture input, initiating, by the media image capture device, a media capture session on the media capture device in an unlocked media session capture state; responsive to the media capture device detecting a first lift gesture in which the tap and hold gesture input lifts from the first location on the graphical user interface during the media capture session, terminating, by the media image capture device, the media capture session; responsive to the media capture device detecting a slide gesture input in which the media capture affordance slides from the first location to a second location on the graphical user interface during the media capture session, changing, by the media capture device, the media capture affordance to a media capture lock affordance; and responsive to the media capture device detecting a second lift gesture in which the slide gesture input lifts from the graphical user interface at the second location during the media capture session, transitioning, by the media capture device, the media capture session into a locked media capture session state.

In accordance with some embodiments, a transitory computer-readable storage medium is described. The transitory computer-readable storage medium has instructions stored thereon that when executed by a media capture device, causes the media capture device to perform operations comprising: detecting, by the media capture device, a tap and hold gesture input directed to a media capture affordance displayed at a first location on a graphical user interface presented on a display screen of the media capture device; responsive to the tap and hold gesture input, initiating, by the media image capture device, a media capture session on the media capture device in an unlocked media session capture state; responsive to the media capture device detecting a first lift gesture in which the tap and hold gesture input lifts from the first location on the graphical user interface during the media capture session, terminating, by the media image capture device, the media capture session; responsive to the media capture device detecting a slide gesture input in which the media capture affordance slides from the first location to a second location on the graphical user interface during the media capture session, changing, by the media capture device, the media capture affordance to a media capture lock affordance; and responsive to the media capture device detecting a second lift gesture in which the slide gesture input lifts from the graphical user interface at the second location during the media capture session, transitioning, by the media capture device, the media capture session into a locked media capture session state.

In accordance with some embodiments, a media capture device is described. The media capture device comprises: a touch screen; one or more processors; memory coupled to the one or more processors and configured to store instructions, which, when executed by the one or more processors, cause the one or more processors to perform operations comprising: detecting, by the touch screen, a tap and hold gesture input directed to a media capture affordance displayed at a first location on a graphical user interface presented on the touch screen of the media capture device; responsive to the tap and hold gesture input, initiating a media capture session on the media capture device in an unlocked media capture session state; responsive to the touch screen detecting a first lift gesture in which the tap and hold gesture input lifts from the first location on the graphical user interface during the media capture session, terminating the media capture session; responsive to the touch screen detecting a slide gesture input in which the media capture affordance slides from the first location to a second location on the graphical user interface during the media capture session, changing the media capture affordance to a media capture lock affordance; and responsive to the touch screen detecting a second lift gesture in which the slide gesture input lifts from the graphical user interface at the second location during the media capture session, transitioning the media capture session into a locked media capture session state.

In accordance with some embodiments, an electronic device is described. The electronic device comprises: a display screen; means for detecting a tap and hold gesture input directed to a media capture affordance displayed at a first location on a graphical user interface presented on a display screen of the media capture device; means for, responsive to the tap and hold gesture input, initiating a media capture session on the media capture device in an unlocked media capture session state; means for, responsive to the media capture device detecting a first lift gesture in which the tap and hold gesture input lifts from the first location on the graphical user interface during the media capture session, terminating the media capture session; means for, responsive to the media capture device detecting a slide gesture input in which the media capture affordance slides from the first location to a second location on the graphical user interface during the media capture session, changing the media capture affordance to a media capture lock affordance; and means for, responsive to the media capture device detecting a second lift gesture in which the slide gesture input lifts from the graphical user interface at the second location during the media capture session, transitioning the media capture session into a locked media capture session state.

Particular embodiments disclosed herein may provide one or more of the following advantages. A media capture lock affordance allows a user to lock and unlock a capture state of a media capture device using a simple and intuitive touch gesture that can be applied by the user's finger (e.g., the user's thumb) while holding the media capture device in one hand.

The details of one or more implementations of the subject matter are set forth in the accompanying drawings and the description below. Other features, aspects and advantages of the subject matter will become apparent from the description, the drawings and the claims.

In accordance with some embodiments, a method is described. The method comprises: at a device with a display, a touch-sensitive surface, and one or more media capture components: displaying, on the display, a first user interface element; detecting, via the touch-sensitive surface, a touch input that begins at a location on the touch-sensitive surface that corresponds to the first user interface element; and in response to detecting the touch input: in accordance with a determination that the touch input is lifted from the touch-sensitive surface before the touch input meets movement criteria and before a threshold amount of time has elapsed since the touch input was detected, capturing a first type of media; in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface; and in accordance with a determination that the touch input meets the movement criteria and includes movement in a first direction, starting to capture the second type of media and continuing to capture the second type of media after detecting liftoff of the touch input from the touch-sensitive surface.

In accordance with some embodiments, a non-transitory computer-readable storage medium is described. The non-transitory computer-readable storage medium stores one or more programs configured to be executed by one or more processors of an electronic device with a display, a touch-sensitive surface, and one or more media capture components, the one or more programs including instructions for: displaying, on the display, a first user interface element; detecting, via the touch-sensitive surface, a touch input that begins at a location on the touch-sensitive surface that corresponds to the first user interface element; and in response to detecting the touch input: in accordance with a determination that the touch input is lifted from the touch-sensitive surface before the touch input meets movement criteria and before a threshold amount of time has elapsed since the touch input was detected, capturing a first type of media; in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface; and in accordance with a determination that the touch input meets the movement criteria and includes movement in a first direction, starting to capture the second type of media and continuing to capture the second type of media after detecting liftoff of the touch input from the touch-sensitive surface.

In accordance with some embodiments, a transitory computer-readable storage medium is described. The transitory computer-readable storage medium stores one or more programs configured to be executed by one or more processors of an electronic device with a display, a touch-sensitive surface, and one or more media capture components, the one or more programs including instructions for: displaying, on the display, a first user interface element; detecting, via the touch-sensitive surface, a touch input that begins at a location on the touch-sensitive surface that corresponds to the first user interface element; and in response to detecting the touch input: in accordance with a determination that the touch input is lifted from the touch-sensitive surface before the touch input meets movement criteria and before a threshold amount of time has elapsed since the touch input was detected, capturing a first type of media; in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface; and in accordance with a determination that the touch input meets the movement criteria and includes movement in a first direction, starting to capture the second type of media and continuing to capture the second type of media after detecting liftoff of the touch input from the touch-sensitive surface.

In accordance with some embodiments, an electronic device is described. The electronic device comprises: a display; a touch-sensitive surface; one or more media capture components; one or more processors; and memory storing one or more programs configured to be executed by the one or more processors, the one or more programs including instructions for: displaying, on the display, a first user interface element; detecting, via the touch-sensitive surface, a touch input that begins at a location on the touch-sensitive surface that corresponds to the first user interface element; and in response to detecting the touch input: in accordance with a determination that the touch input is lifted from the touch-sensitive surface before the touch input meets movement criteria and before a threshold amount of time has elapsed since the touch input was detected, capturing a first type of media; in accordance with a determination that the touch input is lifted from the touch-sensitive surface before the touch input meets the movement criteria and after the thresh-old amount of time has elapsed since the touch input was detected, capturing a second type of media that has a duration that is based on the duration of the touch input on the touch-sensitive surface; and in accordance with a determination that the touch input meets the movement criteria and includes movement in a first direction, starting to capture the second type of media and continuing to capture the second type of media after detecting liftoff of the touch input from the touch-sensitive surface.

In accordance with some embodiments, an electronic device is described. The electronic device comprises: a display; a touch-sensitive surface; one or more media capture components; means for displaying, on the display, a first user interface element; means for detecting, via the touch-sensitive surface, a touch input that begins at a location on the touch-sensitive surface that corresponds to the first user interface element; and means for, responsive to detecting the touch input: in accordance with a determination that the touch input is lifted from the touch-sensitive surface before the touch input meets movement criteria and before a threshold amount of time has elapsed since the touch input was detected, capturing a first type of media; in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface; and in accordance with a determination that the touch input meets the movement criteria and includes movement in a first direction, starting to capture the second type of media and continuing to capture the second type of media after detecting liftoff of the touch input from the touch-sensitive surface.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for performing gesture-dependent media capture, thereby increasing the effectiveness, efficiency, and user satisfaction with such devices. Such methods and interfaces may complement or replace other methods for performing gesture-dependent media capture.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 6A-6H illustrate operation of a media capture lock affordance, according to an embodiment.

FIG. 7 is a flow diagram of an animation process for the media capture lock affordance shown in FIGS. 6A-6H, according to an embodiment.

FIGS. 10A-10F illustrate exemplary user interfaces for performing gesture-dependent media capture in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for performing gesture-dependent media capture. Such techniques can reduce the cognitive burden on a user who uses a device to capture media, thereby enhancing productivity. Further, such techniques can reduce processor and battery power otherwise wasted on redundant user inputs.

Figure 11A:
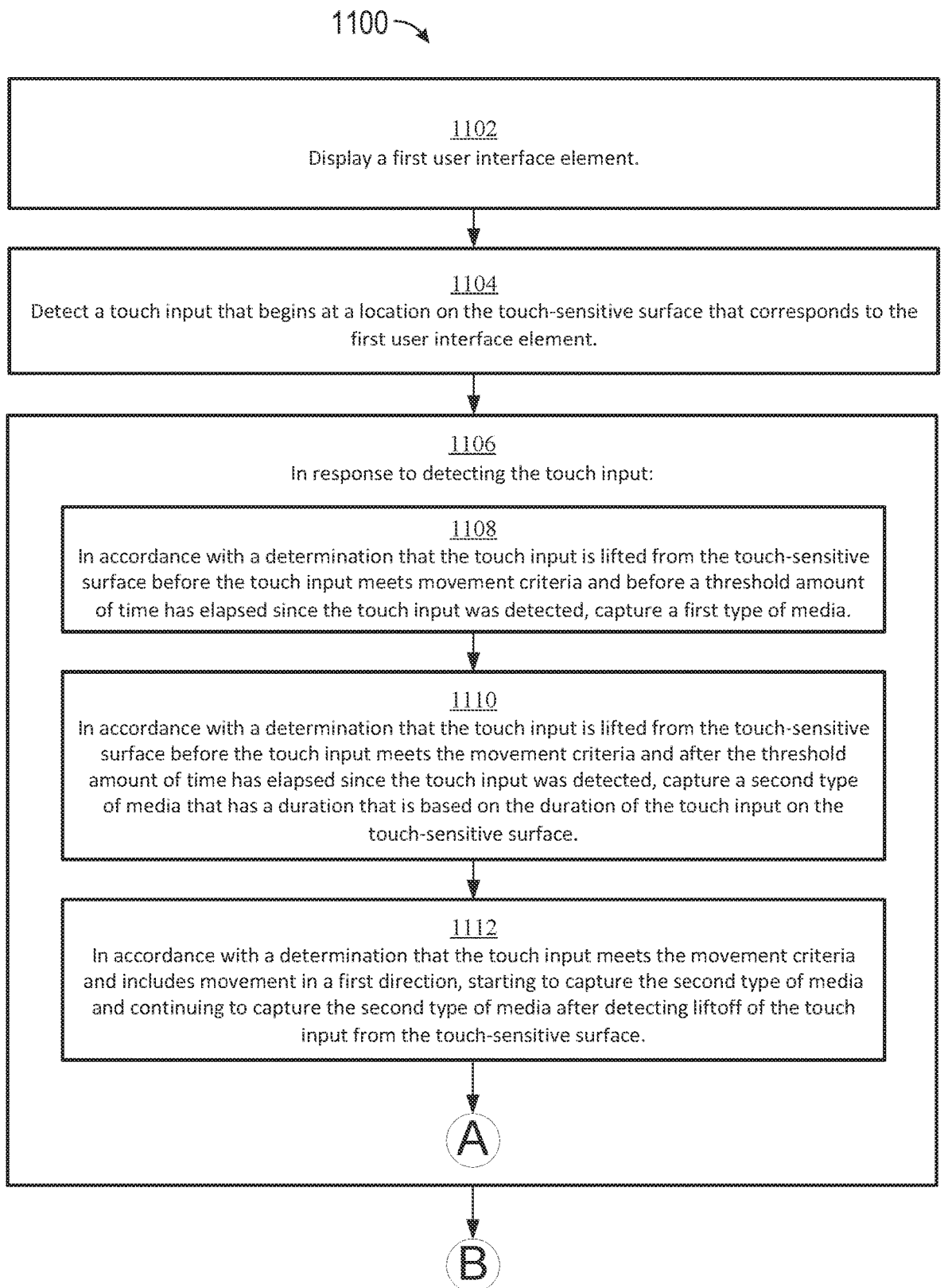
FIGS. 11A-11B is a flow diagram for performing gesture-dependent media capture in accordance with some embodiments.
Figure 11B:
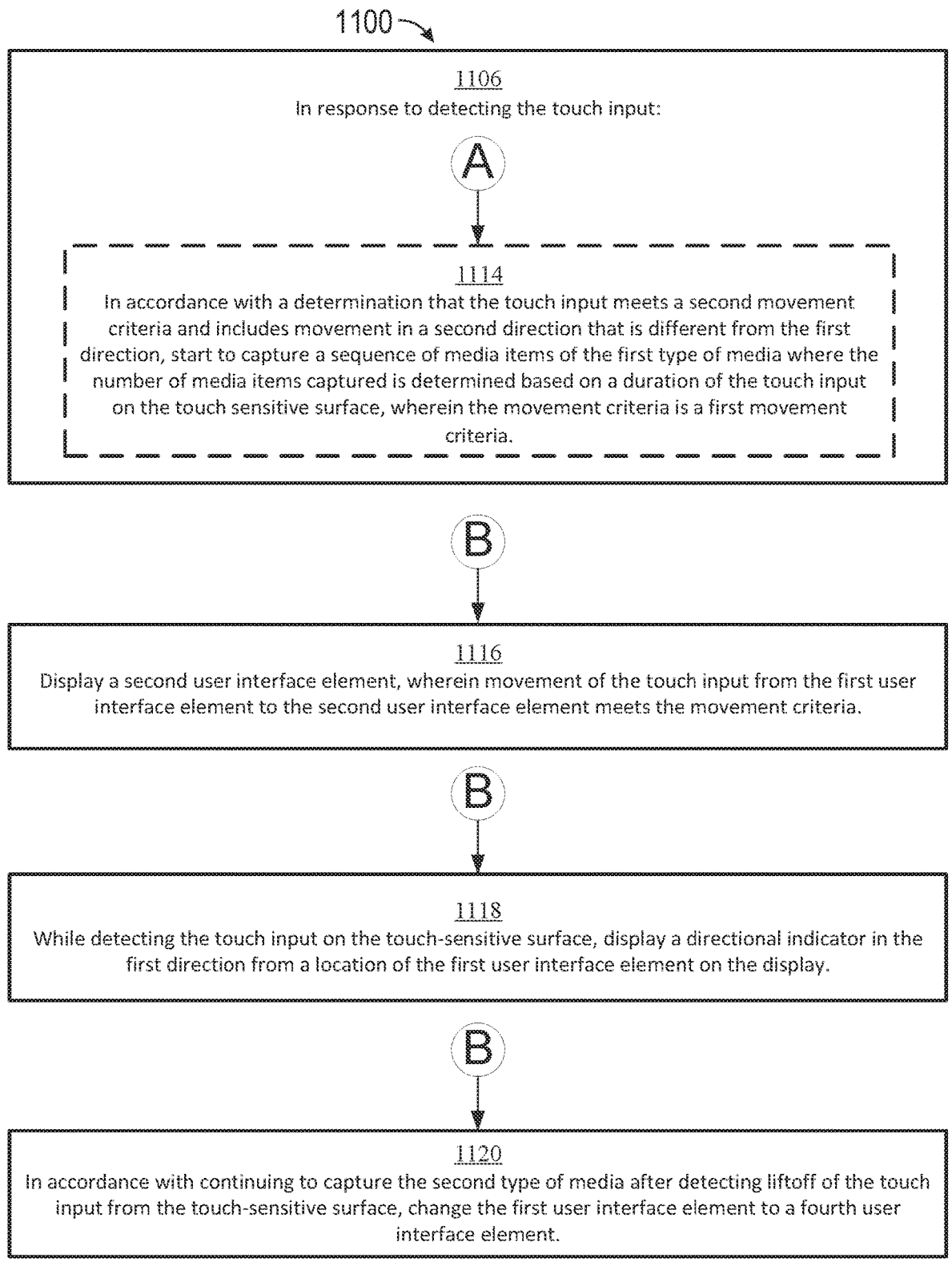

Below, FIGS. 1A-1B, 2, 3, 4A-4B, and 5A-5H provide a description of exemplary devices for performing the techniques for managing event notifications. FIGS. 6A-6H illustrate exemplary user interfaces for performing gesture-dependent media capture. FIG. 7 is a flow diagram illustrating methods of performing gesture-dependent media capture in accordance with some embodiments. The user interfaces in FIGS. 6A-6H are used to illustrate the processes described below, including the processes in FIG. 7. FIGS. 9A-10F illustrate exemplary user interfaces for performing gesture-dependent media capture. FIGS. 11A-11B is a flow diagram illustrating methods of performing gesture-dependent media capture in accordance with some embodiments. The user interfaces in FIG. 9A-10F are used to illustrate the processes described below, including the processes in FIGS. 11A-11B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
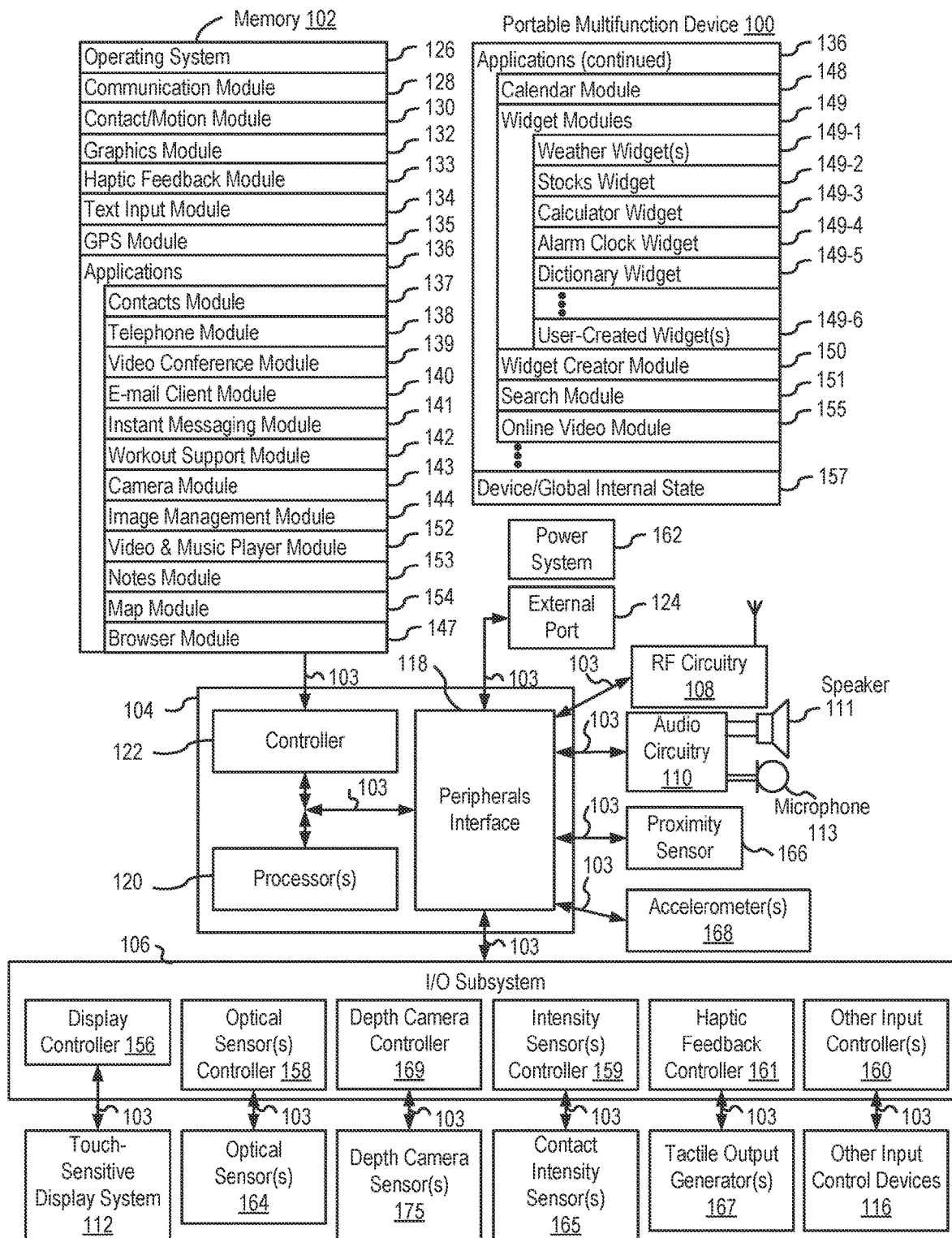
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
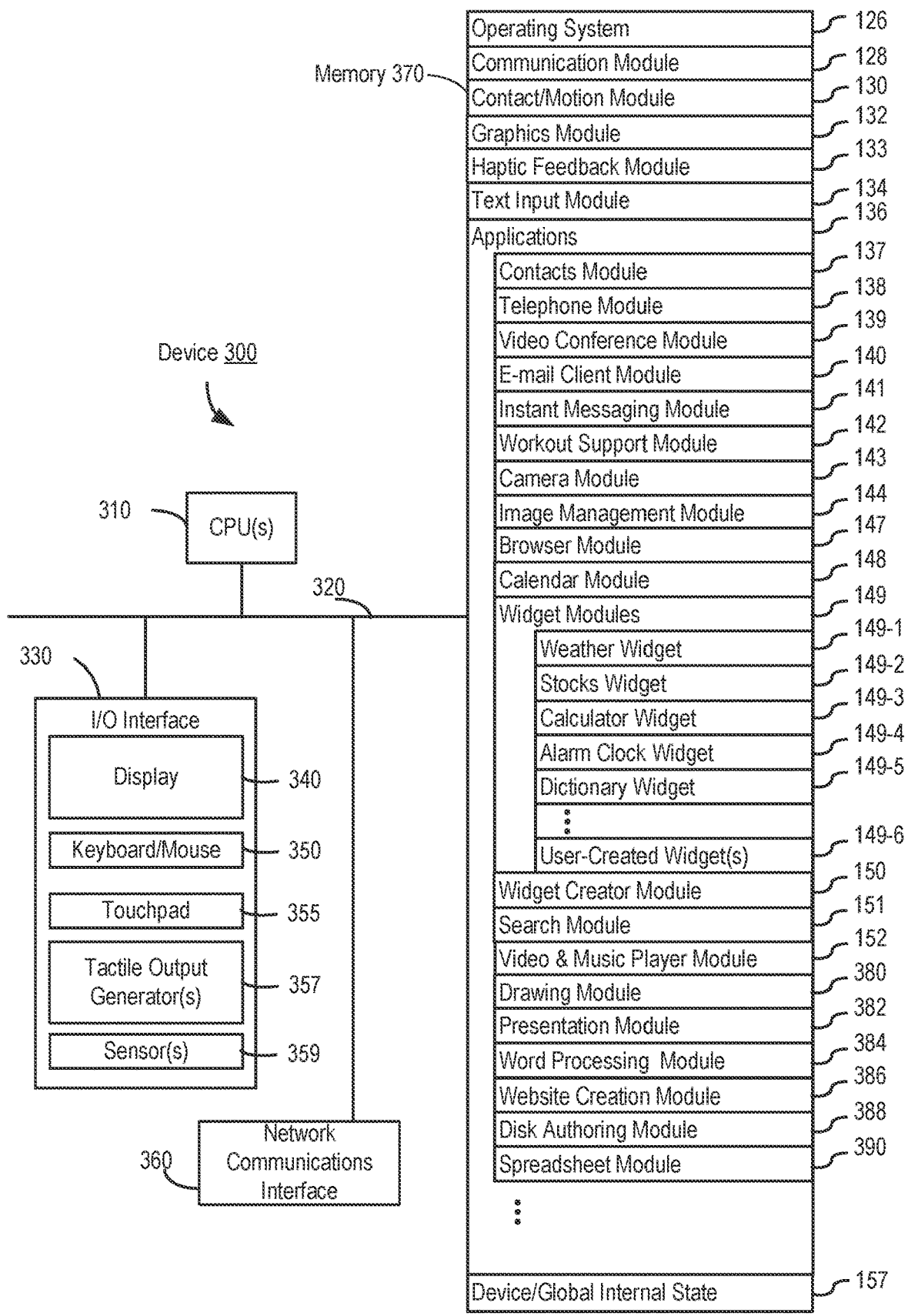
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
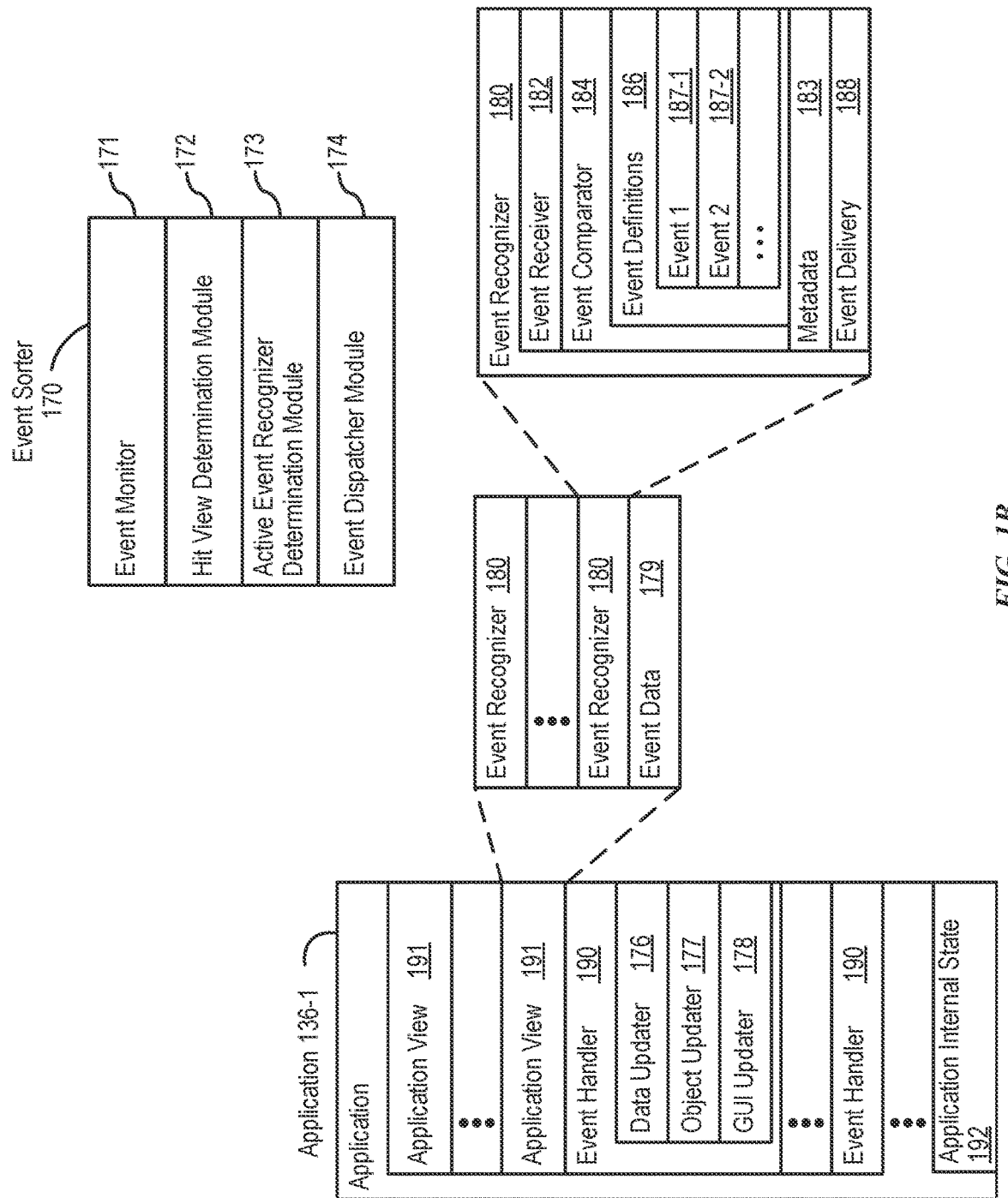
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
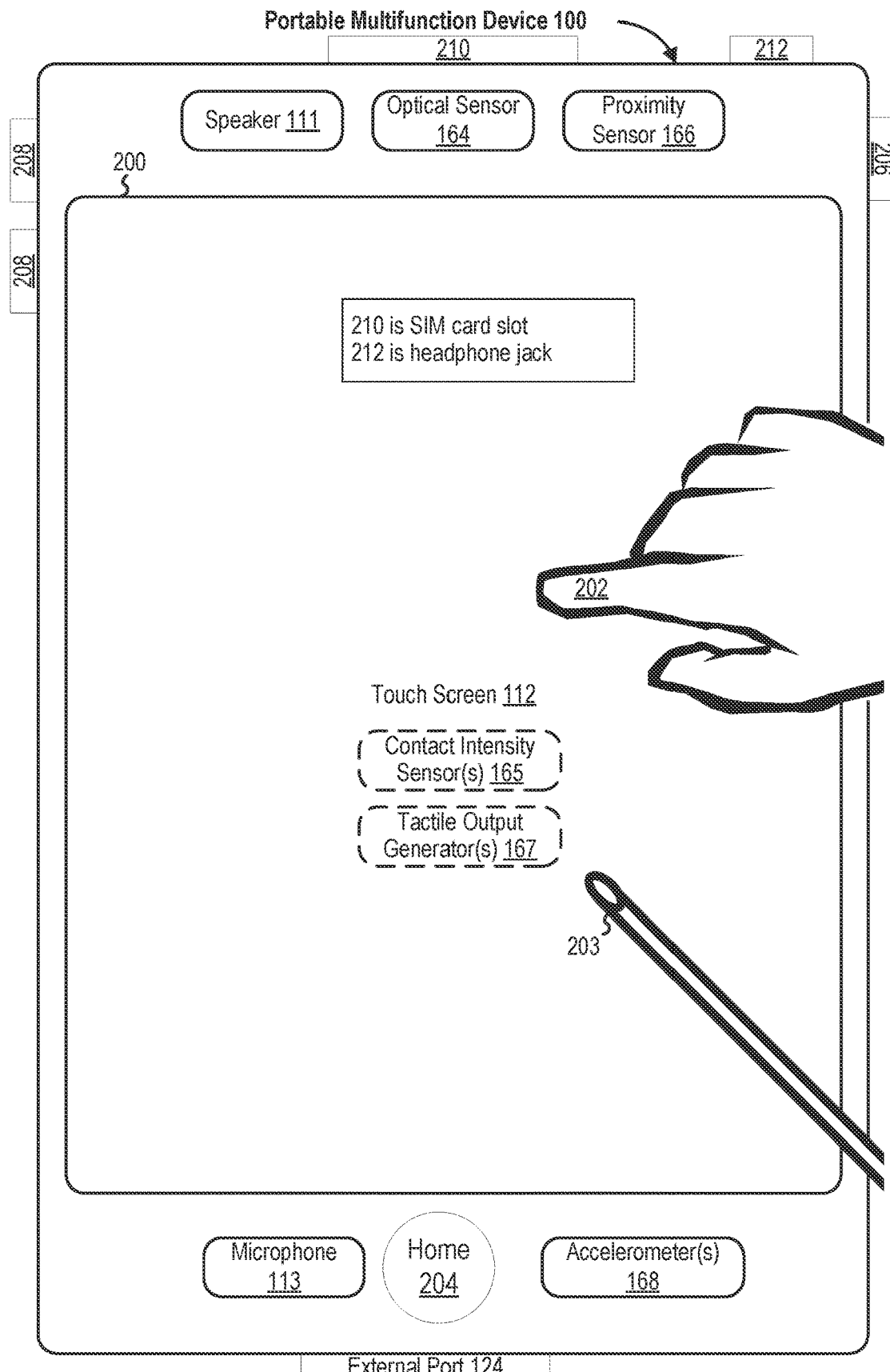
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
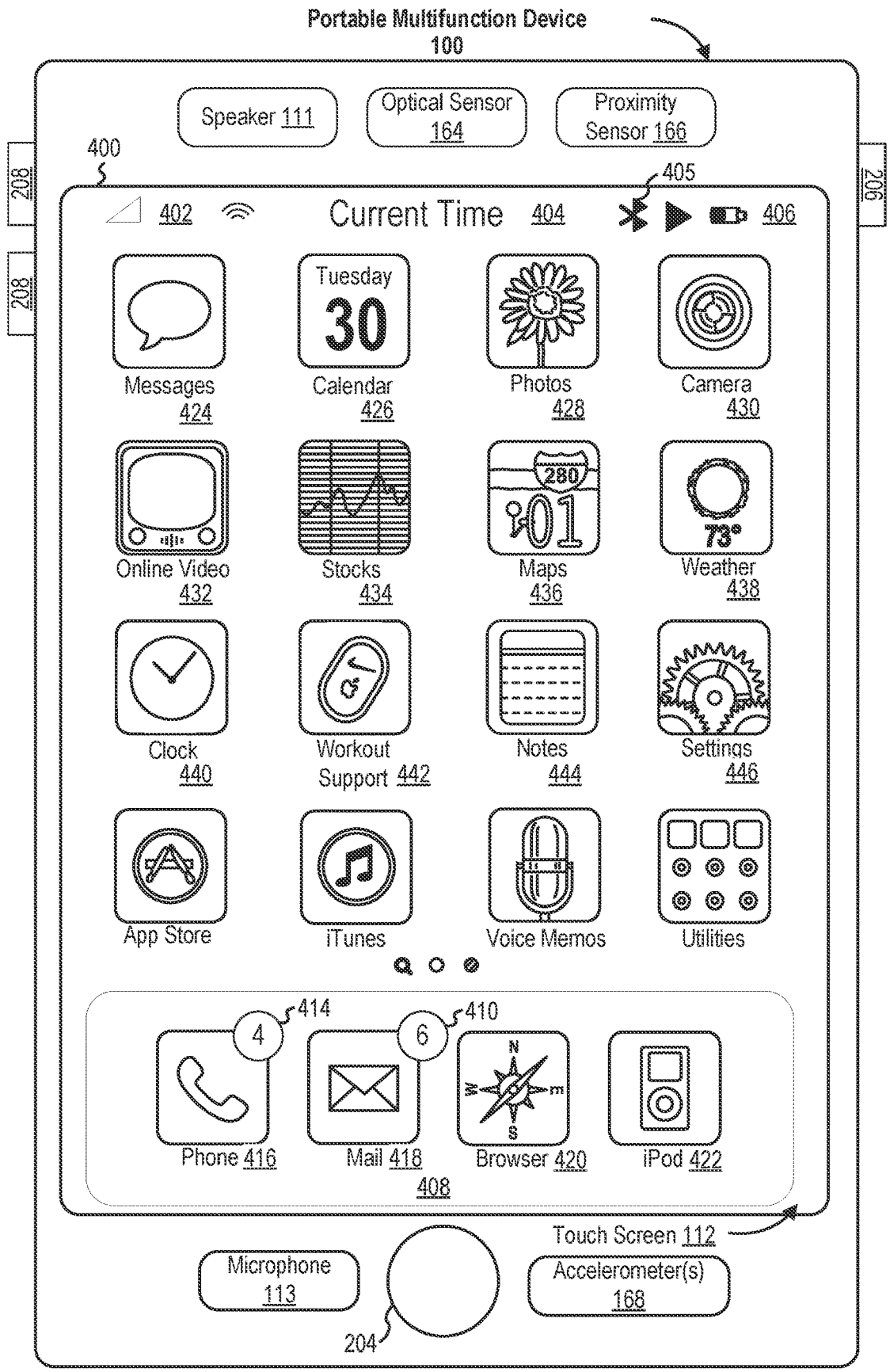
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
  Time 404;
  Bluetooth indicator 405;
  Battery status indicator 406;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
  Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"

Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
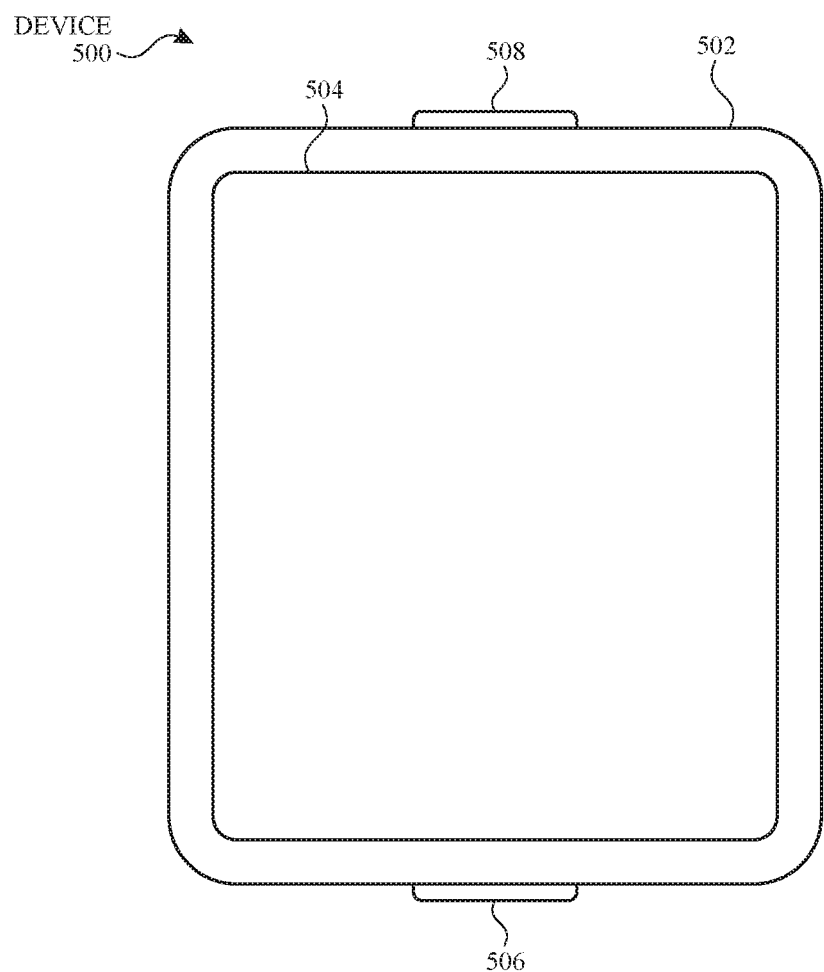
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
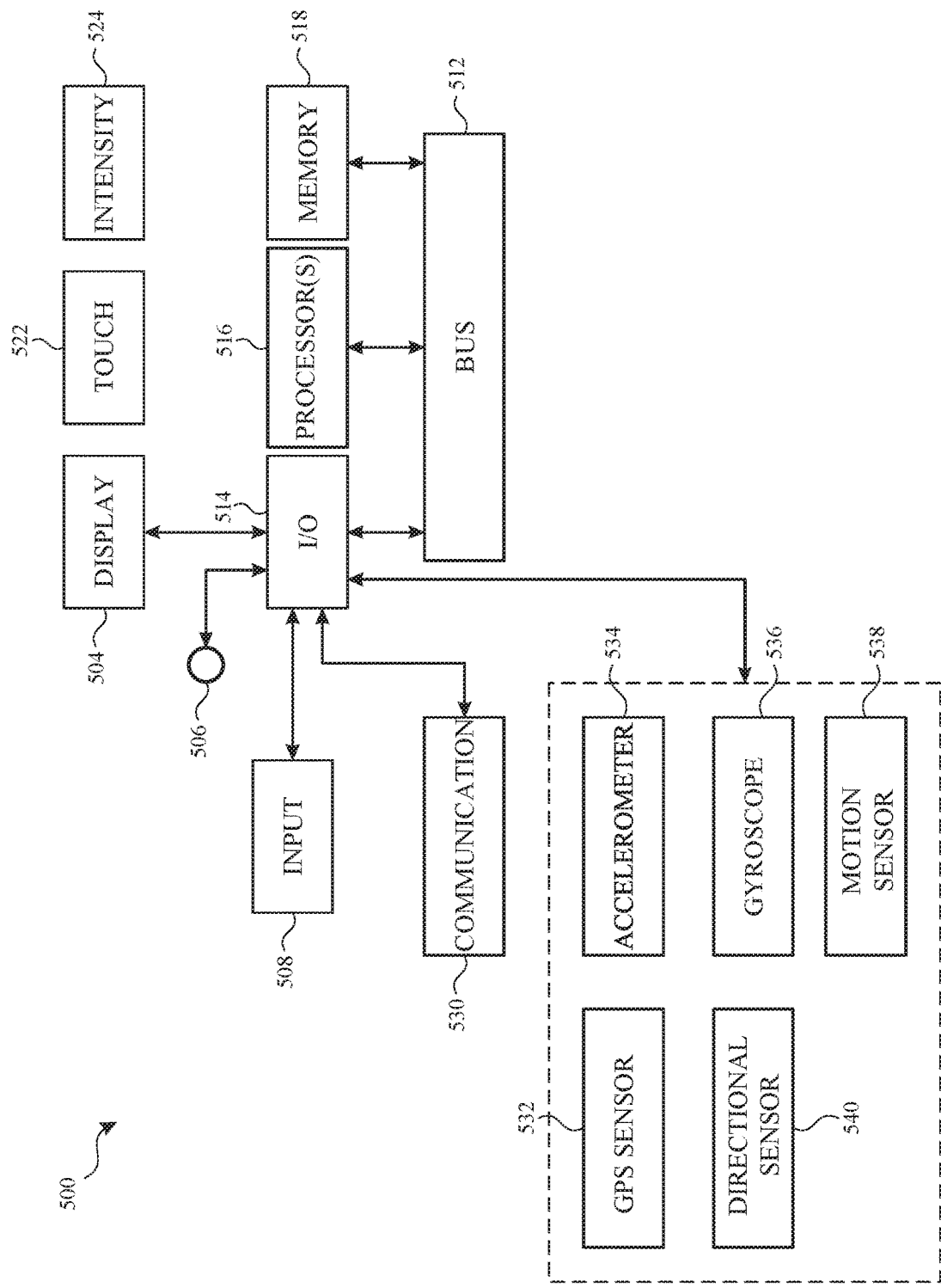
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 1100 (FIGS. 7 and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6H illustrate exemplary user interfaces for performing gesture-dependent media capture, in accordance with some embodiments. The user interfaces in these figures are used to illustrate the processes described below, including the processes in FIG. 7.

Example Media Lock Affordance

This disclosure relates to media recording functionality of a media capture device that locks a media capture affordance on a graphical user interface (GUI) into a locked media capture state for continuous media capture. In an embodiment, to initiate a media capture session of a media clip (e.g., a video clip, audio clip), the user taps and holds the media capture affordance (e.g., a virtual recording button). As long as the user holds their touch on the media capture affordance, the media continues to be captured by the media capture device. If the user removes their touch during the media capture session, the media capture session terminates. If the user maintains their touch on the media capture affordance while making a sliding gesture with their finger, the media capture affordance visually changes to a locked media capture affordance and the media capture session is maintained, resulting in continuous recording of the media. In an embodiment, the locked media capture affordance moves down below the user's finger so that it is not obscured by the user's finger. The user can remove their finger from the locked media capture affordance and the media capture session will be maintained until the user taps the locked state capture button, which then terminates the media capture session.

Figure 6H:
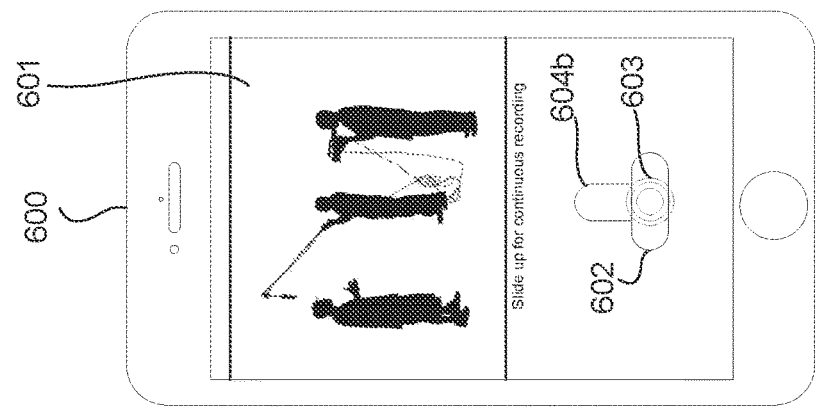
Figure 6G:
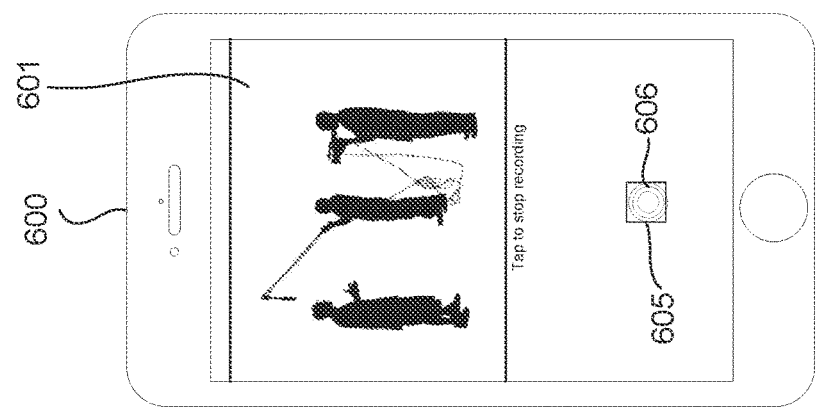

FIGS. 6A-6H illustrate operation of a media capture lock affordance, according to an embodiment. Referring to FIG. 6A, media capture device 600 is presenting GUI 601 on a display screen. GUI 601 includes media capture affordance 602. Media capture device 600 is shown in this example embodiment as a smartphone. Media capture device 600, however, can be any electronic device capable of capturing media, including tablet computers, wearable computers, digital cameras, video recorders and audio recording devices. In some embodiments, media capture device 600 includes one or more features of devices 100, 300, or 500. Media capture affordance 602 can have any desired shape, size or color. In the example shown, media capture affordance 602 is an oval shape button. GUI 601 also includes a display area for displaying live media and playing back captured media. Media can be any type of media that can be captured, including video, still images and audio or any combination thereof.

Referring to FIG. 6B, a user taps and holds 603 (shown as a dashed circle) media capture affordance 602 with their finger (e.g., their thumb while holding media capture device 600) to initiate a media capture session in an "unlocked" state. During the media capture session, an embedded video camera and/or one or more microphones capture media (e.g., capture video and audio). The media capture session is "unlocked" meaning that if the user lifts their finger from media capture affordance 602 (lifts their finger off the display screen), the media capture session terminates, and the media is stored on media capture device 600 (e.g., stored in cache memory). Visual direction indicator 604a (e.g., an arrow head) is displayed on GUI 601 to indicate a direction in which the user may slide their finger to transition the media capture session into a "locked" state. While in the "locked" state, the media is continuously captured without interruption. For example, video and audio will continue to record and still images will be taken in "burst" mode. Text is also displayed on GUI 601 that instructs the user to "slide up for continuous recording."

In some embodiments, additional affordances (not shown) are included on GUI 601 for allowing the user to playback the captured media (hereinafter also referred to as a "media clip"), and order, filter, add emoji, animated icons and titles to the media clip. Other affordances allow the user to share the media clips indirectly with social networking websites and directly with friends and family through various communication means (e.g., instant messaging, email, tweeting). In the embodiment shown, a navigation bar is located under the media display area that allows the user select an operation mode such as Camera, Library and Posters.

Referring to FIG. 6C, shows the user's slide gesture input resulting in media capture affordance 602 sliding up toward the media capture area. Note that during a slide gesture input the user's finger does not break contact with the display screen.

Figure 6F:
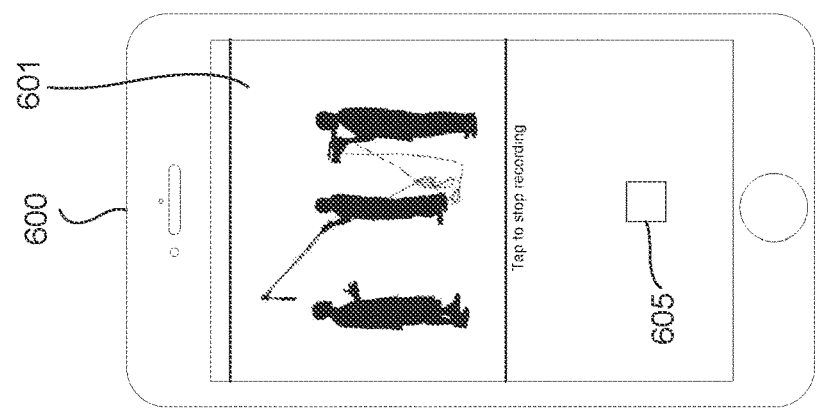

Referring to FIGS. 6D-6G, when the user slides media capture affordance 602 up a predetermined distance, media capture affordance 602 changes or morphs into media capture lock affordance 605 to visually indicate a "locked" state, as shown in FIG. 6F. The text below the media display area also changes to instruct the user how to exit the "locked" state such as, for example, "tap to stop recording." Media capture lock affordance 605 can be any size, shape or color. In the example shown, media capture lock affordance 605 is a square button. After the change or morph from media capture affordance 602 to media capture lock affordance 605, if the user lifts their finger and breaks contact with the display screen, the media capture session enters the "locked" state. In the "locked" state the media capture session continues with the media capture until the user taps 606 media capture lock affordance 605 (FIG. 6G), in which case the media capture session terminates. In an alternative embodiment, visual direction indicator 604a can be replaced with button track 604b (FIG. 6H) to show the user the distance the user should slide media capture affordance 602 to enter the "locked" state.

In other embodiments, multiple taps can be used instead of a single tap. The direction of the slide gesture input can be in any direction on GUI 601, including up, down, right and left. A sound effect can be played in sync with the tap and slide gesture, such as a "click" sound effect to indicate when the media capture session is locked and unlocked. In an embodiment, force feedback (e.g., a vibration) can be provided by a haptic engine to indicate when the media capture session is locked and unlocked. Affordances 602, 606 can be placed at any desired location on GUI 601, and can change location, size and/or shape in response to the orientation of media capture device 600, such as portrait and landscape orientations. In an embodiment, the user can enter or exit a locked media capture state using a voice command, which is processed by a speech detection/recognition engine implemented in media capture device 600.

Example Processes

FIG. 7 is a flow diagram of an animation process for the media capture lock affordance shown in FIGS. 6A-6H, according to an embodiment. Process 700 can be implemented using the device architecture 800 described in reference to FIG. 8. Process 700 is performed at a device (e.g., 100, 300, 500, 800). Some operations in method 700 are, optionally, combined, the orders of some operations are, optionally, changed, and some operations are, optionally, omitted.

Process 700 begins by receiving a tap and hold gesture input directed to a media capture affordance at a first location of a GUI presented on a display device of a media capture device (701). The media capture affordance can be any size, shape or color. The first location can be any desired location on the GUI. Responsive to the tap and hold gesture input, process 700 initiates a media capture session on the media capture device, where the media capture session is initiated in an "unlocked" state (702). Responsive to a first lift gesture at the first location, process 700 terminates the media capture session (703).

Responsive to a slide gesture input from the first location to a second location on the GUI, process 700 changes the media capture affordance to a media capture lock affordance (704). The media capture lock affordance can be any size, shape or color. The second location can be any desired location on the GUI except the first location. The slide gesture can be in any desired direction including up, down, left and right.

Responsive to detecting a second lift gesture at the second location, process 700 transitions the media capture session from an unlocked state into a locked state (705). In a locked state, the media capture device will capture media continuously, until the user taps the media capture lock affordance to terminate the media capture session. In an embodiment, the user can tap anywhere on the GUI to terminate the media capture session after the second lift gesture, or press a mechanical button on the media capture device (e.g., a home button on a smartphone).

Note that details of the processes described above with respect to method 700 (e.g., FIG. 7) are also applicable in an analogous manner to the methods described below. For example, method 700 optionally includes one or more of the characteristics of the various methods described below with reference to method 1100. For brevity, these details are not repeated below.

Exemplary Mobile Device Architecture

Figure 8:
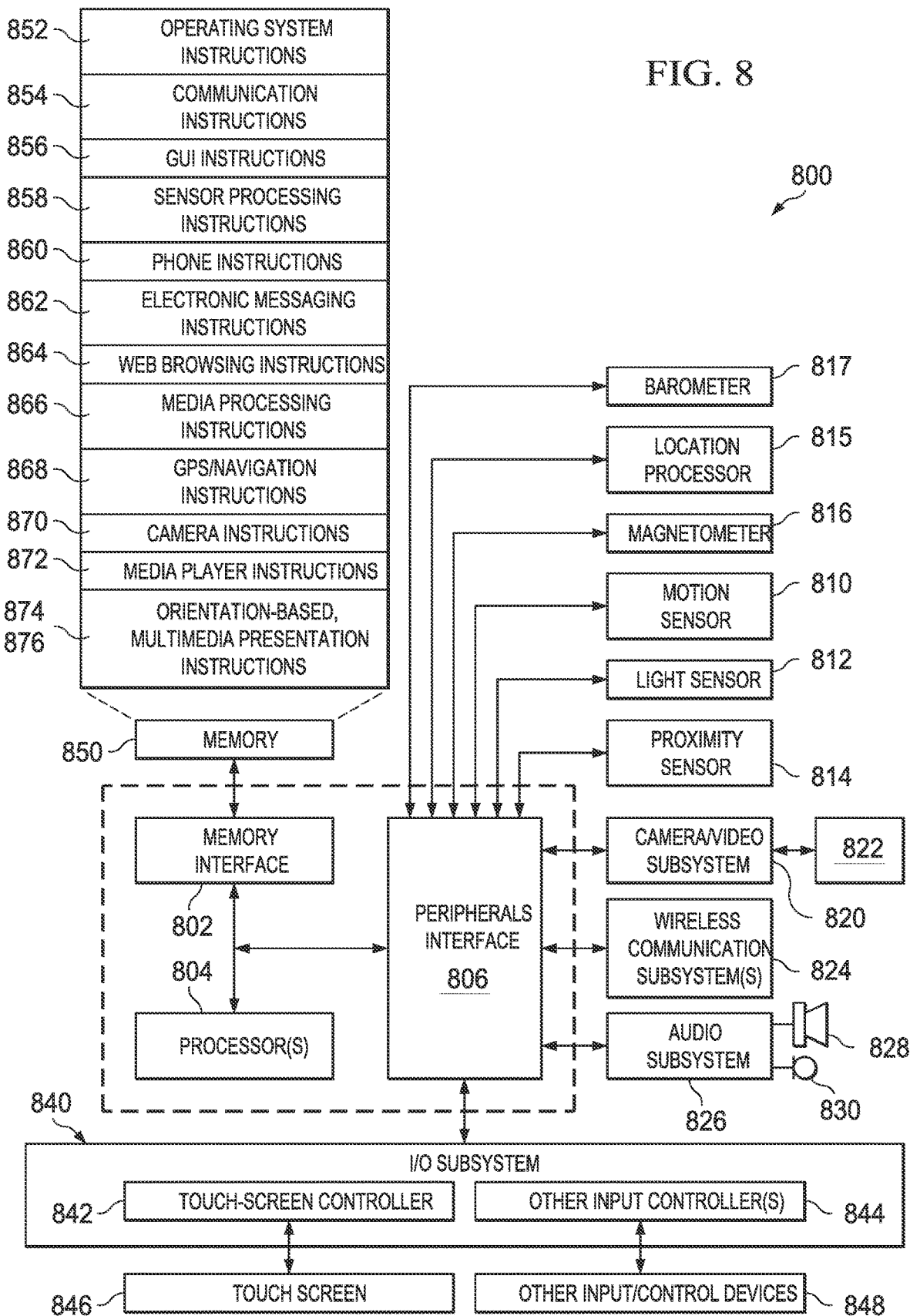
FIG. 8 illustrates an example device architecture of a media capture device implementing the media capture lock affordance described in reference to FIGS. 1-2, according to an embodiment.

FIG. 8 illustrates an example media capture device architecture 800 of a mobile device implementing the media capture lock affordance described in reference to FIGS. 6 and 7. Architecture 800 can include memory interface 802, one or more data processors, image processors and/or processors 804 and peripherals interface 806. Memory interface 802, one or more processors 804 and/or peripherals interface 806 can be separate components or can be integrated in one or more integrated circuits. The various components in architecture 800 can be coupled by one or more communication buses or signal lines.

Sensors, devices and subsystems can be coupled to peripherals interface 806 to facilitate multiple functionalities. For example, one or more motion sensors 810, light sensor 812 and proximity sensor 814 can be coupled to peripherals interface 806 to facilitate motion sensing (e.g., acceleration, rotation rates), lighting and proximity functions of the mobile device. Location processor 815 can be connected to peripherals interface 806 to provide geopositioning. In some implementations, location processor 815 can be a GNSS receiver, such as a Global Positioning System (GPS) receiver chip. Electronic magnetometer 816 (e.g., an integrated circuit chip) can also be connected to peripherals interface 806 to provide data that can be used to determine the direction of magnetic North. Electronic magnetometer 816 can provide data to an electronic compass application. Motion sensor(s) 810 can include one or more accelerometers and/or gyros configured to determine change of speed and direction of movement of the mobile device. Barometer 817 can be configured to measure atmospheric pressure around the mobile device.

Camera subsystem 820 and an optical sensor 822, e.g., a charged coupled device (CCD) or a complementary metal-oxide semiconductor (CMOS) optical sensor, can be utilized to facilitate camera functions, such as capturing photographs and recording video clips.

Communication functions can be facilitated through one or more wireless communication subsystems 824, which can include radio frequency (RF) receivers and transmitters (or transceivers) and/or optical (e.g., infrared) receivers and transmitters. The specific design and implementation of the communication subsystem 824 can depend on the communication network(s) over which a mobile device is intended to operate. For example, architecture 800 can include communication subsystems 824 designed to operate over GSM networks, GPRS networks, EDGE networks, a Wi-Fi™ or Wi-Max™ networks and Bluetooth™ networks. In particular, the wireless communication subsystems 824 can include hosting protocols, such that the mobile device can be configured as a base station for other wireless devices.

Audio subsystem 826 can be coupled to a speaker 828 and a microphone 830 to facilitate voice-enabled functions, such as voice recognition, voice replication, digital recording and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 846. Touch surface 846 can include, for example, a touch screen. I/O subsystem 840 can include a haptic engine or device for providing haptic feedback (e.g., vibration) in response to commands from a processor.

Other input controller(s) 844 can be coupled to other input/control devices 848, such as one or more buttons, rocker switches, thumb-wheel, infrared port, USB port and/or a pointer device such as a stylus. The one or more buttons (not shown) can include an up/down button for volume control of speaker 828 and/or microphone 830. Touch surface 846 or other controllers 844 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 802 can be coupled to memory 850. Memory 850 can include high-speed random access memory and/or non-volatile memory, such as one or more magnetic disk storage devices, one or more optical storage devices and/or flash memory (e.g., NAND, NOR). Memory 850 can store operating system 852, such as iOS, Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers, such as, for example, instructions for implementing a software stack for wired or wireless communications with other devices. Memory 850 may include graphical user interface instructions 856 to facilitate graphic user interface processing described in reference to FIGS. 6 and 7; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Location instructions 868 to facilitate generic GNSS and location-related processes and instructions; camera instructions 870 to facilitate camera-related processes and functions described in reference to FIGS. 6 and 7; and other application 872 instructions. The memory 850 may also store other software instructions (not shown), such as security instructions, web video instructions to facilitate web video-related processes and functions and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

In an embodiment, the taps, slide and lift gestures described in reference to FIGS. 6 and 7 are detected using a touch event model implemented in software on media capture device 800. An example touch event model is described in U.S. Pat. No. 8,560,975, entitled "Touch Event Model," issued on Oct. 15, 2013, which patent is incorporated by reference herein in its entirety.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

FIGS. 9A-9P and 10A-10F illustrate exemplary user interfaces for performing gesture-dependent media capture, in accordance with some embodiments. The user interfaces in these figures are used to illustrate the processes described below, including the processes in FIGS. 11A-11B.

Figure 9A:
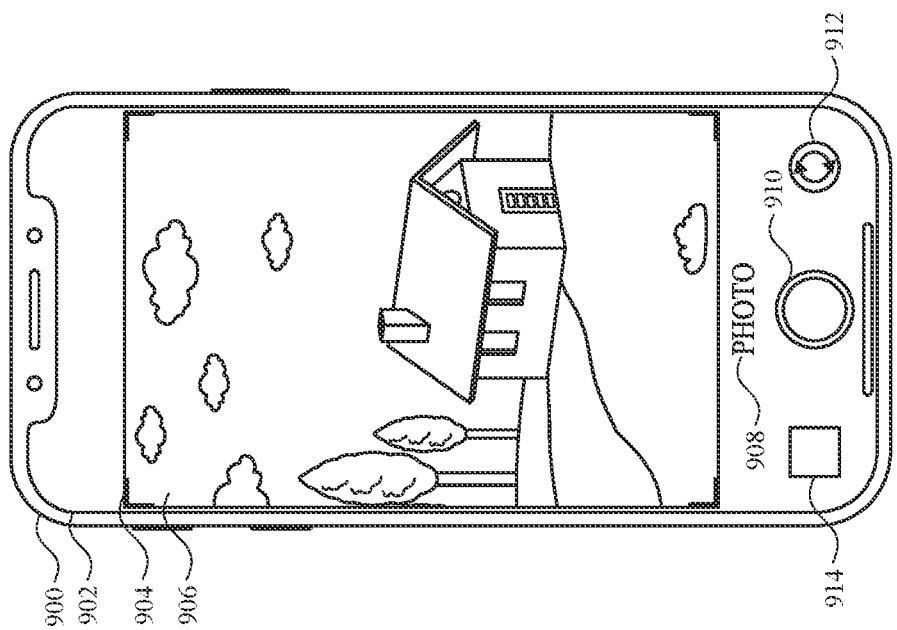
FIGS. 9A-9P illustrate exemplary user interfaces for performing gesture-dependent media capture in accordance with some embodiments.

FIG. 9A illustrates an exemplary media capture user interface 904. In some embodiments, device 900 includes one or more features of devices 100, 300, or 500. In this example, device 900 includes a touch screen display 902 that displays media capture interface 904. In some embodiments, a media capture interface is used to capture one or more types of media responsive to user input (e.g., touch input). For example, a media capture interface can be an graphical user interface that is usable to capture one or more of: still images, videos (e.g., including audio), and sequences of images (e.g., burst image capture). Media capture interface 904 includes a viewfinder area 906 that includes a depiction of a scene being acquired by a media capture component such as an image sensor (e.g., optical sensor 164), for example, that passes a view of the scene through for display at the media capture interface (e.g., so that the user can decide an appropriate time to capture a media item). Media capture interface 904 also includes a mode selector 908, for example, which can be used (e.g., via touch input, a swipe input) to change a media capture mode (e.g., from "Photo" to "Video", or to "Panoramic", "Time-Lapse", "Slow Motion", or the like). Media capture interface 904 also includes a media capture affordance 910. A media capture affordance can also be referred to as a "shutter" or "shutter affordance," or the like.

In some embodiments, a touch input (e.g., a tap gesture, also referred to as a tap) on a media capture affordance causes the device to capture a media item (e.g., in accordance with the current media capture mode). For example, in the example shown in FIG. 9A, the current media capture mode is "Photo", so the user can expect device 900 to capture a still image in response to a tap on media capture affordance 910. Media capture interface 904 also includes a camera selector affordance 912, which can be used to change (e.g., responsive to user input) the image sensor of device 900 being used to capture media (e.g., front facing camera, rear facing camera). Media capture interface 904 also includes a last captured media item area 914 that displays a preview of a last captured media item (e.g., a thumbnail, a single frame of a video). In some embodiments, in response to touch input associated with a last capture media item area (e.g., 914), the device (e.g., 900) displays one or more recently capture media items, a plurality of media items (e.g., a camera roll), and/or a media library.

As noted above, a device (e.g., 900) typically responds to user input on a media capture affordance (e.g., 910) based on the current media capture mode. Described herein are techniques for gesture-dependent capture of media. The gesture-dependency can cause media of different types to be captured, based on the particular gesture used. The particular gestures usable to capture media can have different properties based on user input characteristics (e.g., duration, movement, and/or various combinations thereof). As will be illustrated in the examples below of FIGS. 9A-9P, the type of media captured does not necessarily correspond to the media capture mode active when the touch input is received.

Notably, an input characteristic box 901 is included throughout FIGS. 9A-9P and indicates characteristics of a touch input (e.g., detected by electronic device 900) in the corresponding figure and is provided as a visual representation of the touch input characteristics (e.g., in memory of device 900) in the respective example scenario depicted in each respective figure. The input characteristics associated with a touch input can be used by a device (e.g., 900) to determine whether a touch input satisfies criteria for being considered a particular gesture (e.g., which can cause a media capture-related action to be performed). Input characteristic box 901 is provided merely as a visual aid for ease of the reader's understanding, and is not necessarily displayed by a device (e.g., 900). Additionally, unless otherwise noted in a figure or herein, input characteristic box 901 indicates characteristics of a touch input after device 900 receives the depicted touch input (e.g., 920 in FIG. 9B) in the respective figure, and before such input ceases to be detected (e.g., liftoff of the touch input).

FIGS. 9A-9B illustrate capture of a first type of media item. In the example depicted in FIGS. 9A-9B, device 900 captures a first type of media item that corresponds to the current media capture mode (e.g., "Photo"). In FIG. 9B, device 900 receives user input 920, which is a touch input at a location on touch screen display 902 corresponding to media capture affordance 910. As shown in input characteristic box 901 of FIG. 9B, the user input 920 (also referred to as touch input 920) has not met movement criteria (MOVEMENT CRITERIA: NOT MET), and has not been detected for longer than a threshold amount of time (THRESHOLD TIME: NOT PASSED). In this example, device 900 ceases to detect touch input 920 (e.g., due to liftoff of the input) before the movement criteria has been met and before the threshold time has passed. Thus, in this example, touch input 920 is a tap input gesture. FIG. 9C illustrates device 900 after liftoff of touch input 920. In FIG. 9C, media capture interface 904 returns to the same state as shown in FIG. 9A, however last captured media item area 914 now includes a representation of the current scene shown in viewfinder area 906, illustrating that device 900 captured a media item. In this example, device 900 captured a still image (e.g., an exemplary first type of media). In some embodiments, device 900 captures a second type of media item, in addition to the first type of media item, in response to a user input that did not meet movement criteria and that was not detected for more than a threshold time (e.g., a tap input). In some embodiments, the second type of media has a duration that is independent of the duration of the touch input. For example, device 900 can additionally (or instead) capture a video clip (e.g., including audio) of a fixed duration (e.g., 3 seconds long) or variable duration (e.g., between 2 to 5 seconds long) regardless of the duration of the touch input (e.g., 0.5 seconds).

FIGS. 9D-9F illustrate capture of a second type of media item. In the example depicted in FIGS. 9D-9F, device 900 captures a second type of media item (e.g., video) that does not correspond to the current media capture mode (e.g., "Photo") using a touch input that does not satisfy movement criteria, but that does satisfy time criteria (e.g., is detected for more than a threshold amount of time). In FIG. 9D, device 900 receives user input 930, which is a touch input at a location on touch screen display 902 corresponding to media capture affordance 910. As shown in input characteristic box 901 of FIG. 9D, the user input 930 has not met movement criteria (MOVEMENT CRITERIA: NOT MET), and has not been detected for longer than a threshold amount of time (THRESHOLD TIME: NOT PASSED).

FIG. 9E illustrates device 900 continuing to detect touch input 930 until after the threshold time has passed, however before the movement criteria has been met. Thus, input characteristic box 901 of FIG. 9E shows that the user input 930 has not met movement criteria (MOVEMENT CRITERIA: NOT MET), but has been detected for longer than a threshold amount of time (THRESHOLD TIME: PASSED). Thus, in this example, touch input 930 is a tap and hold input gesture (e.g., a tap that is held for a threshold amount of time). In response to touch input 930 being detected for more than a threshold amount of time, device 900 begins capturing (e.g., recording) a video (e.g., an exemplary second type of media). As shown in FIG. 9E, device 900 is currently capturing a video. In this example, during video capture, an elapsed time of the video is shown (00:00:08, or 8 seconds), and media capture affordance 910 has been replaced with a stop affordance 934. Additionally, in FIG. 9E, device 900 displays a media capture lock affordance 932 (e.g., replacing camera selector affordance 912), which is discussed in more detail below.

FIG. 9F illustrates device 900 after liftoff of touch input 930. In FIG. 9F, in response to liftoff of touch input 930, media capture interface 904 returns to the same state as shown in FIG. 9D, however last captured media item area 914 now includes a representation of the current scene shown in viewfinder area 906, illustrating that device 900 captured a media item. In this example, device 900 captured a video (e.g., an exemplary second type of media). In some embodiments, device 900 captures a first type of media item, in addition to the second type of media item, in response to a user input that did not meet movement criteria but that was detected for more than a threshold time (e.g., a tap and hold gesture, touch input 930). For example, in addition to capturing a video, device 900 can additionally capture a still image. In some embodiments, the second type of media (e.g., captured in response to touch input 930) has a duration that is based on the duration of the touch input (e.g., 930). For example, device 900 can capture a video clip (e.g., including audio) that has a duration based on the duration that touch input 930 was detected. Thus, if touch input 930 was detected on touch screen display 902 for 8 seconds, the resulting captured second type of media can be an 8 second long video. In some embodiments, the duration of the second type of media is based on the touch input duration, but video recording begins after the touch input is detected for more than the threshold duration. Thus, if the threshold duration is 1 second and the touch input is detected for 8 seconds, the resulting video is 7 seconds (e.g., where liftoff causes the recording of video to end, which is then stored in a media library by device 900).

Figure 9G:
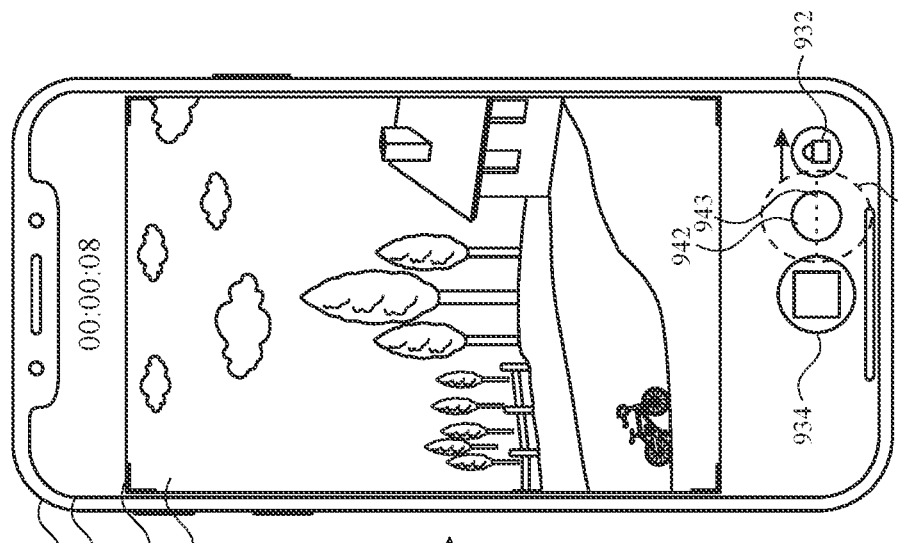

FIGS. 9G-9J illustrate using a gesture to begin capture of a second type of media that continues after the gesture ceases to be detected. In the example depicted in FIGS. 9G-9J, device 900 captures a second type of media item (e.g., video) that does not correspond to the current media capture mode (e.g., "Photo") using a touch input 940 that satisfies movement criteria (e.g., in a first direction) (and also satisfies time criteria). In FIG. 9G, device 900 receives user input 940, which is a touch input at a location on touch screen display 902 corresponding to media capture affordance 910. As shown in input characteristic box 901 of FIG. 9D, the user input 940 has not met movement criteria (MOVEMENT CRITERIA: NOT MET), and has not been detected for longer than a threshold amount of time (THRESHOLD TIME: NOT PASSED).

In the example in FIGS. 9G-9J, although touch input 940 is detected for longer than a threshold duration, the satisfaction of the threshold duration is not a requirement for transitioning the media capture session into a locked media capture state. Rather, in this example, the movement criteria being satisfied is the only requirement. In some embodiments, a threshold amount of time may additionally be required to lock the media capture session.

Figure 9H:
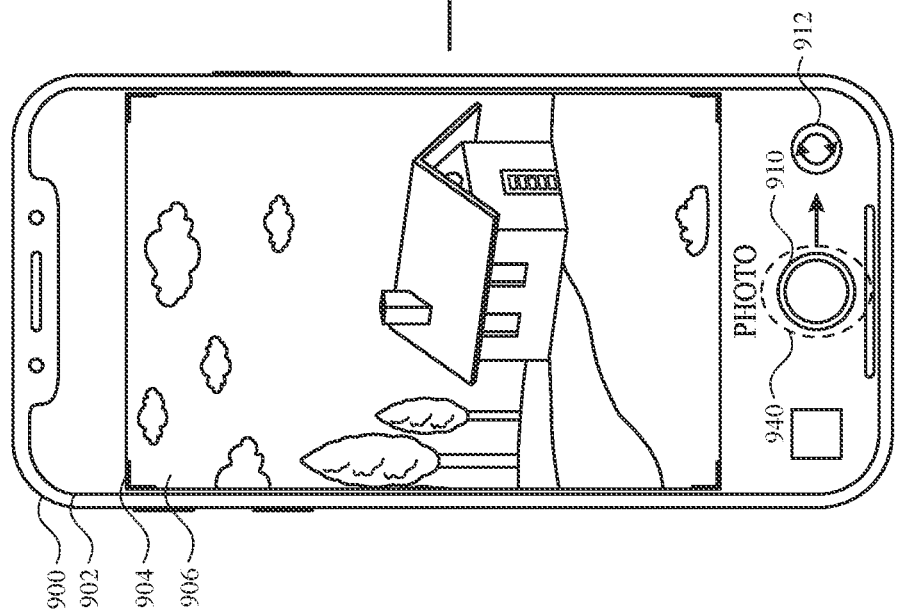

FIG. 9H illustrates device 900 continuing to detect touch input 940 until after the threshold time has passed, however before the movement criteria has been met. Thus, input characteristic box 901 of FIG. 9H shows that the user input 940 has not met movement criteria (MOVEMENT CRITERIA: NOT MET), but has been detected for longer than a threshold amount of time (THRESHOLD TIME: PASSED). Similar to the example describe above in FIGS. 9D-9F, in response to a touch input that is detected for longer than a threshold period, device 900 has begun capturing (e.g., recording) a video (e.g., an exemplary second type of media). In this example, touch input 940 is a touch input that is dragged from an initial location of contact (e.g., location of 910). As used herein a touch input that is "dragged" is also referred to as a touch input that "slides." In FIG. 9H, touch input 940 has been dragged to the right of media capture affordance 910. As shown in FIG. 9H, device 900 is currently capturing a video. In this example, an elapsed time of the video is shown (00:00:08, or 8 seconds), and media capture affordance 910 has been replaced with a stop affordance 934. A stop affordance is also referred to herein as a "locked state capture button" (e.g., when it replaces a media capture affordance during a locked media capture session). In some embodiments, a stop affordance (e.g., 934) replaces a media capture affordance (e.g., 910) in response to liftoff of the touch input (e.g., that causes a media capture session to enter a locked media capture state). Additionally, in FIG. 9H, device 900 displays a media capture lock affordance 932 (e.g., replacing camera selector affordance 912), which is discussed in more detail below.

Notably, the scenario depicted in FIG. 9H is similar to the scenario in FIG. 9E, except that the touch input in FIG. 9H (940) has moved to the right slightly, and the touch input in FIG. 9E (930) has not moved. Thus, because touch input 940 has not met the movement criteria, but has been detected for longer than the threshold time, if touch input 940 were to cease to be detected (e.g., due to liftoff of touch input 940) at the instant depicted in FIG. 9H, a similar result as that shown in FIG. 9F would occur—device 900 would capture a video having a duration based on the duration that touch input 940 was detected. However, in this example touch input 940 continues to be detected, as shown in FIGS. 9I and 9J, discussed below.

In FIG. 9H, device 900 displays a touch input indicator 942 that is a representation of the current location of touch input 940. In this example, touch input indicator is displayed in response to movement of the touch input 940 (e.g., movement of the touch input away from the area associated with media capture affordance 910 (FIG. 9G)/stop affordance 934 (FIG. 9H)). Also depicted is a movement path indicator 943, which is displayed between stop affordance 934 (or media capture 910 if it had not been replaced by stop affordance 934) and media capture lock affordance 932. Touch input indicator 942 moves along the indicated movement path in response to dragging (also referred to as "sliding") of touch input 940 (e.g., in one or either direction left or right).

Figures 9I, 9J:
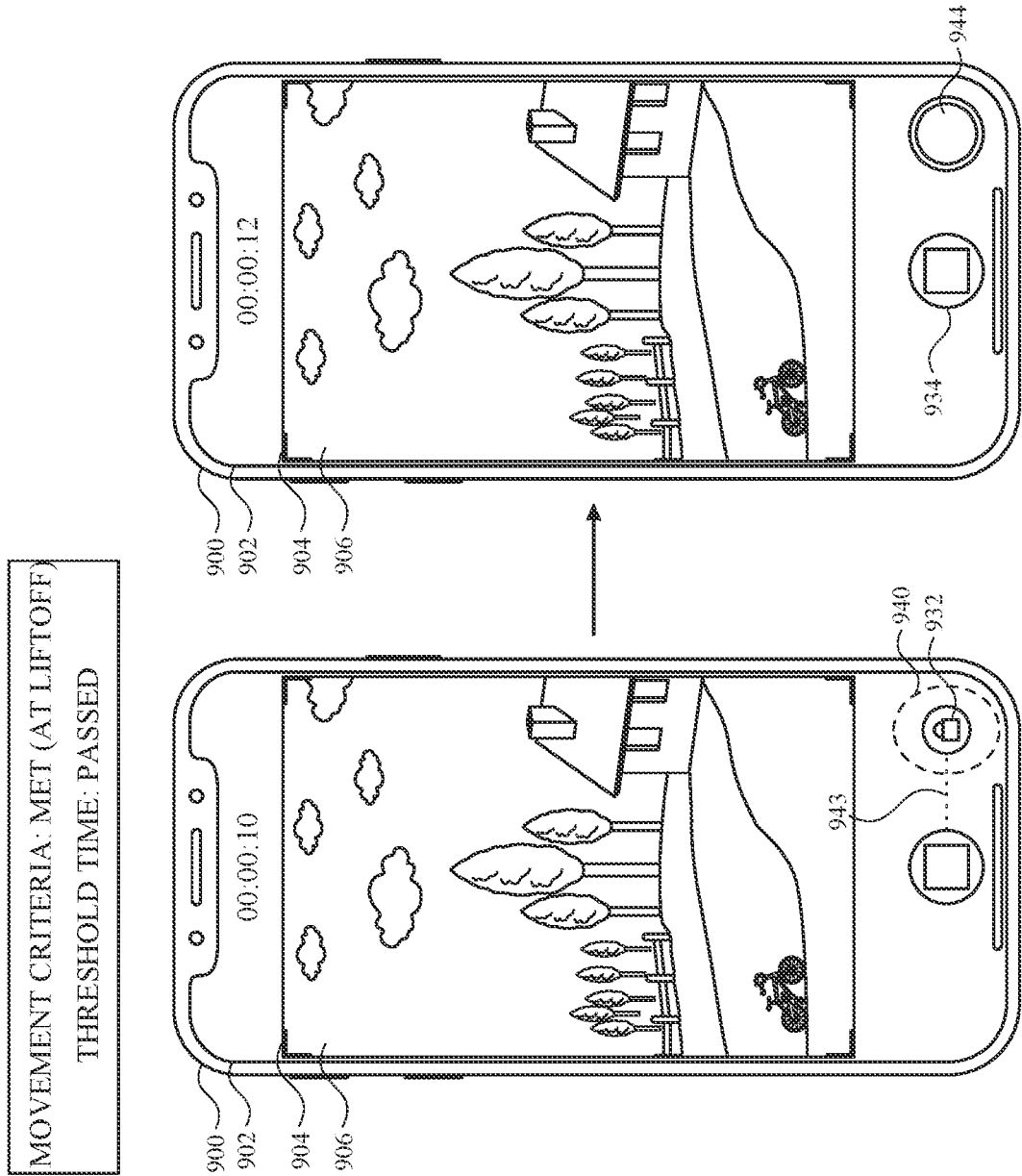

Turning now to FIGS. 9I and 9J, they illustrate a technique for continuing capture of media after ceasing to detect a user input. As discussed above with respect to FIGS. 9B-9C, a device optionally captures a first type of media in response to a user input (e.g., gesture) that has certain characteristics (e.g., no movement, detected for less than a threshold time). As discussed above with respect to FIGS. 9D-9F, the device optionally captures a second type of media (e.g., video) that is based on a duration of a user input if the user input has other characteristics (e.g., no movement (or movement not meeting criteria), and is detected for more than a threshold time). In some embodiments, the device continues to capture of the second type of media to continue even after the touch input ceases to be detected.

In FIG. 9I, touch input 940 has moved further to the right and is now at a location that corresponds to media capture lock affordance 932. In this example, movement criteria is met when a touch input (e.g., 940) is moved (e.g., dragged) from a location of the media capture affordance 910 (e.g., at touch-down) (or from a location of a stop affordance (e.g., 934) that has replaced media capture affordance) to a location of media capture lock affordance 932. In some embodiments, the device determines whether movement criteria is met in response to the user input ceasing to be detected (e.g., at time of liftoff of the touch input). Thus, input characteristic box 901 of FIG. 9I shows that the user input 940 will meet movement criteria if liftoff occurs at the current location (MOVEMENT CRITERIA: MET (AT LIFTOFF)), and that the touch input has been detected for longer than a threshold amount of time (THRESHOLD TIME: PASSED).

As shown in FIG. 9I, movement indicator 942 does not cover/obscure media capture lock affordance 932 while the contact is at the corresponding location and continues to be detected. In some embodiments, a movement indicator (e.g., 942) covers/obscures a media capture lock affordance (e.g., 932) while the contact is at the corresponding location and continues to be detected. As shown in FIG. 9I, media capture interface 904 remains in a video recording state—stop affordance 934 continues to be displayed, and the elapsed time of the video capture continues to be displayed (00:00: 10, or 10 seconds).

FIG. 9J illustrates device 900 after liftoff of touch input 940. In response to ceasing to detect touch input 940, and because liftoff of touch input 940 occurred after meeting the movement criteria (e.g., liftoff on affordance 932), device 900 continues capturing the second type of media (e.g., video recording). Continuing to capture media is also referred to herein as "maintaining" a media capture session. In this example, device 900 continues capturing the second type of media because the media capture session (e.g., capturing of the video) was transitioned from an unlocked media capture state to a locked media capture state. A media capture state is also referred to herein as a "media capture session state." As used herein, a media capture session that is in an unlocked media capture state is also referred to a media capture session that is "unlocked." As used herein, a media capture session that is in a locked media capture state is also referred to a media capture session that is "locked." In some embodiments, when a media capture session is in a locked media capture state, the media session continues (e.g., after ceasing to detect a touch input gesture that causes the media session to begin). As shown in FIG. 9J, media capture interface 904 remains in a video recording state—stop affordance 934 continues to be displayed, and the elapsed time of the video capture continues to be displayed (00:00:12, or 12 seconds) (e.g., and progresses further as more time passes during capture). Also shown in FIG. 9J, device 900 displays image capture affordance 944, which can be used to capture a first type of media (e.g., still image, and/or fixed duration clip) while continuing to capture a second type of media (e.g., video). In this example, device 900 continues capturing a video (e.g., an exemplary second type of media).

In some embodiments, device 900 captures a first type of media item, in addition to the second type of media item, in response to a user input that met movement criteria and that was detected for more than a threshold time. For example, in addition to capturing a video, device 900 can additionally capture a still image in response to touch input 940. In some embodiments, the still image is discarded. For example, a first type of media (e.g., still image) can be taken in response to touch-down of a touch input, but the device can discard the first type of media if a second type of media is captured (e.g., touch input continues for threshold time, or meets movement criteria).

In some embodiments, the device determines whether movement criteria is met while the user input continues to be detected. For example, device 900 can determine that touch input 940 met the movement criteria upon reaching a particular location, such as the location of media capture lock affordance 932 in FIG. 9I. In such example, in response to the user input meeting the movement criteria, the device can cause the current media capture session to transition to a locked media capture state (e.g., as shown in FIG. 9J) without first requiring liftoff (e.g., even when touch input 940 is still detected). Thus, device 900 can continue capture of the second type of media despite additional movement of the touch input 940 (e.g., to a location as shown in FIG. 9H, back in the direction of media capture affordance 910) and liftoff at a location other than that of media capture lock affordance 932. In some embodiments, liftoff (e.g., of touch input 940) on media capture affordance (e.g., 910) or on a stop affordance (e.g., 934) causes the device (e.g., 900) to cease capture of media (e.g., media capture does not continue after liftoff).

In some embodiments, the movement criteria is met if the touch input is dragged toward a media capture lock affordance (e.g., 932) by at least a predetermined amount (e.g., percentage, fixed distance). For example, if touch input 940 drags movement indicator 942 at least 50% of the distance between the location of media capture affordance 910 in FIG. 9G (e.g., same location as stop affordance 934 in FIG. 9H) and media capture lock affordance 932, then the movement criteria can be met (e.g., immediately, or upon liftoff). This is depicted in the examples illustrated in FIGS. 10A-10F, which are discussed in more detail below.

In some embodiments, the movement criteria requires movement in a particular direction (e.g., right, left, down, up) (e.g., in order to be met). For example, FIGS. 9G-9J illustrate movement to the right (of media capture affordance 910) being required to meet the movement criteria. In some embodiments, movement criteria is satisfied by movement in one or more directions (e.g., movement to the left or right can satisfy movement criteria).

Figure 9L:
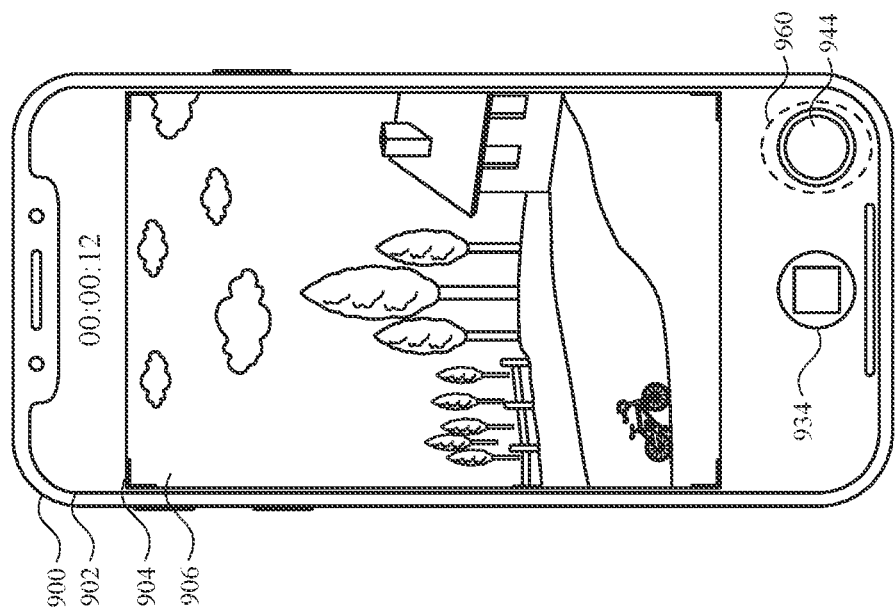
Figure 9K:
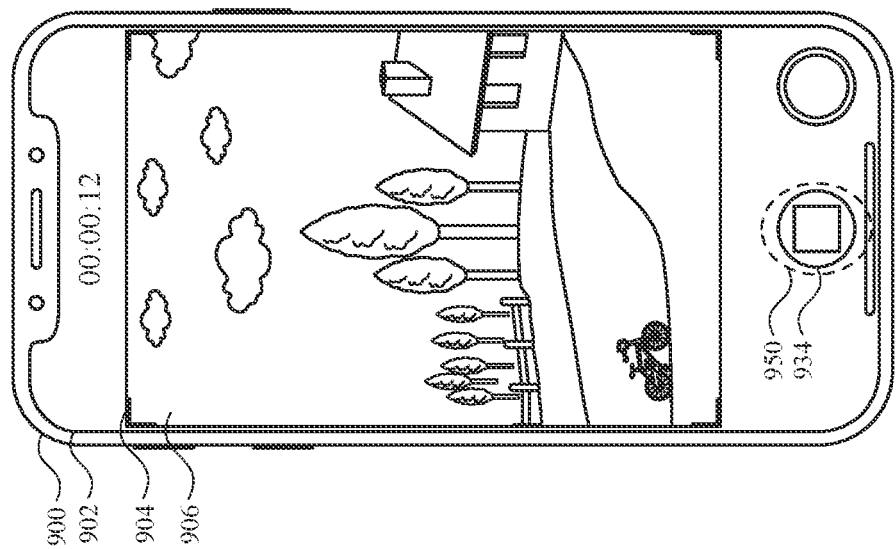

FIG. 9K illustrates an exemplary technique for ceasing to capture a second type of media while a media session is in a locked media capture state. Because media continues being captured upon liftoff of touch input 940, a touch input 950 on stop affordance 934 can be used to cause device 900 to cease to capture of a video. For example, in response to touch input 950, device 900 can cease to record a video, and display media capture interface 904 as shown in FIG. 9F (e.g., depicting nothing currently being recorded).

FIG. 9L illustrates an exemplary technique for capturing a first type of media while a media session is in a locked media capture state. In FIG. 9L, device 900 receives user input 960 on image capture affordance 944, which can be used to cause device 900 to capture a first type of media (e.g., still image, and/or fixed duration clip) while recording a second type of media (e.g., video). In this example, device 900 continues capturing a video (e.g., an exemplary second type of media) after touch input 960. In response to touch input 960, device 900 captures a still image from a video frame (e.g., including storing the still image in a media library).

FIGS. 9M-9P illustrate capture of a sequence of the first type of media item using a touch input gesture. In the example depicted in FIGS. 9M-9P, device 900 captures a sequence of the first type of media item (e.g., still images) using a touch input that satisfies a second movement criteria. In some embodiments, the device determines whether a user input (e.g., touch input) meets one or more different movement criteria (e.g., a first movement criteria and a second movement criteria). For example, an exemplary first movement criteria can be the movement criteria discussed above with respect to FIGS. 9B-9K, where meeting the criteria causes the device to change a media capture session to the locked media capture state. In some embodiments, meeting a second movement criteria causes device 900 to take a different media capture action (e.g., different than what is taken in response to the first movement criteria being met). In this example, device 900 performs a burst media capture in response to detecting a touch input that meets a second movement criteria, discussed in more detail below.

Figure 9M:
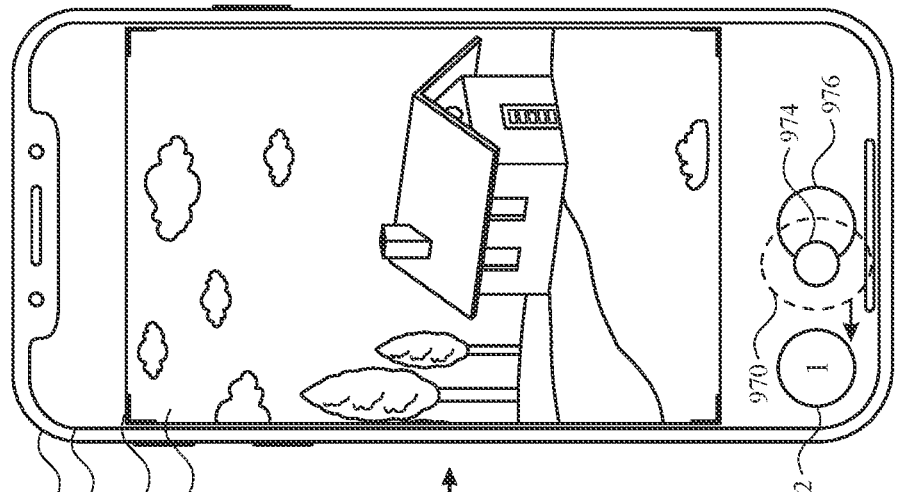

In FIG. 9M, device 900 receives user input 970, which is a touch input at a location on touch screen display 902 corresponding to media capture affordance 910. As shown in input characteristic box 901 of FIG. 9D, the user input 970 has not met movement criteria (MOVEMENT CRITERIA: NOT MET), and has not been detected for longer than a threshold amount of time (THRESHOLD TIME: NOT PASSED).

Figure 9N:
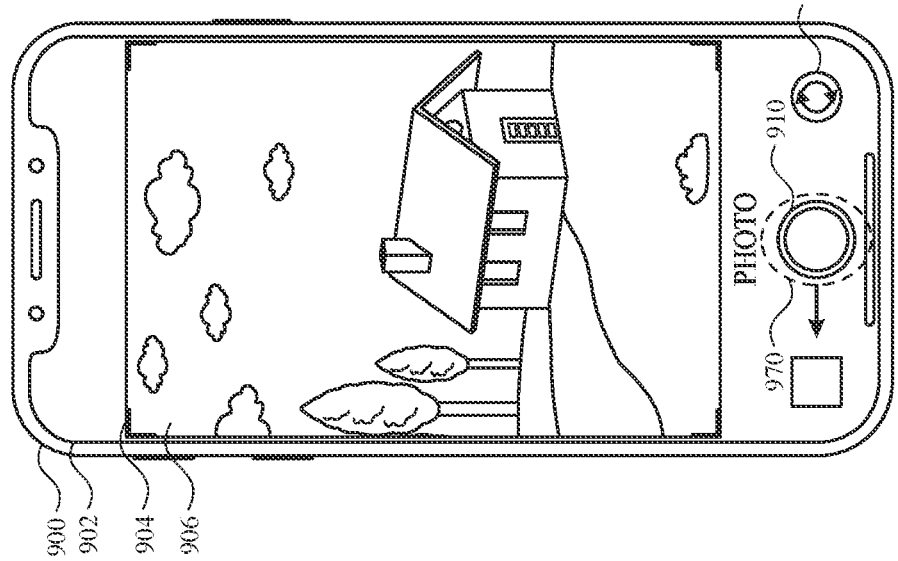

FIG. 9N illustrates device 900 continuing to detect touch input 970 until after the threshold time has passed, and after movement criteria has been met. Thus, input characteristic box 901 of FIG. 9H shows that the user input 940 has not met movement criteria (MOVEMENT CRITERIA: MET), but has been detected for longer than a threshold amount of time (THRESHOLD TIME: PASSED). In the example in FIG. 9N, the movement criteria that has been met is a second movement criteria. In this example, the second movement criteria is different from the (first) movement criteria described above with respect to FIGS. 9B-9K. In this example, the second movement criteria includes a threshold amount (e.g., any amount, a minimum amount) of movement in a second direction. In the example in FIG. 9N, the touch input 970 has moved in the second direction (e.g., to the left), different than a first direction (e.g., right), by a minimum amount (e.g., a minimum amount of pixels). In response to detecting that touch input 970 satisfies the second movement criteria in the second direction, device 900 begins capturing a sequence of media items of the first type of media item (e.g., begins capturing images in a "burst" image capture mode). In this example, the device 900 continues capturing the sequence of media items until ceasing to detect the touch input 970. In some embodiments, the device enters a locked media capture state while capturing the sequence of media items. For example, device 900 optionally provides the ability to lock the media capture session into the burst mode, so that the burst shooting continues upon liftoff of the touch input 970, similar to as described above with respect to video in FIGS. 9G-9J. Similar to as described above, the burst mode can be locked based on a touch input meeting one or more movement criteria (e.g., a third movement criteria).

It should be noted that the description of the details of the first movement criteria and of the second movement criteria are not intended to be exclusive to either, or to limit the properties of either (e.g., in implementations of the techniques herein that differ from the examples used herein). Thus, the specific details described with respect to a specific movement criteria herein are merely for example, and one of skill appreciates that a movement criteria can have one or more characteristics of any movement criteria described herein.

As shown in FIG. 9N, while continuing to detect touch input 970, device 900 continues to capture the sequence of media items. While continuing to capture the sequence of media items, device 900 displays a touch input indicator 974 representing the location of touch input 970. Touch input indicator 974 moves along an exemplary movement path indicator 975 (FIG. 9O). Device 900 also displays a sequence count 972, which indicates the number of media items that have been captured during the ongoing (burst) media capture session capturing the sequence of media items. As shown in FIG. 9N, one media item has been captured so far since device 900 began capturing the current sequence (e.g., in response to user input 970), as depicted by the number "1" in sequence count 972.

FIGS. 9O and 9P illustrate device 900 continuing to capture a sequence of media items while a touch input continues to be detected. In FIG. 9O, touch input 970 continues to be detected, and has been dragged further to the left, and the sequence count 976 now reads "10" (e.g., 10 media items of the first type have been captured). In FIG. 9O, touch input indicator 974 moves along an exemplary movement path indicator 975 (shown as a solid line). In some embodiments, the device (e.g., 900) moves (e.g., creates a duplicate, repositions, displays a new user interface element containing) a sequence count in response to movement of the touch input. For example, in FIG. 9O, in response to the touch input 970 moving toward (e.g., nearing, or reaching) a location of the sequence count 972 (of FIG. 9N), device 900 displays the number of captured media items at a new location, in sequence count 976 (corresponding to the original location of media capture affordance 910). In some embodiments, the device (e.g., 900) ceases displaying the sequence count (e.g., 972) at the initial display location, in accordance with moving the sequence count (e.g., to 976). In this way, device 900 prevents a dragged touch input from covering the sequence count. In some embodiments, the sequence count does not move in response to touch input movement. For example, the sequence count can be displayed at a single location (e.g., either the location of 972, 976, or another location) and not move in response to the touch input moving to the corresponding location. In some embodiments, the sequence count moves a second time in response to additional movement. For example, if the touch input moves back to the location of sequence count 976, the sequence can move again (e.g., be displayed again as sequence count 972).

In FIG. 9P, touch input 970 continues to be detected, and has been dragged further to the left, and the sequence count 976 now reads "20" (e.g., 20 media items of the first type have been captured). In some embodiments, the device (e.g., 900) ceases to capture the sequence of media items in response to ceasing to detect the touch input. For example, if device 900 ceases to detect touch input 970 at the moment depicted in FIG. 9P, capture of the sequence of media items would cease (e.g., after having captured 20 media items of the first type). In such example, in response to liftoff of touch input 970, device 900 can display a media capture interface 904 similar to as shown in FIG. 9F, with a last captured media item area 914 now including a representation of one of the 20 media items captured in the sequence of media items.

In some embodiments, an amount and/or speed of movement of a touch input affects a characteristic of the capturing of the sequence of media items of the first type. For example, a touch input with movement above a threshold speed (e.g., speed of movement on the touch screen display) can cause the rate of burst image capture to increase (e.g., to higher than a similar touch input that moved at a slower speed) and/or remain at higher rate (e.g., than a similar touch input that moved at a slower speed). As another example, a touch input that moves a larger distance from an initial position (e.g., of 910) can cause a rate of burst image capture to be larger than a touch that moved a smaller distance.

FIGS. 10A-10F illustrate exemplary interfaces for causing a media capture session to transition from an unlocked media capture state to a locked media capture state. In particular, FIGS. 10A-10F illustrate an exemplary detail view of a touch input that interacts with one or more affordances to cause a media session to enter a locked media capture state, as described above with respect to FIGS. 6A-6F and 9A-9P. The interfaces illustrated in FIGS. 10A-10F can be displayed by device 900 (e.g., at one or more of the interfaces shown in FIGS. 9A-9P).

FIG. 10A depicts an exemplary media capture affordance 1000. For example, media capture affordance 1000 can include the same functionality as described above with respect to media capture affordance 602 or 910.

In FIG. 10B, a user input 1002 (also referred to as touch input 1002) is received at a location associated with the media capture affordance 1000 (e.g., the user input is detected by a device displaying affordance 1000). In this example, similar to as described above with respect to touch input 930 of FIGS. 9D and 9E, touch input 1002 is detected for longer than a threshold amount of time, and thus capture of a media (e.g., video) has begun (e.g., in response to the device detecting touch input 1002, or in response to the touch input 1002 being detected for longer than a threshold duration). As illustrated by the arrow in FIG. 10B, touch input 1002 includes a movement component in a direction to the right of media capture affordance 1000. Also shown in FIG. 10B, a media capture lock affordance 1004 is now displayed to the right of media capture affordance 1000. For example, media capture lock affordance 1004 can include the same functionality as described above with respect to media capture lock affordance 932. FIG. 10B also illustrates movement path indicator 1005 connecting media capture affordance 1000 and media capture lock affordance 1004, indicating a movement direction toward the media capture lock affordance 1004. A movement path indicator is also referred to as a "visual direction indicator" as used herein.

In FIG. 10C, touch input 1002 has moved to the right slightly from FIG. 10B, and in FIG. 10D the touch input 1002 has moved even farther to the right from FIG. 10C. In FIG. 10D, touch input indicator 1006 has not yet passed lock distance marker 1008. Touch input indicator 1006 can include one or more features of touch input indicator 942 described above. In some embodiments, a lock distance marker (e.g., 1008) can be displayed (e.g., on a movement path indicator 1005) showing a location associated with (e.g., sufficient to meet) movement criteria. In FIG. 10D, lock distance marker 1008 indicates the distance that meets movement criteria for locking a media capture session state. In FIGS. 10C and 10D, the video continues being captured, as touch input 1002 continues to be detected.

In FIG. 10E, touch input 1002 has moved to the right and has passed lock distance marker 1008. In this example, the movement criteria does not require liftoff of the touch input (e.g., 1002) to satisfy the movement criteria for causing a media capture session to transition to a locked media capture state. Accordingly, in FIG. 10E, the media capture session (e.g., recording of video) has entered a locked media capture state. For example, as shown in FIG. 10F, video capture continues (e.g., stop affordance 1010 is displayed, illustrating that a video is recording) after liftoff of touch input 1002 at the position in which it is depicted in FIG. 10E. Also shown in FIG. 10E, media capture lock affordance 1004 has been replaced with display of image capture affordance 1012 (e.g., similar to image capture affordance 944), which can be used to capture media (e.g., a first type, such as a still image, and/or fixed duration clip) while recording a second type of media (e.g., video).

In FIG. 10F, the device has ceased to detect touch input 1002, but continues capturing media (e.g., recording a video), similar to as described above with respect to FIG. 9J. In this example, liftoff of touch input 1002 occurred while at the location depicted in FIG. 10E (e.g., before reaching the location associated with media capture lock affordance 1004), but still resulted in the continuation of the media capture session because the movement of touch input 1002 moved (as represented by touch input indicator 1006) past lock distance marker 1008. In some embodiments, the device does not display one or more of: a touch input indicator (e.g., 1006), a lock distance marker (e.g., 1008), and a movement path indicator (e.g., 1005). For example, with reference to FIG. 10E, a device can display less than all (or none) of touch input indicator 1006, lock distance marker 1008, and movement path indicator 1005, but still perform that same action in response to liftoff as described with respect to FIGS. 10E and 10F.

In the description above, touch inputs 920, 930, 940, 970, and 1002 are referred to by different reference numerals. However, these touch inputs are intended to represent a plurality of potential gestures and/or results that can occur based on whether the touch input ends up being one or more gesture inputs. That is, each of the touch inputs 920, 930, 940, 970, and 1002 represent different possible outcomes for a single touch input. For example, touch inputs 920 and 930 begin in the same location and during the same device conditions and represent a common starting point for a touch input—however, one becomes a tap gesture (920) and one becomes a tap and hold gesture (930), and thus cause different media capture actions to be taken. Accordingly, the user can be provided control of a plurality of media capture actions of a device based on which gesture the user performs with a touch input.

Additionally, the examples described above are illustrative and are not intended to be limiting with respect to the various combinations of gestures, media actions, movement criteria, and threshold amounts of time. For example, while video capture is described with respect to movement in a rightward direction, burst media capture can be performed in response to movement to the right instead. Likewise, movement to the left can result in capture of media of the first type (e.g., a still image) instead of resulting in burst media capture as described above. One of skill would recognize that various combinations of gestures, media actions, movement criteria, and threshold amounts of time can be combined and/or arranged in any combination to create a user interface in accordance with the scope of this disclosure. All such interfaces are intended to be within the scope of this disclosure.

FIG. 11 is a flow diagram illustrating a method for performing gesture-dependent media capture using an electronic device in accordance with some embodiments. Method 1100 is performed at a device (e.g., 100, 300, 500, 800) with a display, a touch-sensitive surface, and one or more media capture components (e.g., image sensors, cameras). Some operations in method 1100 are, optionally, combined, the orders of some operations are, optionally, changed, and some operations are, optionally, omitted.

As described below, method 1100 provides an intuitive way for performing gesture-dependent media capture. The method reduces the cognitive burden on a user for performing media capture, thereby creating a more efficient human-machine interface. For battery-operated computing devices, enabling a user to perform media capture faster and more efficiently conserves power and increases the time between battery charges.

The electronic device (e.g., 600, 900) displays (1102) (e.g., at 601, at 904), on the display (e.g., touch screen display 902), a first user interface element (e.g., 910, 602, 1000). The electronic device detects (1104) (e.g., while displaying the first user interface element), via the touch-sensitive surface (e.g., touch screen display 902), a touch input (e.g., 603, 920, 930, 940, 970, 1002) that begins (e.g., touch-down (finger-down) event of an object on a touch-sensitive surface) at a location on the touch-sensitive surface that corresponds to the first user interface element (e.g., location of 910, location of 602, location of 1000).

In response to detecting the touch input (1106), and in accordance with a determination that the touch input (e.g., 920) is lifted from the touch-sensitive surface (e.g., 902) before the touch input meets movement criteria and before a threshold amount of time (e.g., 1 second) (e.g., an amount of time before video begins recording automatically) has elapsed since the touch input was detected (e.g., touch-down event of touch input on the touch screen display 902), the electronic device (e.g., 600, 900) captures (1108) a first type of media (e.g., a single image, and/or a video having a fixed duration). For example, FIGS. 9B-9C illustrate device 900 capturing a first type of media in accordance with a determination that exemplary touch input 920 (a tap input gesture) is lifted from touch screen 902 before the touch input meets movement criteria and before a threshold amount of time has elapsed since the touch input was detected.

In some embodiments, a determination that the touch input (e.g., 920) is lifted from the touch-sensitive surface (e.g., 902) before the touch input meets movement criteria includes a determination that the touch input is lifted before more than a threshold amount of movement (e.g., movement sufficient to cause a media capture session to enter a locked media capture state from an unlocked media capture state) has been detected. For example, a threshold amount can be a predefined distance from touch-down location (e.g., a media capture affordance), or a distance to a predefined region/area/location from a touch-down location (e.g., a media capture affordance). In some embodiments, a determination that the touch input is lifted from the touch-sensitive surface before the touch input meets movement criteria includes a determination that the touch input is lifted: before the touch input has moved outside of a first region (e.g., area, location) corresponding to a media capture affordance (e.g., 910, 602, 1000) and/or before the touch input has moved into a second region (e.g., area, location) associated with capture of a second type of media that continues after detecting liftoff. For example, the first region can be the location of media capture icon affordance 910 (or stop affordance 934 if it replaced 910 in accordance with beginning to record second type of media), while the second region can be the media capture lock affordance 932. For further example, the second region can be a region along a movement path indicator (e.g., 974, 1005) (e.g., the region past a certain point or distance from affordance 1000 or 1010, such as to the right of lock distance marker 1008 of FIG. 10E).

In some embodiments, capturing media includes one or more of: using the one or more media capture components (e.g., image sensors, cameras) to record one or more images (e.g., a single image, a video comprising a series of images), recording audio (e.g., while recording video) (e.g., using one or more microphones), and storing a media item (e.g., a recording still image, a recorded video) in a media library. For example, capturing a media item can include beginning to record a video clip, ceasing to record that video clip, and storing the video clip so that it is associated with (e.g., accessible in) a media library (e.g., a camera roll) associated with the device. As another example, "beginning to capture" can refer to the device beginning a recording of a video. As another example, "ceasing to capture" can refer to the device ceasing (e.g., stopping the video recording) a recording of a video. In some embodiments, the captured video resulting from "ceasing to capture" is stored in a media library (e.g., automatically in accordance with the video ceasing to be recorded). In some embodiments, the device (e.g., 600, 900) captures the first type of media in response to detecting touch-down of the touch input on the touch-sensitive surface. In some embodiments, the device captures the first type of media at any time during detection of the touch input (e.g., beginning with touch-down) and liftoff of the touch input on the touch-sensitive surface. In some embodiments, the device captures the first type of media in response to liftoff of the touch input from the touch-sensitive surface. In some embodiments, the first type of media is captured (or begins being captured) before the touch-down of the touch input on the touch-sensitive surface. For example, the device (e.g., 600, 900) can be recording before (e.g., in anticipation of) a touch input, and in response to the touch input captures one or more media items that were captured or began being captured (e.g., for a video) before the touch input (e.g., 603, 920, 930, 940, 970, 1002) was actually detected by the device.

In response to detecting the touch input (1106), and in accordance with a determination that the touch input (e.g., 930) is lifted from the touch-sensitive surface before the touch input meets the movement criteria (e.g., before a threshold amount of movement has been detected, before the touch input has moved outside of a first region corresponding to a capture affordance (e.g., 910, 602, 1000), and/or or before the touch input has moved into a second region associated with capture of the second type of media that continues after detecting liftoff (e.g., at affordance 932)) and after the threshold amount of time (e.g., 1 second) has elapsed since the touch input was detected (e.g., touch-down event on touch screen 902), the electronic device (e.g., 600, 900) captures (1110) a second type of media (e.g., a video, including audio) that has a duration that is based on the duration of the touch input on the touch-sensitive surface. For example, in response to exemplary tap and hold gesture touch input 930, device 900 captures a video having a length based on (e.g., equal to) the duration of the touch input. In some embodiments, the duration of the second type of media is the same as the duration during which the touch input was detected on the touch-sensitive surface. For example, if the touch input duration is 8 seconds, then the resulting video is 8 seconds. In some embodiments, the duration of the second type of media is the duration from when the touch input exceeded the threshold amount of time until liftoff of the touch input from the touch-sensitive surface. For example, if the touch input duration is 8 seconds and the threshold amount of time is 1 second, then the resulting video is 7 seconds. In some embodiments, the touch input includes movement that does not satisfy the movement criteria for causing a media capture session to enter a locked media capture state, and the device (e.g., 600, 900) begins capturing the second type of media anyway (e.g., in response to the touch input meeting the threshold amount of time, or in response to movement (e.g., a particular amount of movement in a particular direction) of the touch input). In some embodiments, the touch input has not been detected for a threshold amount of time before the touch input meets a movement criteria (e.g., same or different than a criteria for enabling a media capture lock state) that causes the device (e.g., 600, 900) to begin capturing the second type of media anyway (e.g., in response to movement (e.g., by a minimum amount) of the touch input toward a media capture lock affordance). FIGS. 9D-9F illustrate device 900 capturing a second type of media, that has a duration that is based on the duration of the touch input on the touch-sensitive surface, in accordance with a determination that exemplary touch input 930 is lifted from the touch-sensitive surface before the touch input meets the movement criteria and after the threshold amount of time has elapsed since the touch input was detected.

In response to detecting the touch input (1106), and in accordance with a determination that the touch input (e.g., 940, 603) meets the movement criteria and includes movement (e.g., as shown in FIGS. 9G-9I) in a first direction (e.g., the touch input includes more than a threshold amount of movement (e.g., movement from a location of a media capture affordance 910 to a location of a media capture lock affordance 932) in the first direction (e.g., toward a first edge of the touch-sensitive surface; from media capture affordance 910 toward media capture lock affordance 932) or when the touch input has moved into a second region associated with capture of the second type of media that continues after detecting liftoff (e.g., at affordance 932)), the electronic device (e.g., 600, 900) starts (1112) to capture the second type of media (e.g., video) and continues to capture the second type of media after detecting liftoff of the touch input from the touch-sensitive surface. For example, FIGS. 9G-9J illustrate device 900 starting to capture and continuing to capture (after liftoff) a second type of media, in accordance with a determination that exemplary touch input 940 meets movement criteria (e.g., liftoff on a location of affordance 932) and includes movement in a first direction (e.g., toward affordance 932). For further example, FIGS. 10A-10F illustrate an exemplary touch input 1002 that meets movement criteria (e.g., movement past lock distance marker 1008 in the first direction) and includes movement in a first direction (e.g., to the right). In some embodiments, the device performs the actions noted above in response to the touch input meeting the movement criteria and including movement in the first direction, regardless of whether the threshold amount of time has elapsed and/or the timing of when the movement of the touch input begin or finished with respect to the threshold amount of time. For example, device 900 can begin recording a video in response to a touch input (e.g., where a threshold amount of time is 1 second); after 2 minutes of detecting that the touch input is a stationary tap and hold (and recording video), the device detects that the touch input moves and meets media capture session locking criteria—in response, the device will continue recording after liftoff.

In some embodiments, continuing to capture media comprises transitioning a media capture session from an unlocked media capture state to a locked media capture state (e.g., also referred to as a "locked media capture session state"). In some embodiments, the electronic device (e.g., 600, 900) displays a user interface element (e.g., marker 1008, affordances 932 or 1004), or other graphical indication of an amount of touch input movement that will satisfy a movement criteria. In some embodiments, the device displays more than one user interface element. In some embodiments, each user interface element can correspond to the same or different movement criteria (e.g., associated with different media capture-related actions). For example, the device displays a graphical user interface element (e.g., 932, 1008) showing an area (e.g., area of 932; area to the right of 1008) that indicates the amount of movement that will cause the media capture session to enter a media capture state and thus continue after liftoff of the touch input (e.g., 1002). In some embodiments, the movement criteria is movement less than (e.g., a portion of) the distance between the first user interface element (e.g., 1000) and the other user interface element (e.g., 1004) (e.g., as illustrated and described with respect to FIGS. 10A-10F). For example, movement and liftoff of touch input 1002 of at least 50% of the distance from exemplary first user interface element 1000 to the exemplary user interface element 1004 can be sufficient to continue capture of the media after liftoff of the touch input.

Using one or more combinations of movement criteria and a threshold amount of time to determine whether to capture a first type of media, a second type of media having a particular duration, and a second type of media that continues being captured provides additional control options without cluttering the user interface (e.g., GUI) with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, the user can initiate a video recording using a single technique and then, after initiating the video recording, perform different continuation gestures to indicate whether the device should quickly end the recording or extend the recording. Additionally, the user can start a recording quickly and then decide after starting the recording whether to capture a photo, short video, or long video. Additionally, this reduced the number of controls that need to be displayed on the display (e.g., no need for both a still photo button and a video button or three different buttons for the different types of media. Saving screen space is particularly important when the rest of the screen could be used to display a camera preview of the content that the user is capturing.

Using one or more combinations of movement criteria and a threshold amount of time to determine whether to capture a first type of media, a second type of media having a particular duration, and a second type of media that continues being captured reduces the number of inputs needed to perform one or more of these operations when starting from a particular user interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Using movement criteria of a touch input on a user interface element, usable to cause/start capture of a (e.g., second) type of media, to control whether the type of media continues being captured after lift off the touch input captured provides additional control options without cluttering the user interface (e.g., GUI) with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the touch input (e.g., 930 of FIGS. 9D-9F) is lifted from the touch-sensitive surface (e.g., 902) before the touch input meets the movement criteria and after the threshold amount of time has elapsed since the touch input was detected: the electronic device (e.g., 600, 900) ceases to capture (e.g., as shown in FIGS. 9D-9F) (e.g., ceases to record a video, and stores the resulting video in a media library) the second type of media (e.g., video) in response to detecting liftoff of the touch input (e.g., end of recorded video duration occurs at liftoff).

In some embodiments, the first type of media has a duration that is independent of the duration of the touch input (e.g., 920) on the touch-sensitive surface (e.g., 902). For example the first type of media can be a video with fixed length (e.g., 3 seconds long) not affected by touch input duration (e.g., on touch screen display 902), or can be a still photo or a still photo accompanied by a sequence of other photos or media such as audio content for a predefined duration before and/or after the still photo.

In some embodiments, the movement criteria is a first movement criteria, and in response to detecting the touch input (e.g., 970) (1106), and in accordance with a determination that the touch input meets a second movement criteria (e.g., movement outside of a region/location of media capture affordance 910 in FIGS. 9M-9N) and includes movement in a second direction (e.g., to the left of the location of media capture affordance 910 (or stop affordance 934) in FIGS. 9M-9N) that is different from the first direction (e.g., to the right in FIGS. 9M-9N), the electronic device (e.g., 600, 900) starts (1114) to capture a sequence of media items (e.g., beginning a burst image capture mode) of the first type of media (e.g., still photo) where the number of media items captured is determined based on a duration of the touch input on the touch sensitive surface (e.g., a duration of the touch input while it is more than the threshold distance from the location of the user interface element (e.g., 910, 602, 1000, 934, 605) or while the touch input is in a predefined region that is associated with capturing the sequence of media items of the first type of media (e.g., region to the left of affordances 910, 934, 602, 1000, or 605). For example, the touch input can meet second movement criteria if the touch input includes more than a threshold amount of movement (e.g., sufficient to enable burst mode) in a second direction that is different from (e.g., opposite to, toward a second edge of the touch-sensitive surface) the first direction (e.g., to the right in FIGS. 9M-9N), includes or movement into a predefined region that is associated with capturing a sequence of media items of the first type of media (e.g., region to the left of media capture affordance 910 in FIGS. 9M-9N. Capturing a sequence of media items can also be referred to as a burst mode, burst image capture mode, continuous shooting mode, or the like.

In some embodiments, the movement satisfying the second movement criteria occurs before the threshold amount of time. For example, the movement criteria can require that the movement in the second direction must occur within the threshold amount of time in order for the device to start capturing the sequence of media items. In some embodiments, the movement begins before the threshold amount of time. For example, the movement criteria can require that the movement in the second direction must begin before the threshold amount of time in order for the device to start capturing the sequence of media items (e.g., even if movement ends after the threshold amount of time). In some embodiments, the second movement criteria can be satisfied by movement that begins after the threshold duration has elapsed. In some embodiments, the second movement criteria includes any movement (e.g., any movement in a particular (e.g., second) direction). In some embodiments, the second movement criteria includes a threshold amount (e.g., a minimum distance) of movement (e.g., in the second direction). In some embodiments, the second movement criteria includes a requirement that the touch input has moved outside of a first region corresponding to a media capture affordance (e.g., 910, 602, 1000). In some embodiments, the second movement criteria includes a requirement that the touch input has moved into a second region associated with capture of the sequence of the first type of media item (e.g., location). In some embodiments, the first movement criteria and the second movement criteria are the same, but in different directions (e.g., same distance requirement, but in opposite directions).

Using one or more combinations of movement criteria and a threshold amount of time to determine whether to capture a first type of media, a second type of media having a particular duration, a second type of media that continues being captured, and a sequence of media items of the first type provides additional control options without cluttering the user interface (e.g., GUI) with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Using one or more combinations of movement criteria and a threshold amount of time to determine whether to capture a first type of media, a second type of media having a particular duration, a second type of media that continues being captured, and a sequence of media items of the first type reduces the number of inputs needed to perform one or more of these operations when starting from a particular user interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the touch input (e.g., 970) meets the second movement criteria and includes movement (e.g., sufficient to enable burst mode) in the second direction that is different from (e.g., opposite to, toward a second edge of the touch-sensitive surface) the first direction: the electronic device (e.g., 600, 900) ceases to capture the sequence of media items of the first type of media (e.g., end of duration occurs at liftoff) in response to detecting liftoff of the touch input (e.g., in response to liftoff of 970 at FIG. 9P). For example, in response to liftoff of touch input 970, device 900 stops performing burst image capture (e.g., recording still images in quick succession) (e.g., and stores the captured images).

In some embodiments, while continuing to capture the sequence of media items of the first type of media (e.g., as shown in FIGS. 9N-9P): the electronic device (e.g., 600, 900) displays, on the display (e.g., 902), a number of media items (e.g., 972 of FIG. 9N; 976 of FIGS. 9O-9P) of the first type of media that have been captured since starting to capture the sequence of media items (e.g., wherein the number of media items increases as the sequence capturing continues). In some embodiments, the number of media items is displayed at a location of the first user interface element on the display (e.g., location of the media capture affordance 910 as shown in FIG. 9M). In some embodiments, the number of media items displayed is based on the number of media items that have been captured since touch input was detected.

In some embodiments, displaying, on the display (e.g., 902), the number of media items of the first type of media that have been captured since starting to capture the sequence of media items includes: the electronic device (e.g., 600, 900) displaying, on the display, the number of media items of the first type of media that have been captured at an initial location (e.g., location of 972 of FIG. 9N) on the display. In accordance with a determination that the touch input (e.g., 970) includes movement to a location on the touch-sensitive surface that corresponds to the initial location on the display (e.g., touch input 970 moves as shown in FIGS. 9N-9O): the electronic device displays, on the display, the number of media items (e.g., 976 of FIGS. 9O-9P), of the first type of media, at the location of the first user interface element (e.g., in FIG. 9O, 976 is now displayed at the same location as media capture affordance 910 as shown in FIG. 9M) on the display. The electronic device ceases to display the number of media items, of the first type of media, at the initial location on the display (e.g., 972 is no longer displayed in FIGS. 9O-9P).

Displaying a number of media items that have been captured at a new location in accordance with movement of a touch input to an initial location provides improved visual feedback that prevents the information from be obscured by the touch input. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600, 900) displays (1116), on the display (e.g., 902), a second user interface element (e.g., a icon, affordance, or distance marker) (e.g., media capture lock affordance 932; media capture lock affordance 1004, lock distance marker 1008) wherein movement of the touch input (e.g., 940, 603) from the first user interface element (e.g., location of 910, location of 934, location of 1000, location of 602, location of 605) to the second user interface element (e.g., 932, 1004, 1008) meets the movement criteria (e.g., the movement criteria includes detecting a threshold amount of movement (e.g., in a direction) toward the second user interface element, or movement to the first region (e.g., region of the second user interface element) associated with capturing the second type of media that continues to be captured after liftoff). In some embodiments, liftoff of the touch input at a location corresponding to the second user interface element (e.g., at a location of 932 or 1004; in a region to the fight of marker 1008) is required for the second type of media to continue being recorded after liftoff.

Displaying a user interface element that satisfies movement criteria provides improved visual feedback regarding the input movement needed to perform an action. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.)

In some embodiments, in accordance with continuing to capture the second type of media after detecting liftoff of the touch input (e.g., 940, 603) from the touch-sensitive surface (e.g., 902), the electronic device (e.g., 600, 900) changes the second user interface element (e.g., 932 in FIG. 9I) to a third user interface element (e.g., 944 in FIG. 9J) different from the second user element. In some embodiments, the second user interface element changes in response to movement of the touch input. In some embodiments, the second user interface element changes in response to liftoff of the touch input (e.g., at a location of a media capture lock affordance). In some embodiments, the second user interface element changes in response to the media captures session entering a locked media capture state.

In some embodiments, the second user interface element (e.g., 932) changes to the third user interface element (e.g., 944) in response to an interaction between the touch input (e.g., 940, 603) and a location on the touch-sensitive surface corresponding to the second user interface element (e.g., the location of the user interface element 932). For example, an interaction can occur when touch input 940 is dragged to the location of the media capture lock affordance 932. For further example, an interaction can occur when touch input 940 lifts off when at the location of media capture lock affordance 932).

In some embodiments, the touch input (e.g., 940, 603) is a first touch input, and while continuing to capture the second type of media (e.g., video): the electronic device (e.g., 600, 900) detects, via the touch-sensitive surface (e.g., 902), a second touch input (e.g., 960) at a location on the touch-sensitive surface that corresponds to the third user interface element (e.g., 944). In response to detecting the second touch input, the electronic device captures the first type of media (e.g., takes a still photo) (e.g., while continuing to capture the second type of media).

In some embodiments, while detecting the touch input (e.g., 940, 603) on the touch-sensitive surface (e.g., right after touch-down, or right after movement of the touch input in the first direction), the electronic device (e.g., 600, 900) displays (1118), on the display (e.g., 902), a directional indicator (e.g., 943, 975, 1005, 604*a*, 604*b*) in the first direction from a location of the first user interface element (e.g., location of 910, location of 934, location of 1000, location of 602, location of 605) on the display.

In some embodiments, the directional indicator (e.g., 943, 975, 1005, 604*a*, 604*b*) can include one or more of: a line (e.g., solid, dotted, dashed), an arrow, an animation, and other graphical indication of a direction (e.g., that satisfies a movement criteria). In some embodiments, the directional indicator indicates an amount of movement needed to meet the movement criteria (e.g., movement path indicator 1005 that includes lock distance marker 1008). In some embodiments, the directional indicator indicates a region or location to which the touch input needs to be moved to meet the movement criteria (e.g., movement path indicator 1005 that lock distance marker 1008) (e.g., with or without requiring touch input liftoff).

Displaying a directional indicator provides improved visual feedback regarding the input movement needed to perform an action. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the directional indicator (e.g., 943, 975, 1005, 604*a*, 604*b*) is displayed in accordance with a determination that the touch input (e.g., 940, 603) includes movement in the first direction. For example, movement path indicator 943 is not displayed until touch input 940 begins moving (e.g., toward media capture lock affordance 932). In some embodiments, the device displays the movement path indicator in response to detecting the touch input, or in response to detecting the touch input for a threshold amount of time.

Figure 6E:
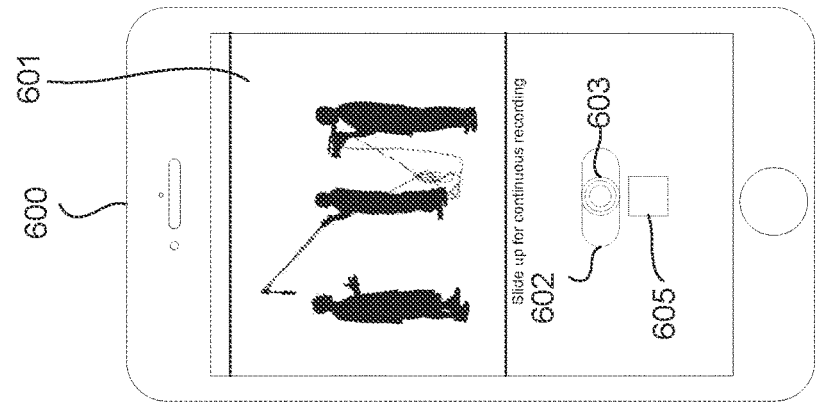

In some embodiments, in accordance with continuing to capture the second type of media (e.g., video) after detecting liftoff of the touch input (e.g., liftoff of 940 in FIGS. 9I-9J, liftoff of 603) from the touch-sensitive surface (e.g., 902), the electronic device (e.g., 600, 900) changes (1120) the first user interface element (e.g., 910, 602, 1000) to a fourth user interface element (e.g., 934 in FIG. 9J, 605 in FIGS. 6D-6F). In some embodiments, the first user interface element changes to the fourth user interface element in accordance with beginning to capture the second type of media (e.g., as shown in FIG. 9H). In some embodiments, the first user interface element changes to the fourth user interface element in accordance with movement of the touch input (e.g., out of the area corresponding to the first user interface element (e.g., as shown in FIGS. 10A-10D). In some embodiments, the electronic device changes the first user interface element to the fourth user interface element in response to liftoff of the touch input.

Changing a user interface element in accordance with continuing to capture second type of media provides relevant alternative control options without cluttering the user interface (e.g., GUI) with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the touch input (e.g., 940, 603) is a first touch input, and while continuing to capture the second type of media after detecting liftoff of the touch input (e.g., 940, 603) from the touch-sensitive surface (e.g., 902), the electronic device (e.g., 600, 900) detects, via the touch-sensitive surface, a third touch input (e.g., 950, 606) at a location on the touch-sensitive surface that corresponds to the fourth user interface element (e.g., 934, 605). In response to detecting the third touch input, the electronic device ceases to capture the second type of media (e.g., stops recording video, and stores the recorded video in a media library).

In some embodiments, the first type of media is one or more of: a still image and a video (e.g., video clip having a fixed duration, and/or a duration independent of a duration of the touch input).

In some embodiments, capturing the first type of media, by the one or more media capture components (e.g., camera, image sensor), occurs: in response to detecting the touch input (e.g., 603, 920, 930, 940, 970, 1002) on the touch-sensitive surface (e.g., touch-down on 902) or in response to liftoff of the touch input from the touch-sensitive surface. In some embodiments, capturing the first type of media occurs while the touch input is detected on the touch-sensitive surface.

In some embodiments, the second type of media is a video (e.g., having duration related to length of touch input, or until a stop affordance (e.g., 934, 605) is selected).

In some embodiments, capturing the second type of media, by the one or more media capture components (e.g., camera, image sensor), comprises beginning to record the video in response to the touch input being detected on the touch-sensitive surface for more than the threshold amount of time (e.g., 1 second).

In some embodiments, in accordance with a determination that the touch input (e.g., 930) is lifted from the touch-sensitive surface before the touch input meets the movement criteria (e.g., media capture session is not in a locked media capture state) and after the threshold amount of time (e.g., 1 second) (e.g., device has begun recording video) has elapsed since the touch input was detected: the electronic device (e.g., 600, 900) captures the first type of media (e.g., still image), and discards (e.g., deleting before or after adding the first type of media to a media library) the captured first type of media. For example, the electronic device can capture a first type of media item in accordance with receiving a touch input (e.g., in response to touch-down of touch input 930). After the touch input meets criteria for capturing a second type of media, the device can discard the captured first type of media (e.g., because the characteristics of the touch input gesture subsequently indicate that the capture of the first media item is not intended).

Capturing first media so that if the user lifts off it is available, but automatically deleting it conserves storage space when the user starts recording other content (e.g., second media, such as a video), which indicates that the first media (e.g., a photo) is not needed. Further automatically discarding the first media based on other media being captured (e.g., beginning to record a video) reduces the number of user inputs needed to discard the media. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIG. 11) are also applicable in an analogous manner to the methods described below/above. For example, method 1100 optionally includes one or more of the characteristics of the various methods described above with reference to method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to perform gesture-based media capture. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of a media capture application, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media content can be captured and stored by inferring user intention based on non-personal information data or a bare minimum amount of personal information, such as the content being requested by the device associated with a user, other non-personal information available to a media capture interface application, or publicly available information.

What is claimed is:

1. An electronic device, comprising:
    a display;
    a touch-sensitive surface;
    one or more media capture components;
    one or more processors; and
    memory storing one or more programs configured to be executed by the one or more processors, the one or more programs including instructions for:
        displaying, on the display, a first user interface element at a first location on the touch-sensitive surface;
        detecting, via the touch-sensitive surface, a touch input that begins at the first location on the touch-sensitive surface that corresponds to the first user interface element;
        in response to detecting a first portion of the touch input, displaying a second user interface element at a second location on the touch-sensitive surface that is different from the first location; and
        in response to detecting the touch input:
            in accordance with a determination that the touch input is lifted from the touch-sensitive surface before the touch input meets movement criteria and before a threshold amount of time has elapsed since the touch input was detected, capturing a first type of media;
            in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface;
            in accordance with a determination that the touch input meets the movement criteria and includes movement in a first direction, wherein movement of the touch input from the first user interface element to the second user interface element meets the movement criteria:
starting to capture the second type of media and continuing to capture the second type of media after detecting liftoff of the touch input from the touch-sensitive surface; and
while continuing to capture the second type of media after detecting liftoff of the touch input from the touch-sensitive surface, displaying, at the second location, a third user interface element different from the second user interface element without displaying the second user interface element at the second location.

2. The electronic device of claim 1, the one or more programs further including instructions for:
in accordance with the determination that the touch input is lifted from the touch-sensitive surface before the touch input meets the movement criteria and after the threshold amount of time has elapsed since the touch input was detected:
ceasing to capture the second type of media in response to detecting liftoff of the touch input.

3. The electronic device of claim 1, wherein the first type of media has a duration that is independent of the duration of the touch input on the touch-sensitive surface.

4. The electronic device of claim 1, wherein the movement criteria is a first movement criteria, the one or more programs further including instructions for, in response to detecting the touch input:
in accordance with a determination that the touch input meets a second movement criteria and includes movement in a second direction that is different from the first direction, starting to capture a sequence of media items of the first type of media where a number of media items captured is determined based on the duration of the touch input on the touch-sensitive surface.

5. The electronic device of claim 4, the one or more programs further including instructions for:
in accordance with a determination that the touch input meets the second movement criteria and includes movement in the second direction that is different from the first direction:
ceasing to capture the sequence of media items of the first type of media in response to detecting liftoff of the touch input.

6. The electronic device of claim 4, the one or more programs further including instructions for, while continuing to capture the sequence of media items of the first type of media:
displaying, on the display, the number of media items of the first type of media that have been captured since starting to capture the sequence of media items, wherein the number of media items are displayed at a location of the first user interface element on the display.

7. The electronic device of claim 6, wherein displaying, on the display, the number of media items of the first type of media that have been captured since starting to capture the sequence of media items includes:
displaying, on the display, the number of media items of the first type of media that have been captured at an initial location on the display; and
in accordance with a determination that the touch input includes movement to a location on the touch-sensitive surface that corresponds to the initial location on the display:
displaying, on the display, the number of media items, of the first type of media, at the location of the first user interface element on the display; and
ceasing to display the number of media items, of the first type of media, at the initial location on the display.

8. The electronic device of claim 1, wherein:
the second user interface element changes to the third user interface element in response to an interaction between the touch input and the second location on the touch-sensitive surface corresponding to the second user interface element.

9. The electronic device of claim 1, wherein the touch input is a first touch input, the one or more programs further including instructions for:
while continuing to capture the second type of media:
detecting, via the touch-sensitive surface, a second touch input at the second location on the touch-sensitive surface that corresponds to the third user interface element; and
in response to detecting the second touch input, capturing the first type of media.

10. The electronic device of claim 1, the one or more programs further including instructions for:
while detecting the touch input on the touch-sensitive surface, displaying, on the display, a directional indicator in the first direction from a location of the first user interface element on the display.

11. The electronic device of claim 10, wherein the directional indicator is displayed in accordance with a determination that the touch input includes movement in the first direction.

12. The electronic device of claim 1, the one or more programs further including instructions for:
while continuing to capture the second type of media after detecting liftoff of the touch input from the touch-sensitive surface, displaying, at the first location a fourth user interface element, different from the first user interface element, without displaying the first user interface element, wherein the fourth user interface element is selectable to perform an operation.

13. The electronic device of claim 12, wherein the touch input is a first touch input, the one or more programs further including instructions for:
while continuing to capture the second type of media after detecting liftoff of the touch input from the touch-sensitive surface, detecting, via the touch-sensitive surface, a third touch input at a location on the touch-sensitive surface that corresponds to the fourth user interface element; and
in response to detecting the third touch input, ceasing to capture the second type of media.

14. The electronic device of claim 1, wherein the first type of media is one or more of: a still image and a video.

15. The electronic device of claim 14, wherein capturing the first type of media, by the one or more media capture components, occurs: in response to detecting the touch input on the touch-sensitive surface or in response to liftoff of the touch input from the touch-sensitive surface.

16. The electronic device of claim 1, wherein the second type of media is a video.

17. The electronic device of claim 16, wherein capturing, by the one or more media capture components, the second type of media comprises beginning to record the video in response to the touch input being detected on the touch-sensitive surface for more than the threshold amount of time.

18. The electronic device of claim 1, the one or more programs further including instructions for:
  in accordance with a determination that the touch input is lifted from the touch-sensitive surface before the touch input meets the movement criteria and after the threshold amount of time has elapsed since the touch input was detected:
    capturing the first type of media; and
    discarding the captured first type of media.

19. A non-transitory computer-readable storage medium storing one or more programs configured to be executed by one or more processors of an electronic device with a display, a touch-sensitive surface, and one or more media capture components, the one or more programs including instructions for:
  displaying, on the display, a first user interface element at a first location on the touch-sensitive surface;
  detecting, via the touch-sensitive surface, a touch input that begins at the first location on the touch-sensitive surface that corresponds to the first user interface element;
  in response to detecting a first portion of the touch input, displaying a second user interface element at a second location on the touch-sensitive surface that is different from the first location; and
  in response to detecting the touch input:
    in accordance with a determination that the touch input is lifted from the touch-sensitive surface before the touch input meets movement criteria and before a threshold amount of time has elapsed since the touch input was detected, capturing a first type of media;
    in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface;
    in accordance with a determination that the touch input meets the movement criteria and includes movement in a first direction, wherein movement of the touch input from the first user interface element to the second user interface element meets the movement criteria:
      starting to capture the second type of media and continuing to capture the second type of media after detecting liftoff of the touch input from the touch-sensitive surface; and
    while continuing to capture the second type of media after detecting liftoff of the touch input from the touch-sensitive surface, displaying, at the second location, a third user interface element different from the second user interface element without displaying the second user interface element at the second location.

20. A computer-implemented method, comprising:
  at an electronic device with a display, a touch-sensitive surface, and one or more media capture components:
    displaying, on the display, a first user interface element at a first location on the touch-sensitive surface;
    detecting, via the touch-sensitive surface, a touch input that begins at the first location on the touch-sensitive surface that corresponds to the first user interface element;
    in response to detecting a first portion of the touch input, displaying a second user interface element at a second location on the touch-sensitive surface that is different from the first location; and
    in response to detecting the touch input:
      in accordance with a determination that the touch input is lifted from the touch-sensitive surface before the touch input meets movement criteria and before a threshold amount of time has elapsed since the touch input was detected, capturing a first type of media;
      in accordance with a determination that the touch input is lifted from the touch-sensitive surface before the touch input meets the movement criteria and after the threshold amount of time has elapsed since the touch input was detected, capturing a second type of media that has a duration that is based on the duration of the touch input on the touch-sensitive surface;
      in accordance with a determination that the touch input meets the movement criteria and includes movement in a first direction, wherein movement of the touch input from the first user interface element to the second user interface element meets the movement criteria:
        starting to capture the second type of media and continuing to capture the second type of media after detecting liftoff of the touch input from the touch-sensitive surface; and
      while continuing to capture the second type of media after detecting liftoff of the touch input from the touch-sensitive surface, displaying, at the second location, a third user interface element different from the second user interface element without displaying the second user interface element at the second location.

21. The non-transitory computer-readable storage medium of claim 19, the one or more programs further including instructions for:
  in accordance with the determination that the touch input is lifted from the touch-sensitive surface before the touch input meets the movement criteria and after the threshold amount of time has elapsed since the touch input was detected:
    ceasing to capture the second type of media in response to detecting liftoff of the touch input.

22. The non-transitory computer-readable storage medium of claim 19, wherein the first type of media has a duration that is independent of the duration of the touch input on the touch-sensitive surface.

23. The non-transitory computer-readable storage medium of claim 19, wherein the movement criteria is a first movement criteria, the one or more programs further including instructions for, in response to detecting the touch input:
  in accordance with a determination that the touch input meets a second movement criteria and includes movement in a second direction that is different from the first direction, starting to capture a sequence of media items of the first type of media where a number of media items captured is determined based on the duration of the touch input on the touch-sensitive surface.

24. The non-transitory computer-readable storage medium of claim 23, the one or more programs further including instructions for:
  in accordance with a determination that the touch input meets the second movement criteria and includes movement in the second direction that is different from the first direction:

ceasing to capture the sequence of media items of the first type of media in response to detecting liftoff of the touch input.

25. The non-transitory computer-readable storage medium claim 23, the one or more programs further including instructions for, while continuing to capture the sequence of media items of the first type of media:
displaying, on the display, the number of media items of the first type of media that have been captured since starting to capture the sequence of media items, wherein the number of media items are displayed at a location of the first user interface element on the display.

26. The non-transitory computer-readable storage medium of claim 25, wherein displaying, on the display, the number of media items of the first type of media that have been captured since starting to capture the sequence of media items includes:
displaying, on the display, the number of media items of the first type of media that have been captured at an initial location on the display; and
in accordance with a determination that the touch input includes movement to a location on the touch-sensitive surface that corresponds to the initial location on the display:
displaying, on the display, the number of media items, of the first type of media, at the location of the first user interface element on the display; and
ceasing to display the number of media items, of the first type of media, at the initial location on the display.

27. The non-transitory computer-readable storage medium of claim 19, wherein the second user interface element changes to the third user interface element in response to an interaction between the touch input and the second location on the touch-sensitive surface corresponding to the second user interface element.

28. The non-transitory computer-readable storage medium of claim 19, wherein the touch input is a first touch input, the one or more programs further including instructions for:
while continuing to capture the second type of media:
detecting, via the touch-sensitive surface, a second touch input at the second location on the touch-sensitive surface that corresponds to the third user interface element; and
in response to detecting the second touch input, capturing the first type of media.

29. The non-transitory computer-readable storage medium of claim 19, the one or more programs further including instructions for:
while detecting the touch input on the touch-sensitive surface, displaying, on the display, a directional indicator in the first direction from a location of the first user interface element on the display.

30. The non-transitory computer-readable storage medium of claim 10, wherein the directional indicator is displayed in accordance with a determination that the touch input includes movement in the first direction.

31. The non-transitory computer-readable storage medium of claim 19, the one or more programs further including instructions for:
while continuing to capture the second type of media after detecting liftoff of the touch input from the touch-sensitive surface, displaying, at the first location, a fourth user interface element, different from the first user interface element, without displaying the first user interface element, wherein the fourth user interface element is selectable to perform an operation.

32. The non-transitory computer-readable storage medium of claim 31, wherein the touch input is a first touch input, the one or more programs further including instructions for:
while continuing to capture the second type of media after detecting liftoff of the touch input from the touch-sensitive surface, detecting, via the touch-sensitive surface, a third touch input at a location on the touch-sensitive surface that corresponds to the fourth user interface element; and
in response to detecting the third touch input, ceasing to capture the second type of media.

33. The non-transitory computer-readable storage medium of claim 19, wherein the first type of media is one or more of: a still image and a video.

34. The non-transitory computer-readable storage medium of claim 33, wherein capturing the first type of media, by the one or more media capture components, occurs: in response to detecting the touch input on the touch-sensitive surface or in response to liftoff of the touch input from the touch-sensitive surface.

35. The non-transitory computer-readable storage medium of claim 19, wherein the second type of media is a video.

36. The non-transitory computer-readable storage medium of claim 35, wherein capturing, by the one or more media capture components, the second type of media comprises beginning to record the video in response to the touch input being detected on the touch-sensitive surface for more than the threshold amount of time.

37. The non-transitory computer-readable storage medium of claim 19, the one or more programs further including instructions for:
in accordance with a determination that the touch input is lifted from the touch-sensitive surface before the touch input meets the movement criteria and after the threshold amount of time has elapsed since the touch input was detected:
capturing the first type of media; and
discarding the captured first type of media.

38. The computer-implemented method of claim 20, further comprising:
in accordance with the determination that the touch input is lifted from the touch-sensitive surface before the touch input meets the movement criteria and after the threshold amount of time has elapsed since the touch input was detected:
ceasing to capture the second type of media in response to detecting liftoff of the touch input.

39. The computer-implemented method of claim 20, wherein the first type of media has a duration that is independent of the duration of the touch input on the touch-sensitive surface.

40. The computer-implemented method of claim 20, wherein the movement criteria is a first movement criteria, the computer-implemented method further comprising, in response to detecting the touch input:
in accordance with a determination that the touch input meets a second movement criteria and includes movement in a second direction that is different from the first direction, starting to capture a sequence of media items of the first type of media where a number of media items captured is determined based on the duration of the touch input on the touch-sensitive surface.

41. The computer-implemented method of claim 40, further comprising:
in accordance with a determination that the touch input meets the second movement criteria and includes movement in the second direction that is different from the first direction:
ceasing to capture the sequence of media items of the first type of media in response to detecting liftoff of the touch input.

42. The computer-implemented method of claim 40, further comprising, while continuing to capture the sequence of media items of the first type of media:
displaying, on the display, the number of media items of the first type of media that have been captured since starting to capture the sequence of media items, wherein the number of media items are displayed at a location of the first user interface element on the display.

43. The computer-implemented method of claim 42, wherein displaying, on the display, the number of media items of the first type of media that have been captured since starting to capture the sequence of media items includes:
displaying, on the display, the number of media items of the first type of media that have been captured at an initial location on the display; and
in accordance with a determination that the touch input includes movement to a location on the touch-sensitive surface that corresponds to the initial location on the display:
displaying, on the display, the number of media items, of the first type of media, at the location of the first user interface element on the display; and
ceasing to display the number of media items, of the first type of media, at the initial location on the display.

44. The computer-implemented method of claim 20, wherein the second user interface element changes to the third user interface element in response to an interaction between the touch input and the second location on the touch-sensitive surface corresponding to the second user interface element.

45. The computer-implemented method of claim 20, wherein the touch input is a first touch input, the computer-implemented method further comprising:
while continuing to capture the second type of media:
detecting, via the touch-sensitive surface, a second touch input at the second location on the touch-sensitive surface that corresponds to the third user interface element; and
in response to detecting the second touch input, capturing the first type of media.

46. The computer-implemented method of claim 20, further comprising:
while detecting the touch input on the touch-sensitive surface, displaying, on the display, a directional indicator in the first direction from a location of the first user interface element on the display.

47. The computer-implemented method of claim 46, wherein the directional indicator is displayed in accordance with a determination that the touch input includes movement in the first direction.

48. The computer-implemented method of claim 20, further comprising:
while continuing to capture the second type of media after detecting liftoff of the touch input from the touch-sensitive surface, displaying, at the first location, a fourth user interface element, different from the first user interface element, without displaying the first user interface element, wherein the fourth user interface element is selectable to perform an operation.

49. The computer-implemented method of claim 48, wherein the touch input is a first touch input, the computer-implemented method further comprising:
while continuing to capture the second type of media after detecting liftoff of the touch input from the touch-sensitive surface, detecting, via the touch-sensitive surface, a third touch input at a location on the touch-sensitive surface that corresponds to the fourth user interface element; and
in response to detecting the third touch input, ceasing to capture the second type of media.

50. The computer-implemented method of claim 20, wherein the first type of media is one or more of: a still image and a video.

51. The computer-implemented method of claim 50, wherein capturing the first type of media, by the one or more media capture components, occurs: in response to detecting the touch input on the touch-sensitive surface or in response to liftoff of the touch input from the touch-sensitive surface.

52. The computer-implemented method of claim 20, wherein the second type of media is a video.

53. The computer-implemented method of claim 52, wherein capturing, by the one or more media capture components, the second type of media comprises beginning to record the video in response to the touch input being detected on the touch-sensitive surface for more than the threshold amount of time.

54. The computer-implemented method of claim 20, further comprising:
in accordance with a determination that the touch input is lifted from the touch-sensitive surface before the touch input meets the movement criteria and after the threshold amount of time has elapsed since the touch input was detected:
capturing the first type of media; and
discarding the captured first type of media.

55. The electronic device of claim 1, the one or more programs further including instructions for:
in response to detecting the touch input and in accordance with a determination that the touch input is maintained on the touch-sensitive surface after the threshold amount of time has elapsed since the touch input was detected, displaying the second user interface element at the second location on the touch-sensitive surface that is different from the first location.

56. The electronic device of claim 1, the one or more programs further including instructions for:
in response to detecting the touch input and before the threshold amount of time has elapsed since the touch input was detected:
in accordance with a determination that the touch input meets the movement criteria, capturing the second type of media.

57. The non-transitory computer-readable storage medium of claim 19, the one or more programs further including instructions for:
in response to detecting the touch input and in accordance with a determination that the touch input is maintained on the touch-sensitive surface after the threshold amount of time has elapsed since the touch input was detected, displaying the second user interface element at the second location on the touch-sensitive surface that is different from the first location.

58. The non-transitory computer-readable storage medium of claim 19, the one or more programs further including instructions for:
 in response to detecting the touch input and before the threshold amount of time has elapsed since the touch input was detected:
  in accordance with a determination that the touch input meets the movement criteria, capturing the second type of media.

59. The computer-implemented method of claim 20, further comprising:
 in response to detecting the touch input and in accordance with a determination that the touch input is maintained on the touch-sensitive surface after the threshold amount of time has elapsed since the touch input was detected, displaying the second user interface element at the second location on the touch-sensitive surface that is different from the first location.

60. The computer-implemented method of claim 20, further comprising:
 in response to detecting the touch input and before the threshold amount of time has elapsed since the touch input was detected:
  in accordance with a determination that the touch input meets the movement criteria, capturing the second type of media.

\* \* \* \* \*

UNITED STATES PATENT AND TRADEMARK OFFICE
CERTIFICATE OF CORRECTION

PATENT NO. : 11,977,731 B2
APPLICATION NO. : 17/466824
DATED : May 7, 2024
INVENTOR(S) : Anton M. Davydov et al.

Page 1 of 1

It is certified that error appears in the above-identified patent and that said Letters Patent is hereby corrected as shown below:

In the Claims

In Column 64, Line 38, Claim 12, delete "location" and insert -- location, -- therefor.

In Column 67, Line 5, Claim 25, delete "claim" and insert -- of claim -- therefor.

In Column 67, Line 57, Claim 30, delete "10" and insert -- 29 -- therefor.

Signed and Sealed this
Twenty-first Day of January, 2025

Coke Morgan Stewart
*Acting Director of the United States Patent and Trademark Office*